United States Patent [19]

Bomgardner et al.

[11] Patent Number: 5,109,409
[45] Date of Patent: Apr. 28, 1992

[54] APPARATUS AND METHOD TO DETECT TELEPHONY SIGNALING STATES

[75] Inventors: Eric D. Bomgardner; Randall J. Eisenach, both of Raleigh, N.C.

[73] Assignees: Alcatel NA, Inc., Raleigh, N.C.; Network Systems Corp., Raleigh, N.C.

[21] Appl. No.: 451,501

[22] Filed: Dec. 15, 1989

[51] Int. Cl.$^5$ ............................................. H04M 1/00
[52] U.S. Cl. .................... 379/377; 379/257; 379/386
[58] Field of Search ............... 379/329, 377, 379, 372, 379/373, 381, 382, 386, 257

[56] References Cited

U.S. PATENT DOCUMENTS

| 4,528,664 | 7/1985 | Cheng et al. | 379/381 |
| 4,734,933 | 3/1988 | Barsellotti et al. | 379/377 |
| 4,962,520 | 10/1990 | Gozen | 379/373 |

Primary Examiner—Jin F. Ng
Assistant Examiner—Jhancy Augustus
Attorney, Agent, or Firm—Ware, Fressola, Van Der Sluys & Adolphson

[57] ABSTRACT

An apparatus and method for detecting telephony signaling states, comprises an analog to digital converter and a microcomputer with associated firmware for controlling the operation of the microcomputer. The analog to digital converter digitizes incoming analog voltages containing telephony signaling state information and presents the digitized data samples for operation by the microcomputer. The microcomputer performs various digital filtering and analysis of the digital data samples in order to determine the signaling states represented by such digital data samples, and upon detection of the signaling states, outputs information indicative of such detected states. The present invention also incorporates use of such a detection circuit within line cards used to interface telephone subscriber lines with the central office terminal. The present invention further encompasses the methodology of performing such digital data sampling and analysis so as to determine telephony signaling states.

59 Claims, 48 Drawing Sheets

| FIG. 1A | FIG. 1B |

FIG. 1

| FIG. 2A1 |
| FIG. 2A2 |

FIG. 2A

| FIG. 7A1 |
| FIG. 7A2 |

FIG. 7A

| FIG. 2B1 | FIG. 2B2 |
| FIG. 2B3 | FIG. 2B4 |

FIG. 2B

| FIG. 2C1 | FIG. 2C2 | FIG. 2C3 |

FIG. 2C

| FIG. 2D1 | FIG. 2D2 |
|---|---|
| FIG. 2D3 | FIG. 2D4 |

FIG. 2D

| FIG. 7B1 | FIG. 7B2 |
|---|---|
| FIG. 7B3 | FIG. 7B4 |

FIG. 7B

| FIG. 7C1 | FIG. 7C2 | FIG. 7C3 |
|---|---|---|

FIG. 7C

| FIG. 8D1 | FIG. 8D2 |
|---|---|

FIG. 8D

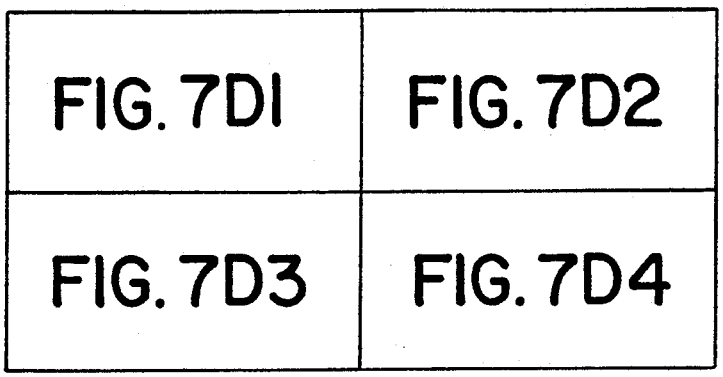
FIG. 7D
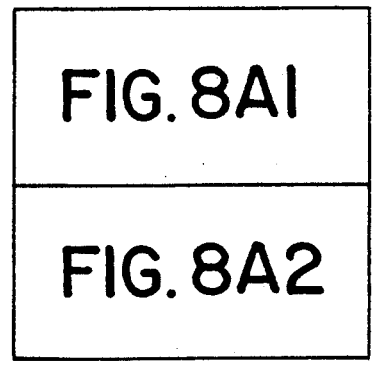
FIG. 8A
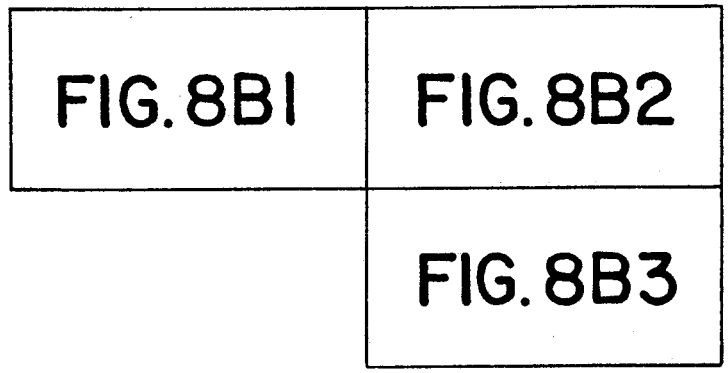
FIG. 8B
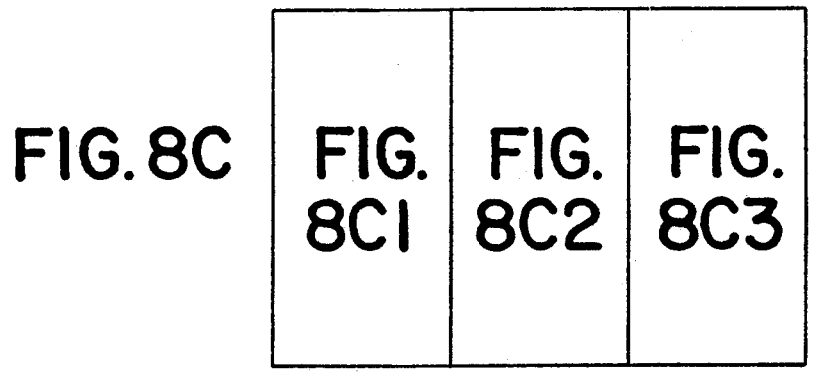

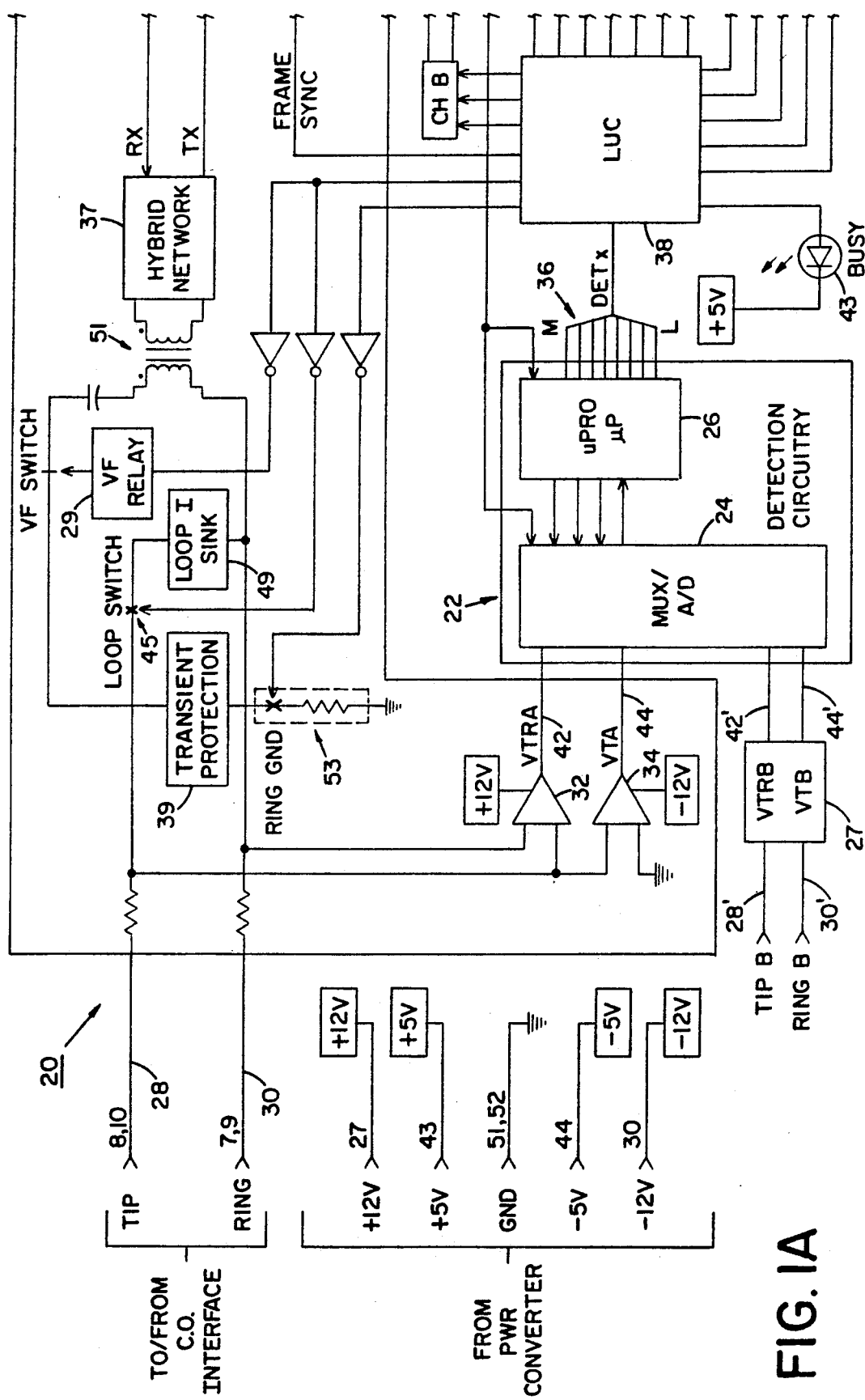
FIG. IA

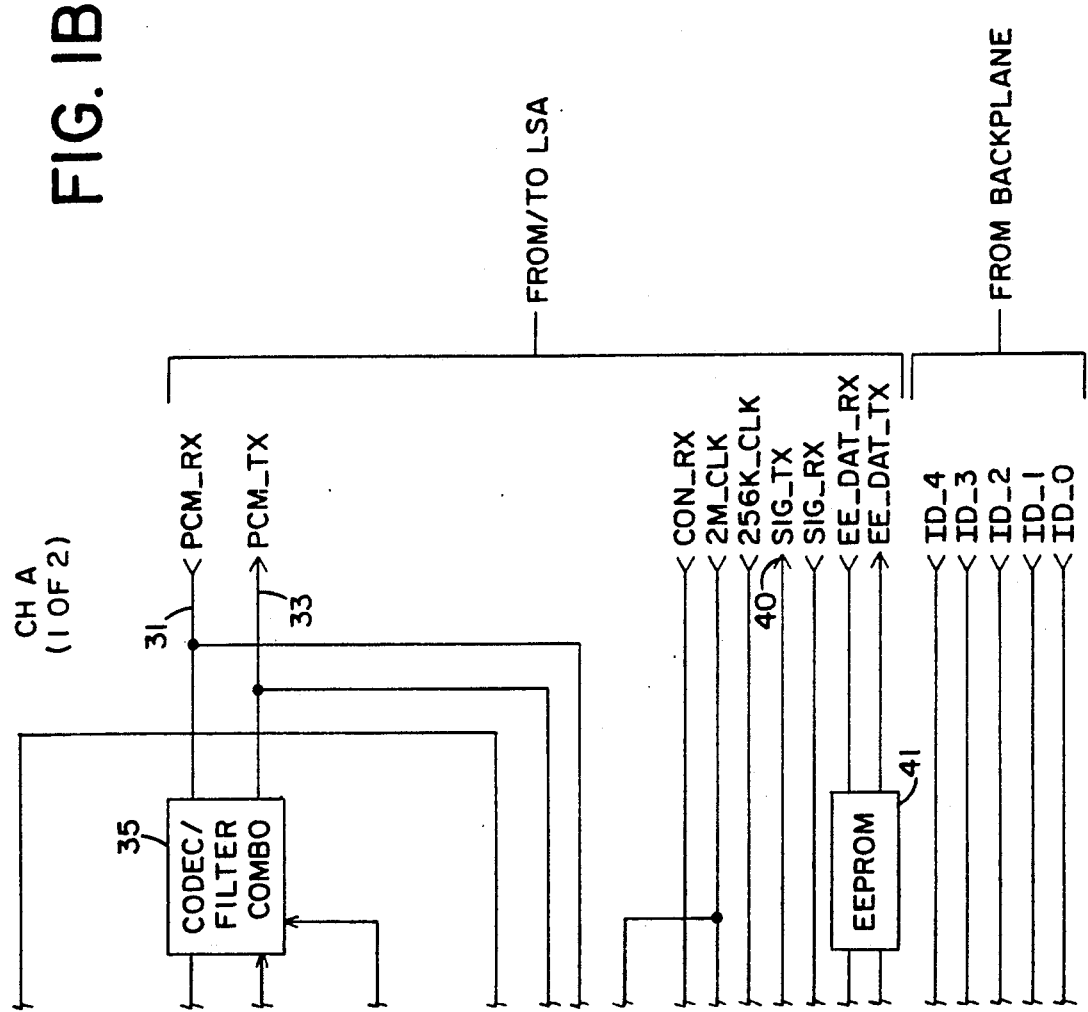

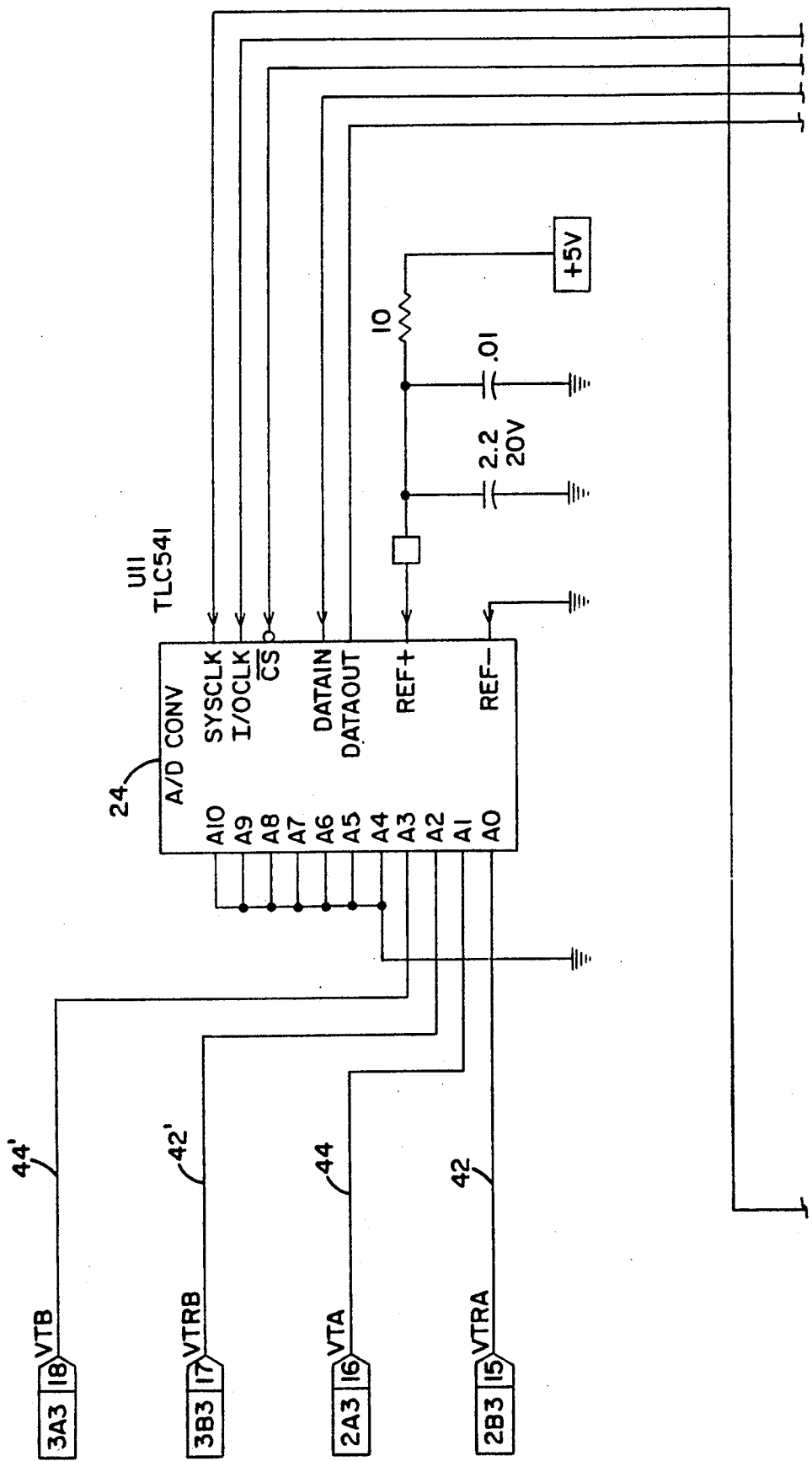
FIG. 2A1

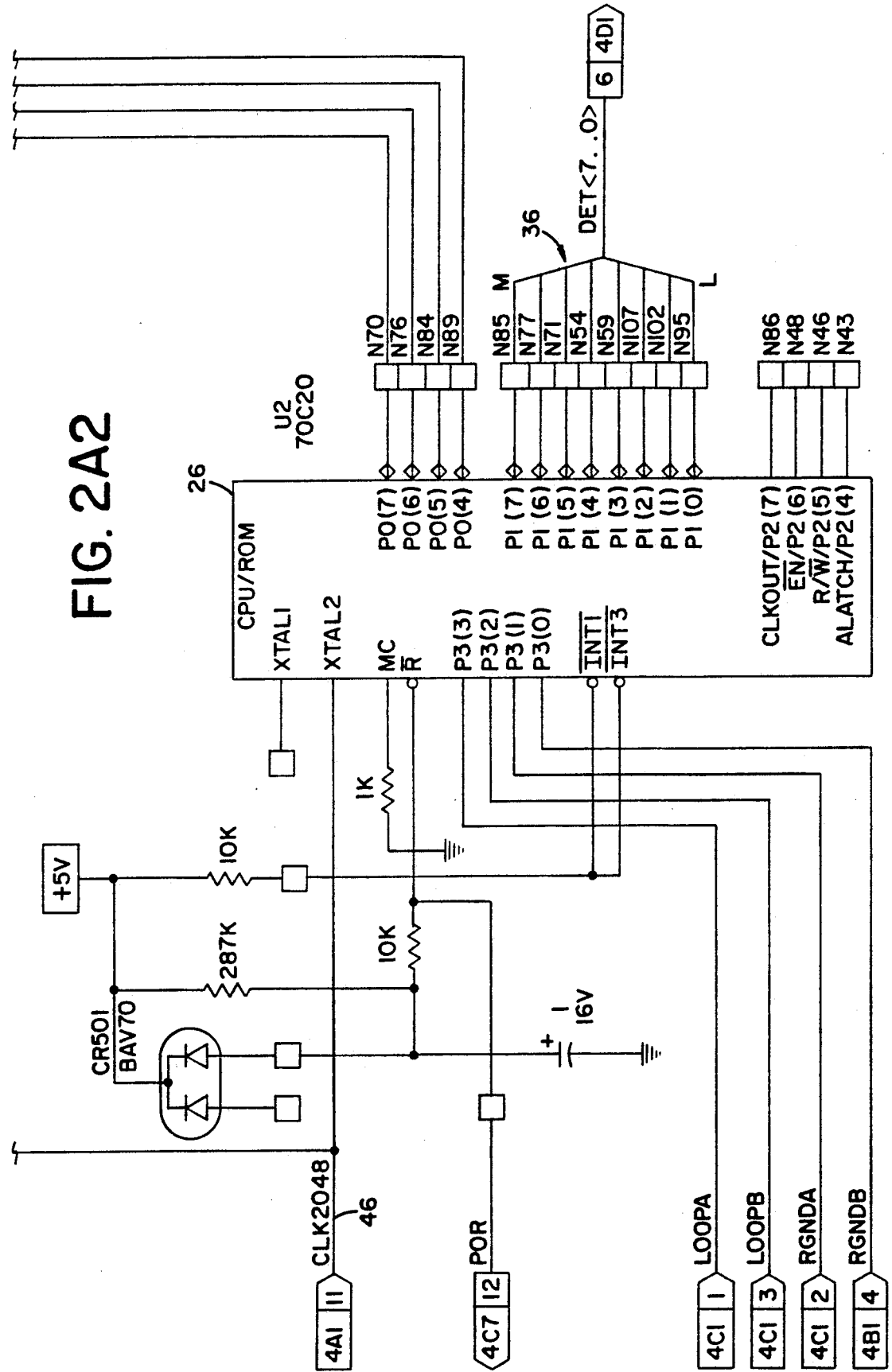
FIG. 2A2

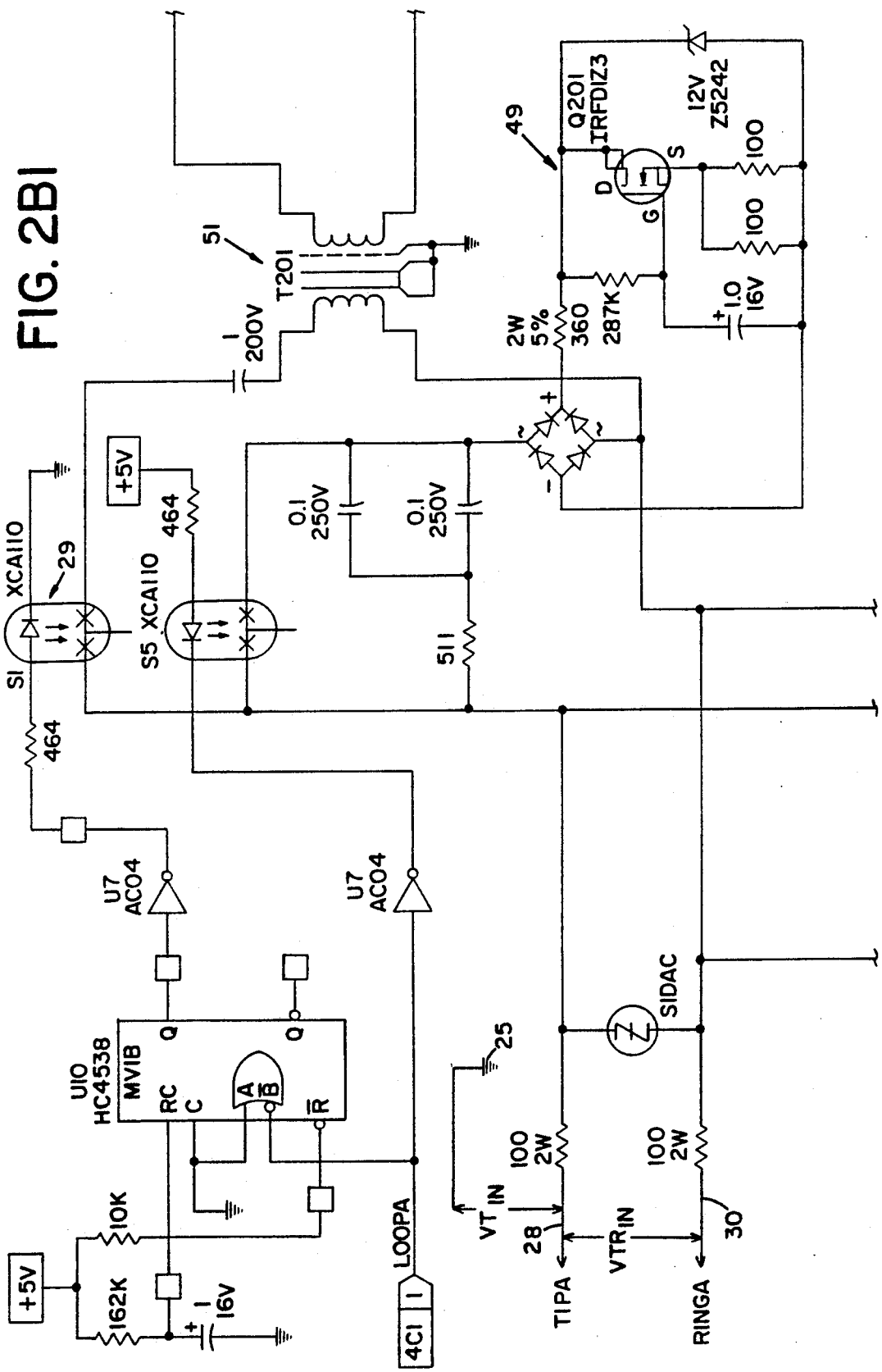
FIG. 2B1

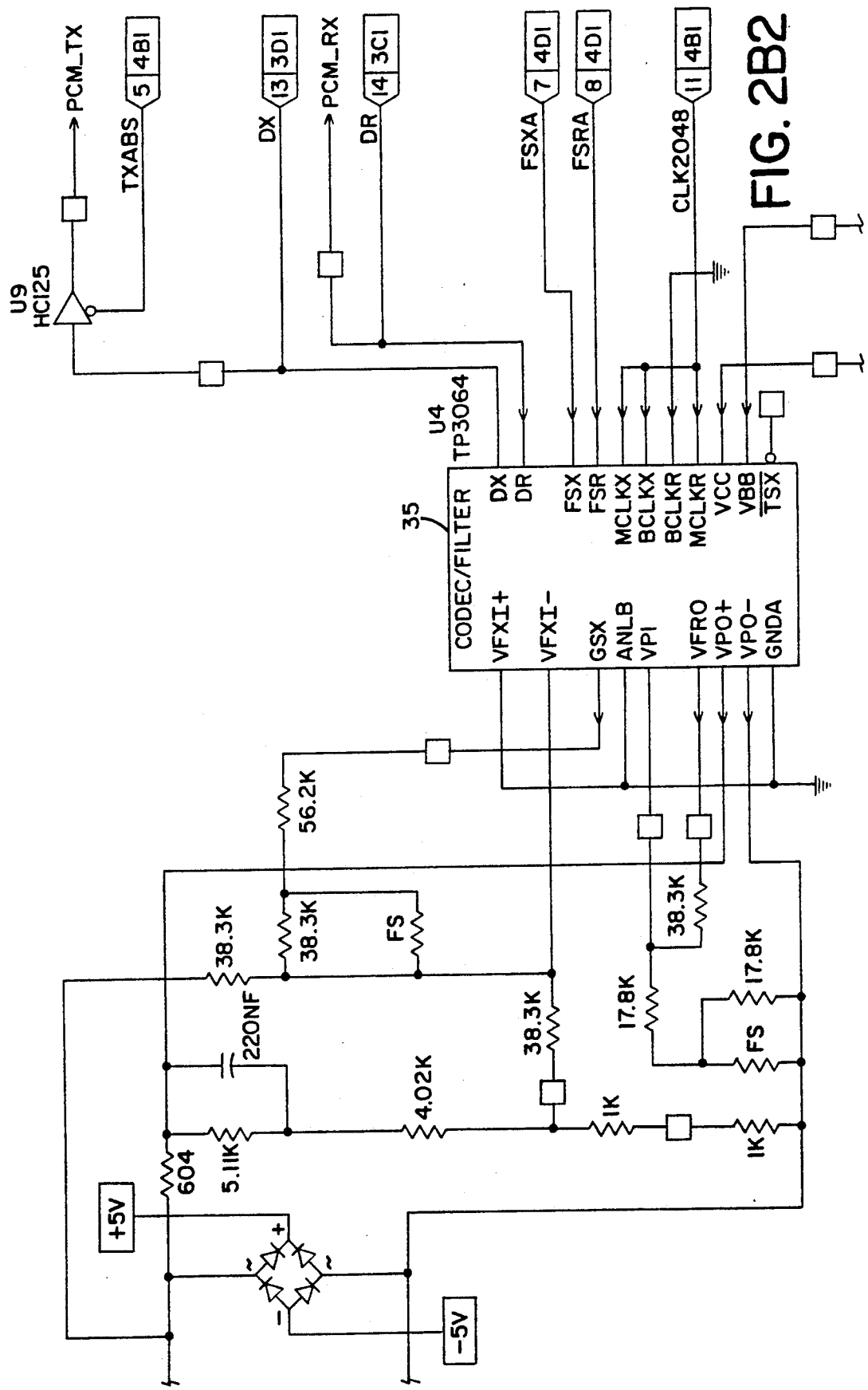
FIG. 2B2

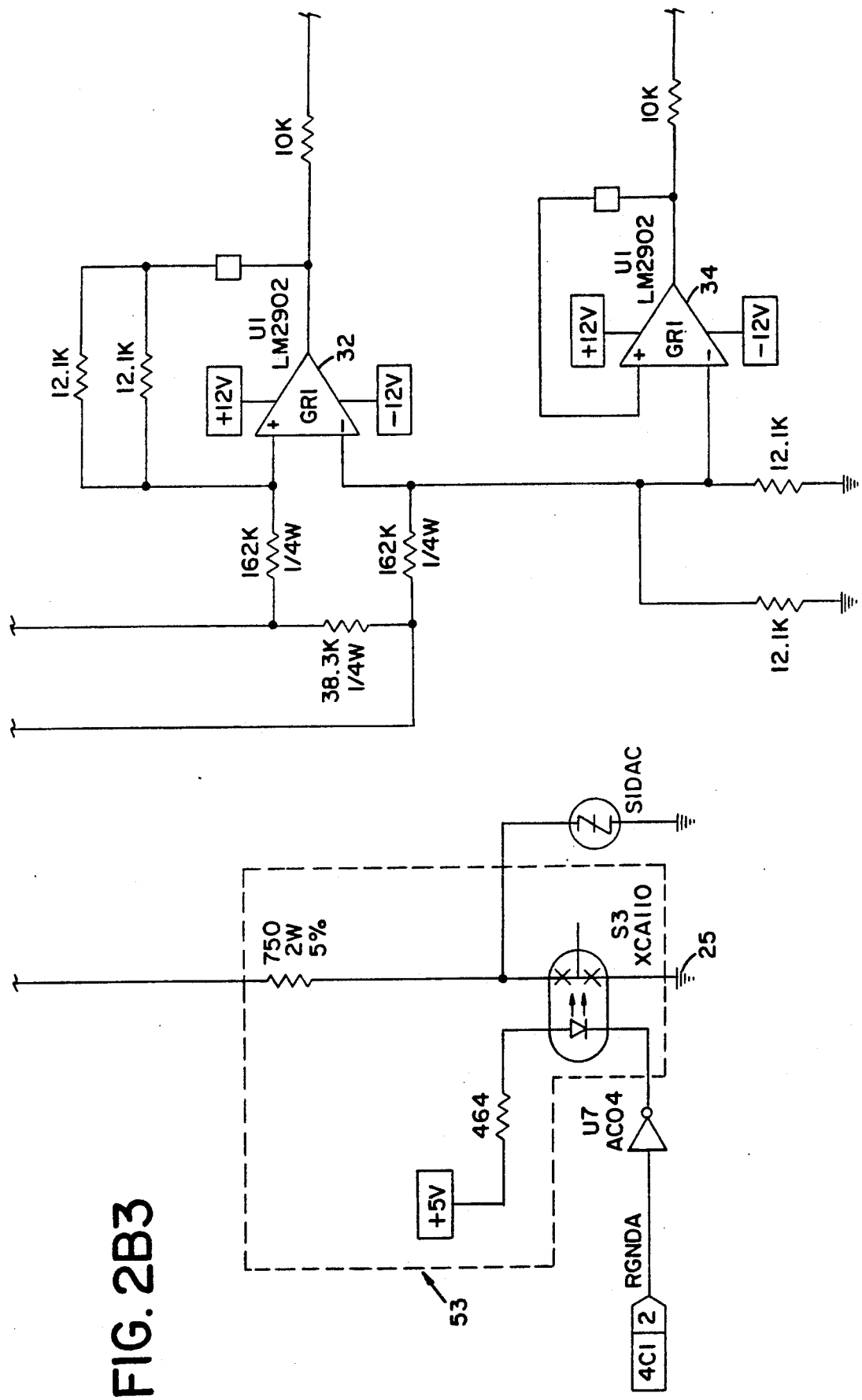
FIG. 2B3

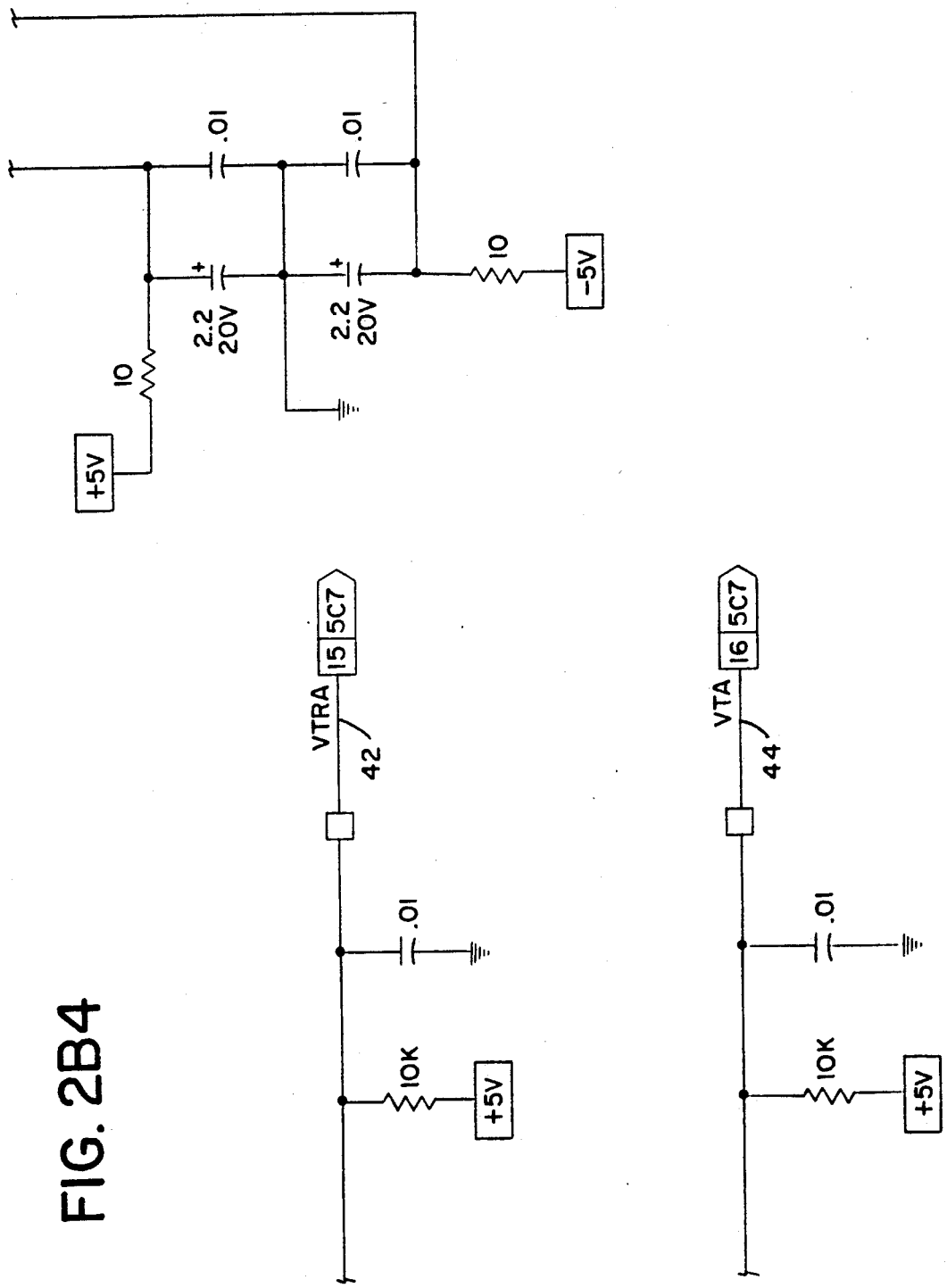
FIG. 2B4

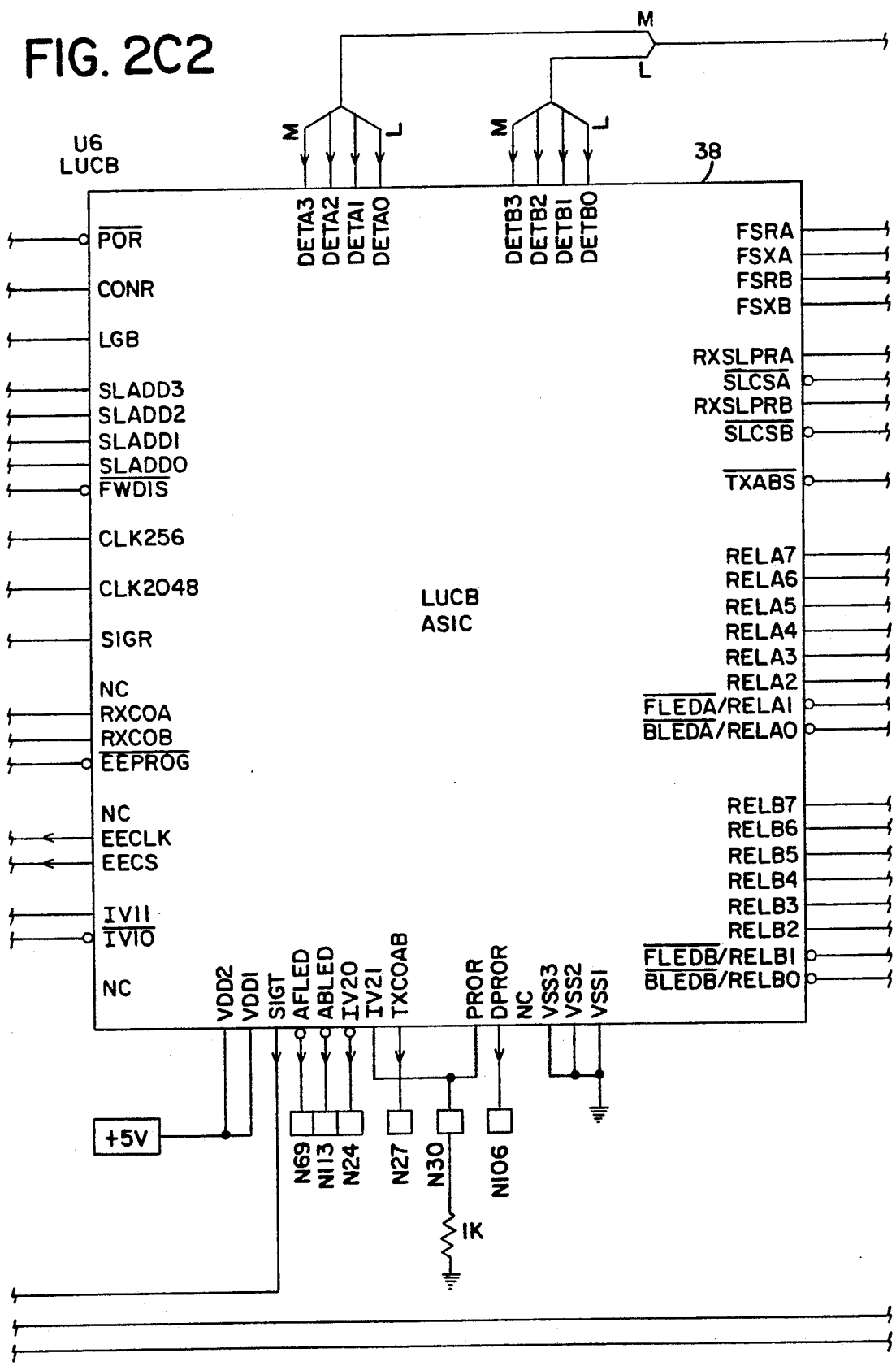
FIG. 2C2

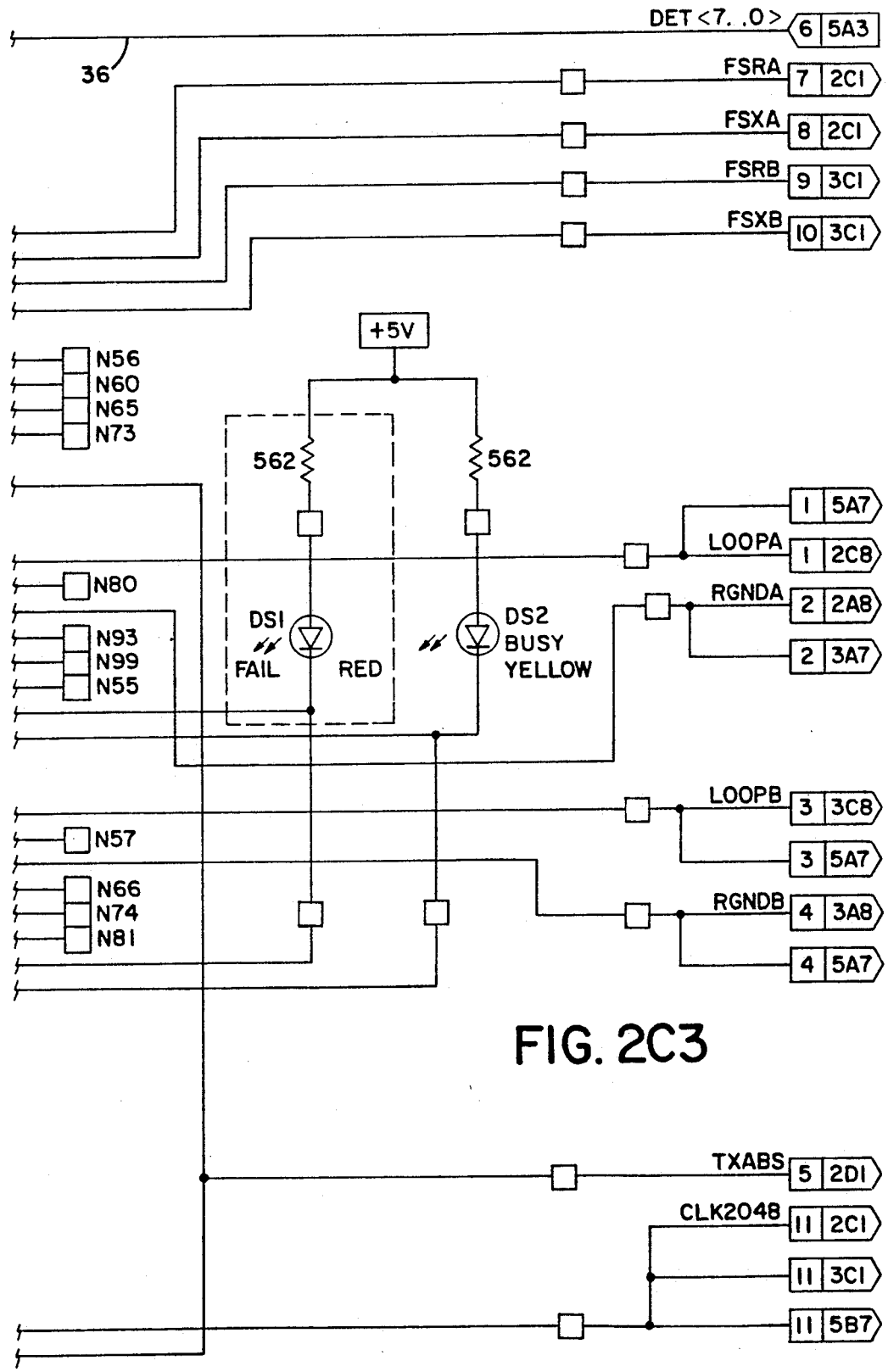
FIG. 2C3

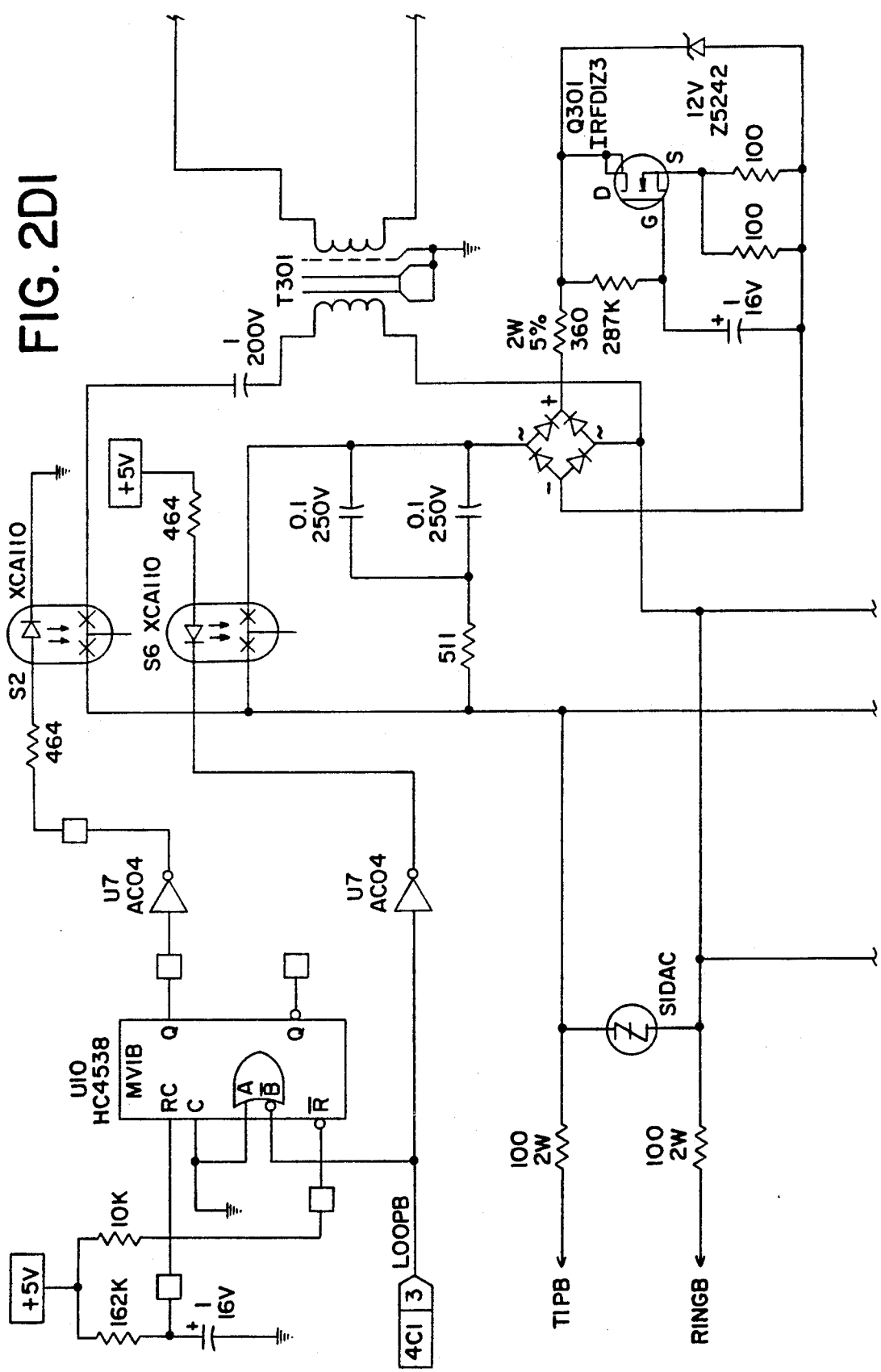
FIG. 2D1

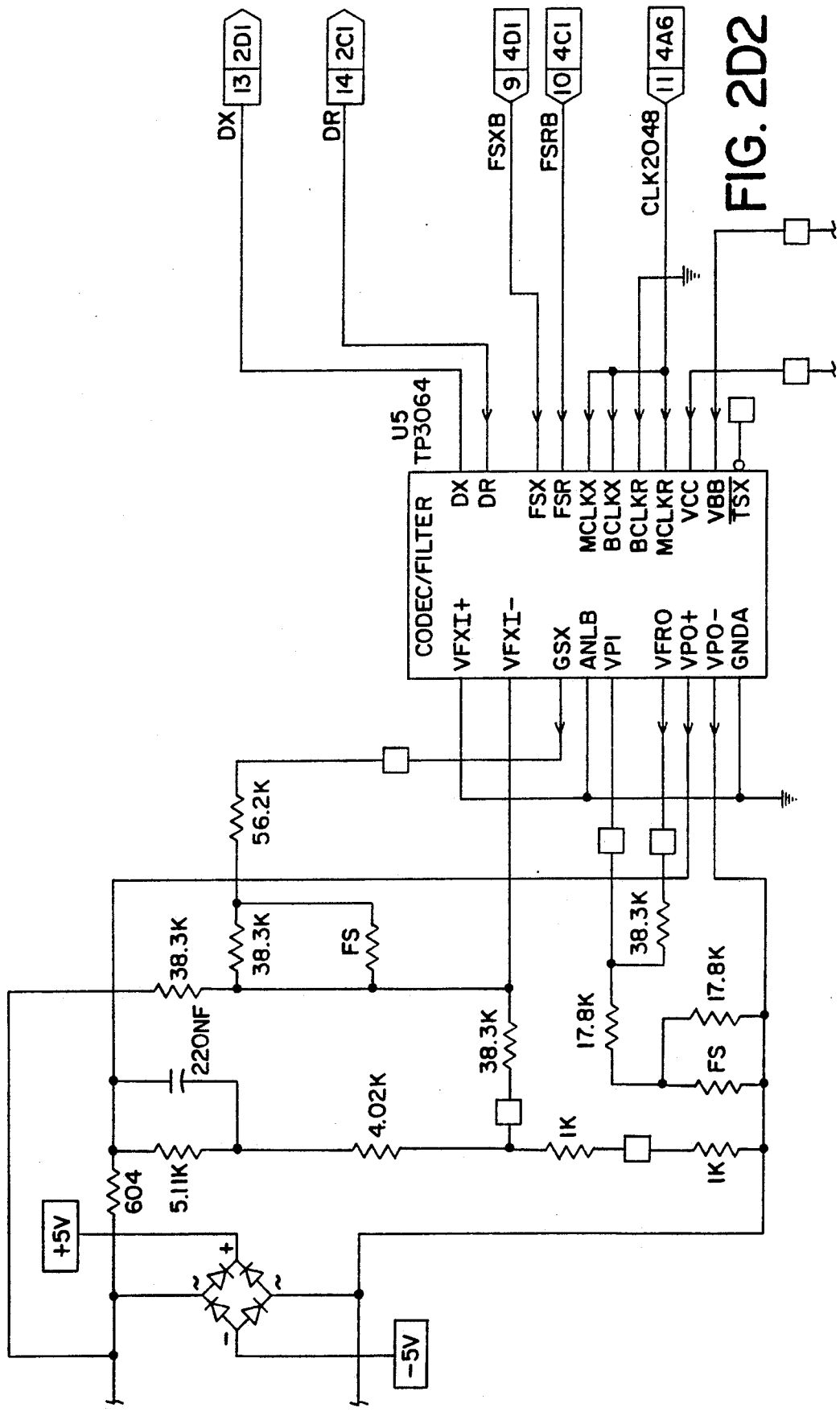
FIG. 2D2

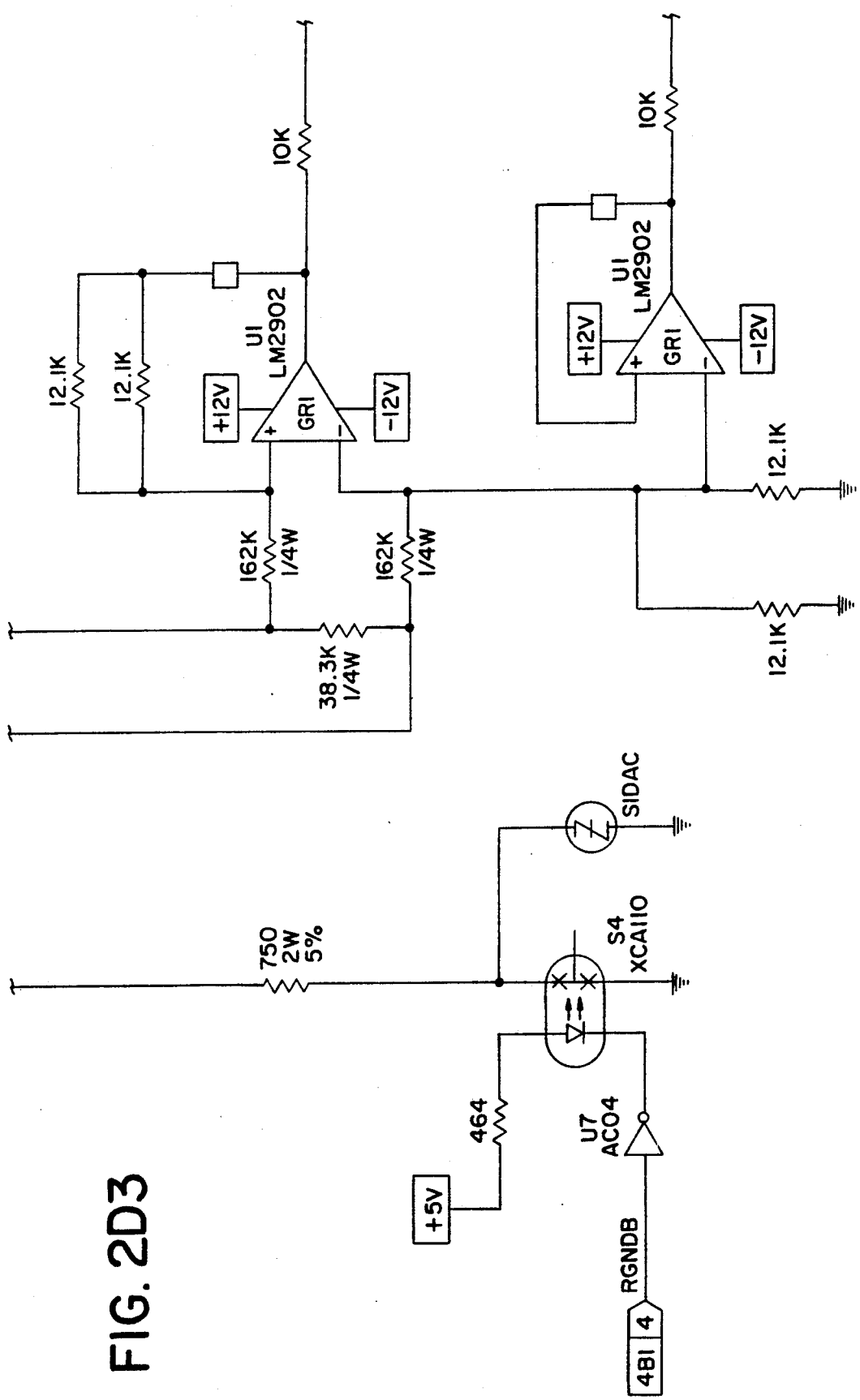
FIG. 2D3

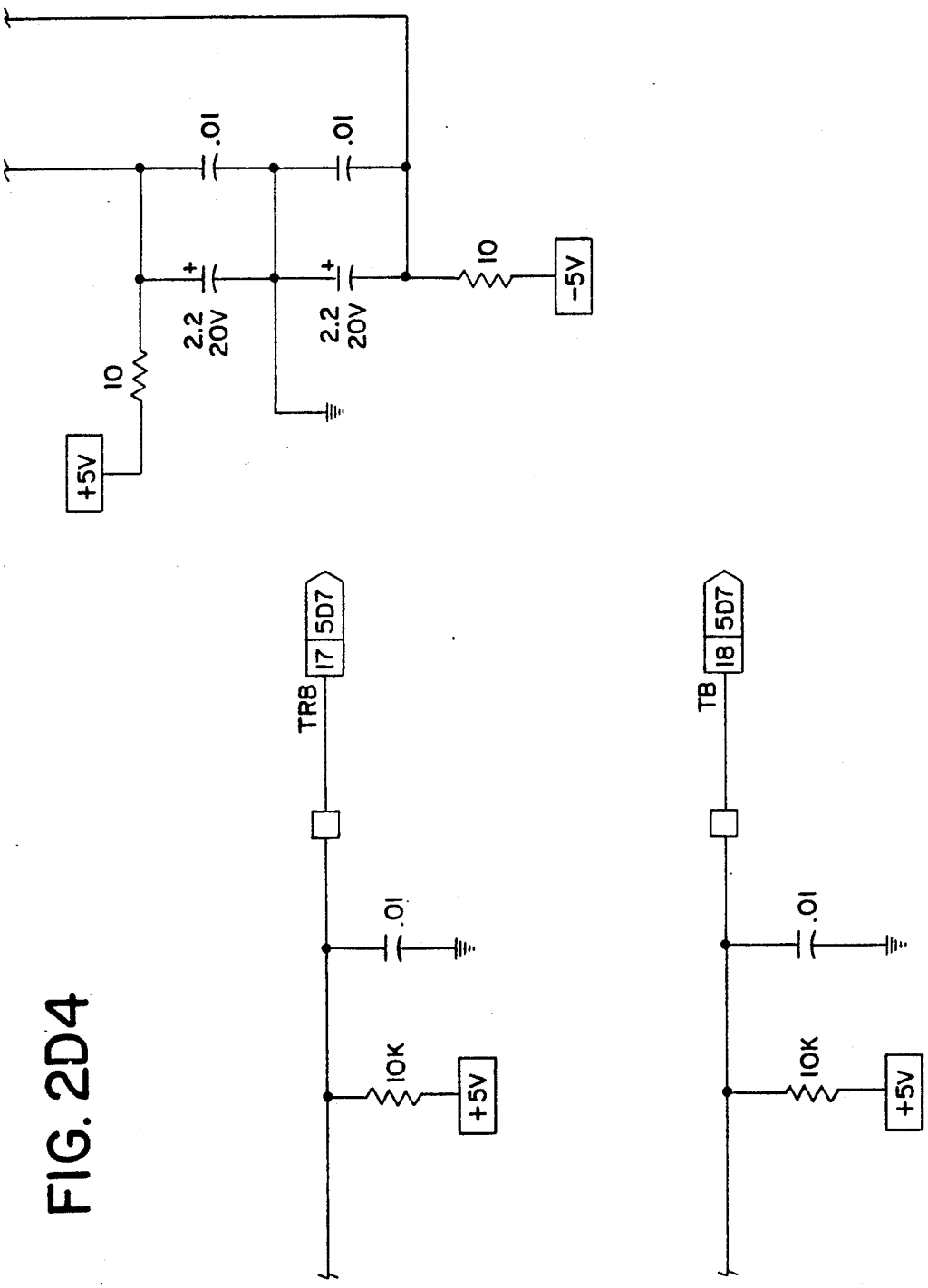
FIG. 2D4

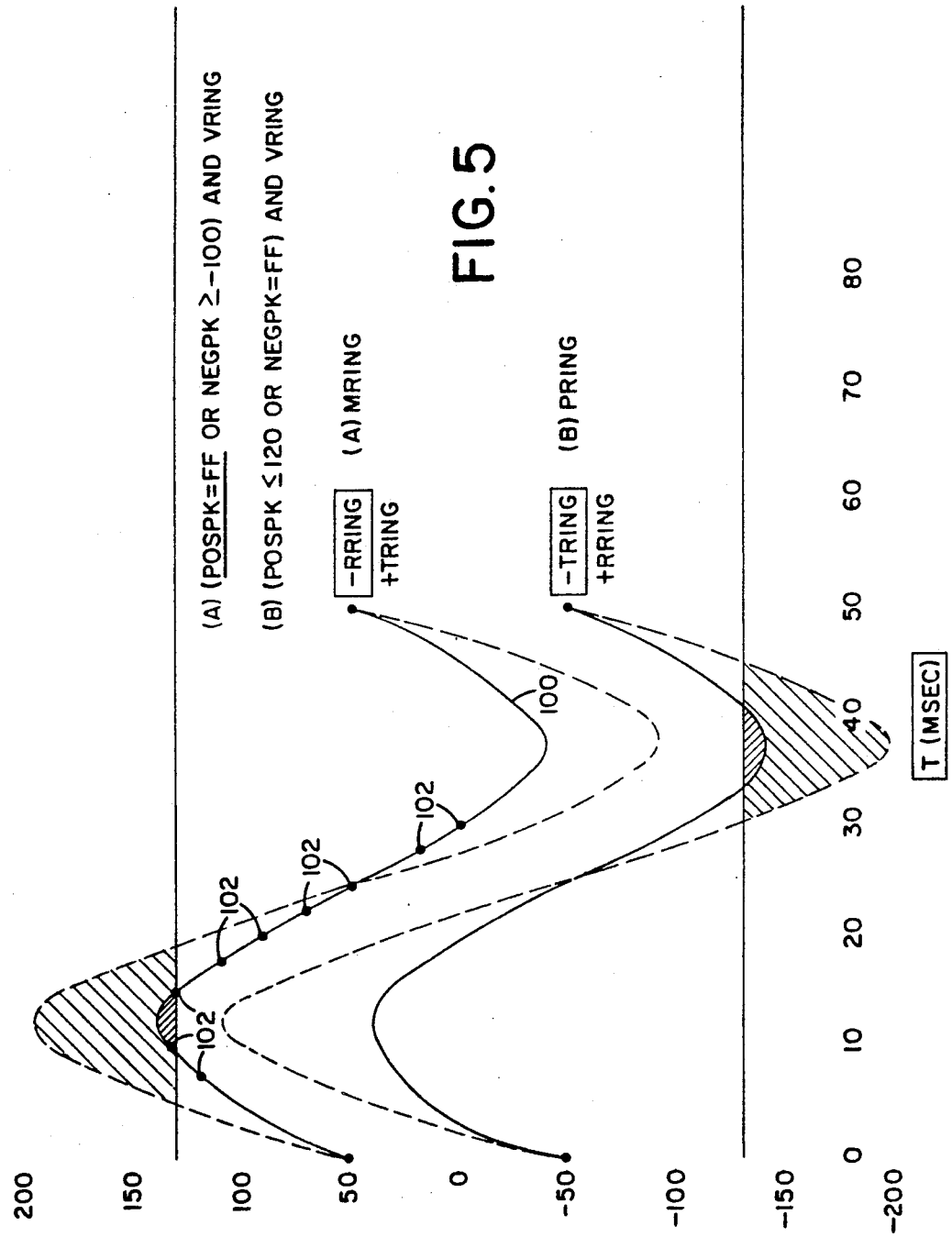

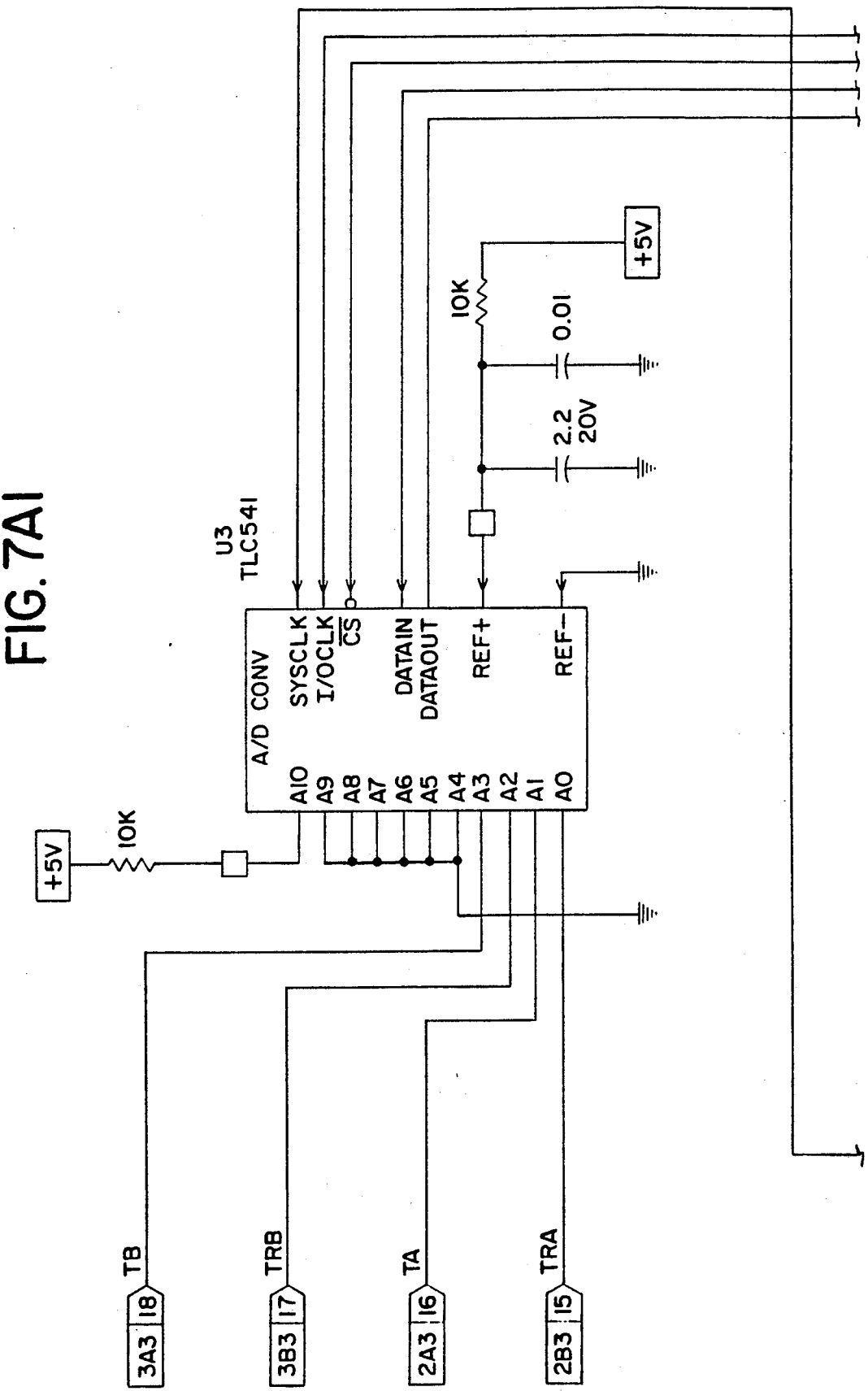
FIG. 7A1

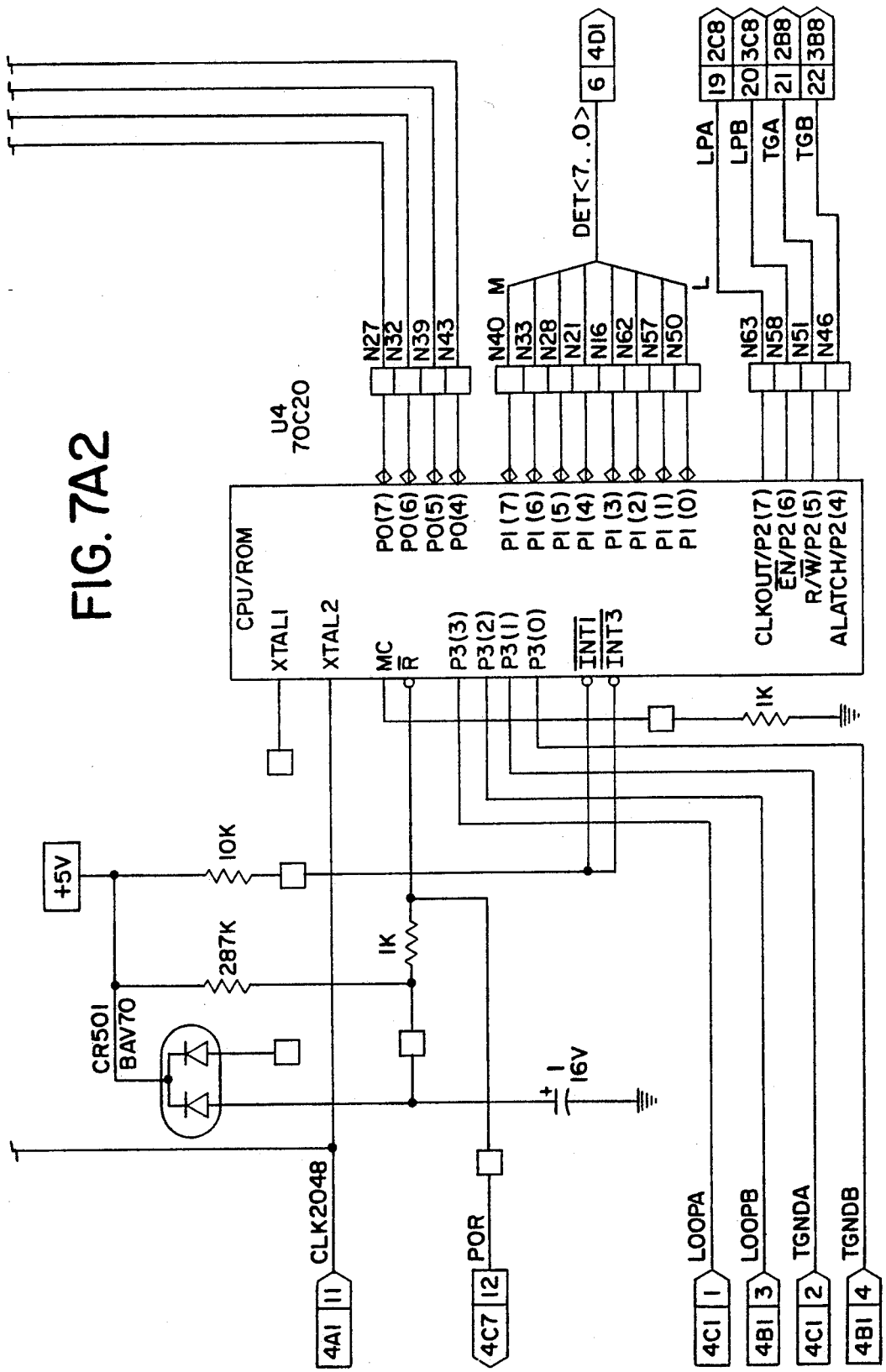
FIG. 7A2

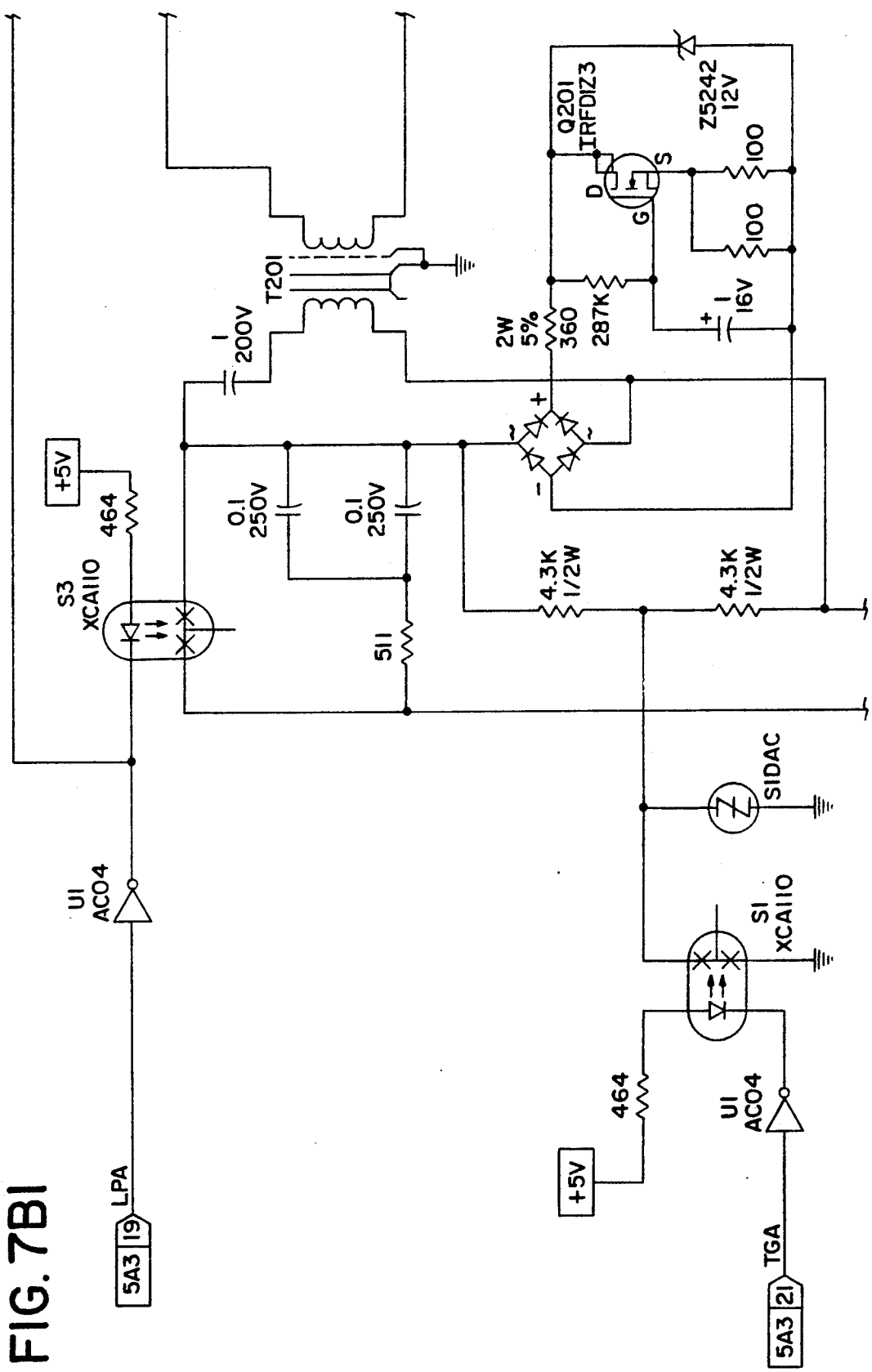
FIG. 7B1

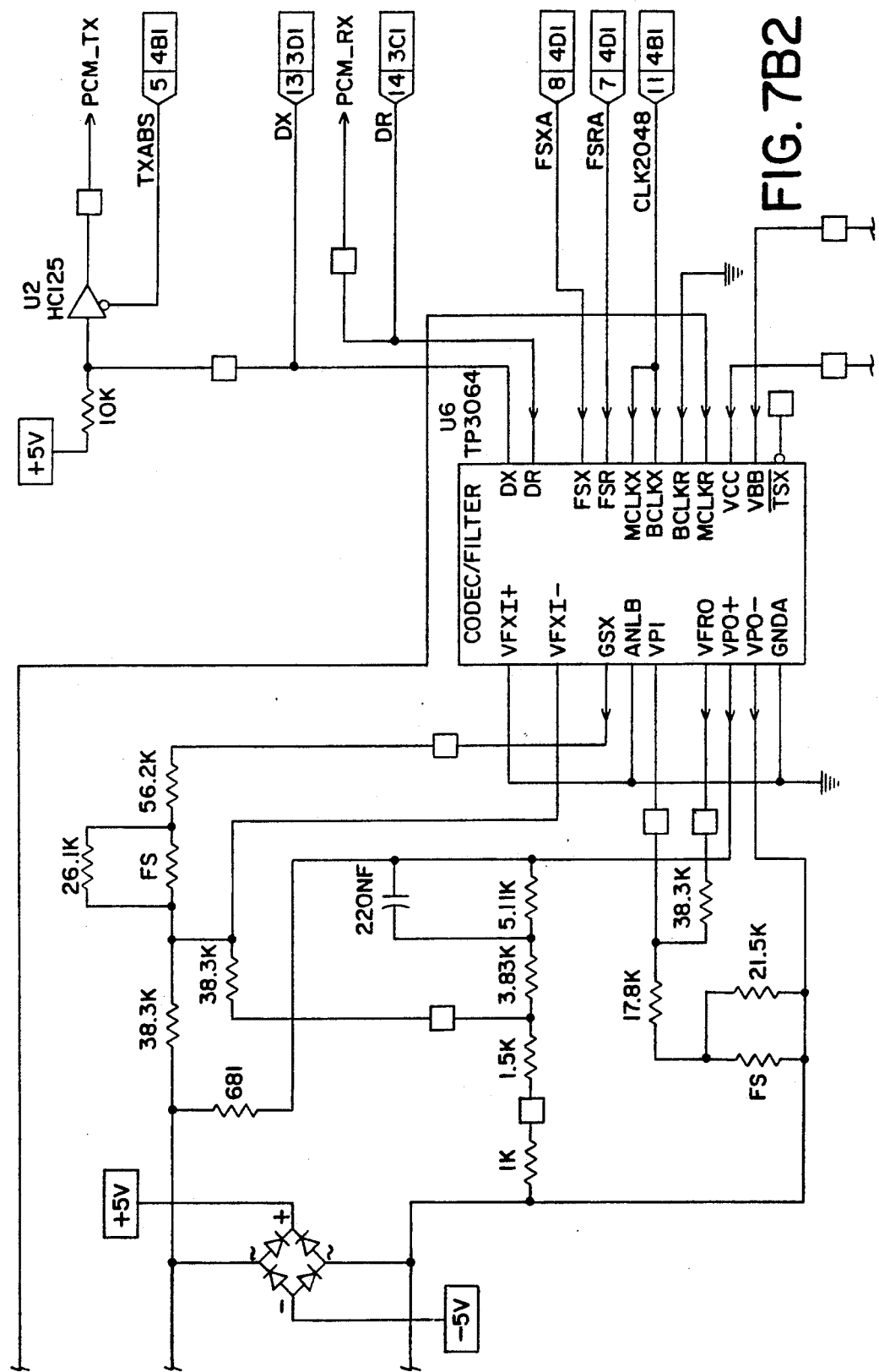
FIG. 7B2

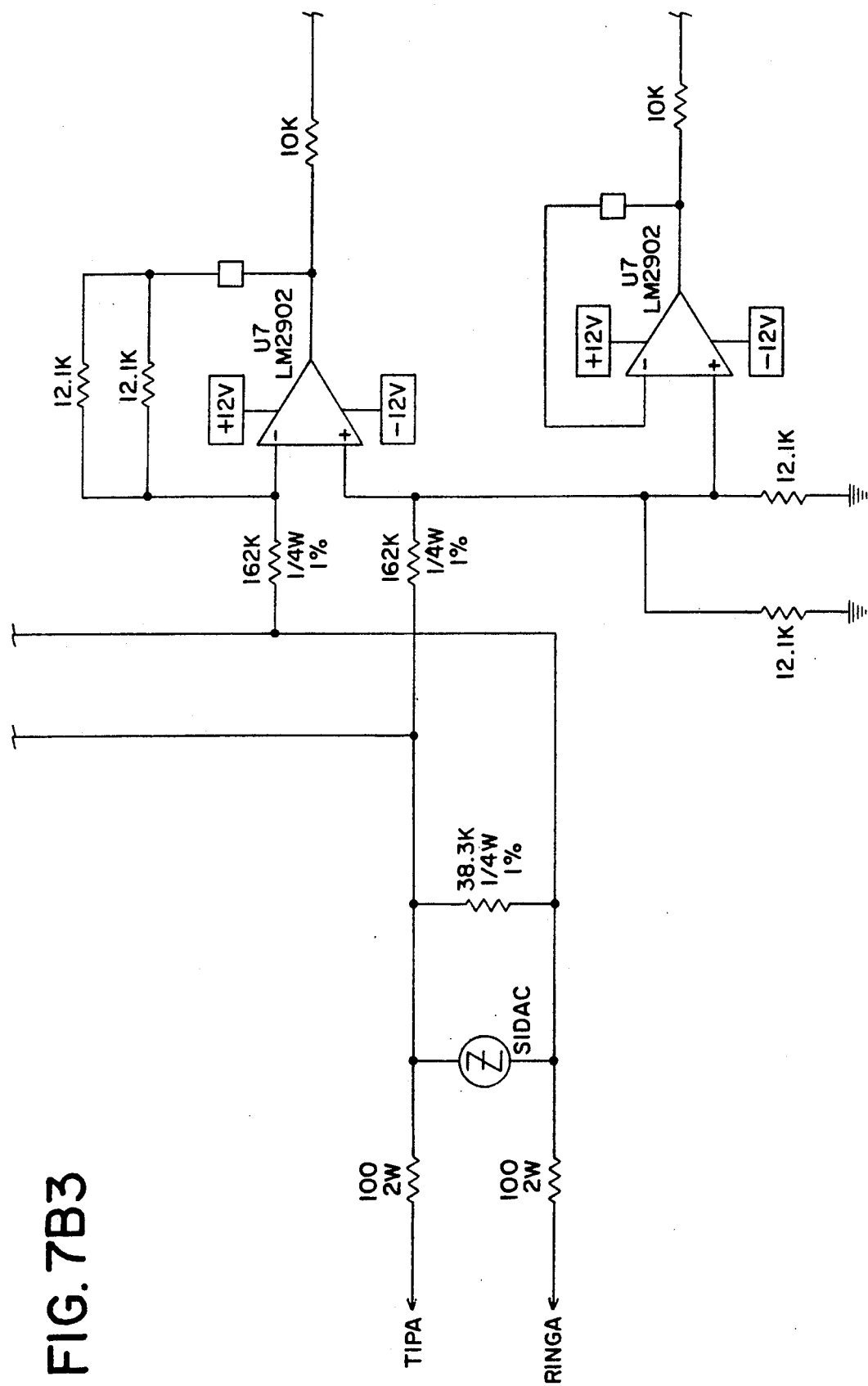
FIG. 7B3

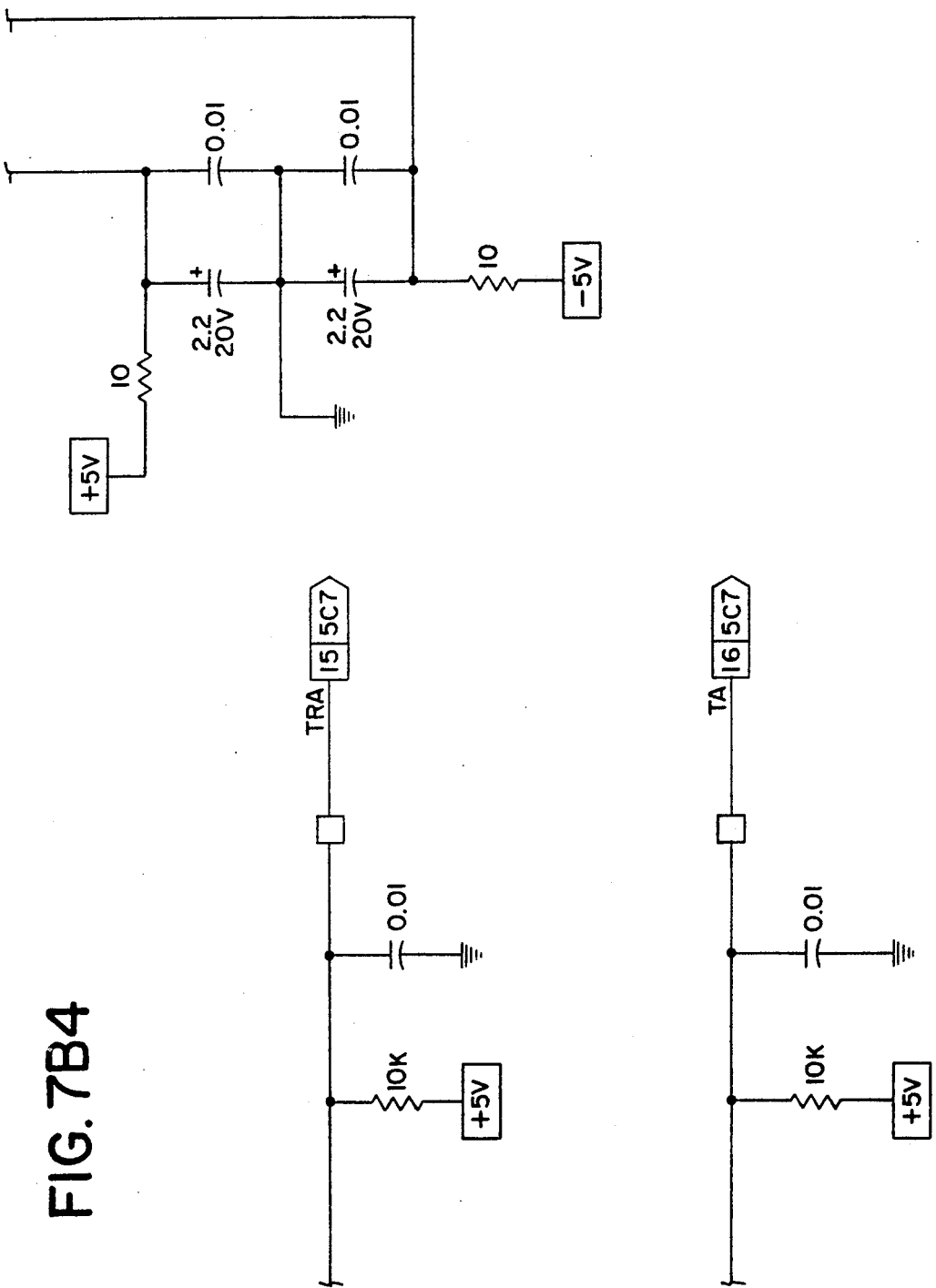
FIG. 7B4

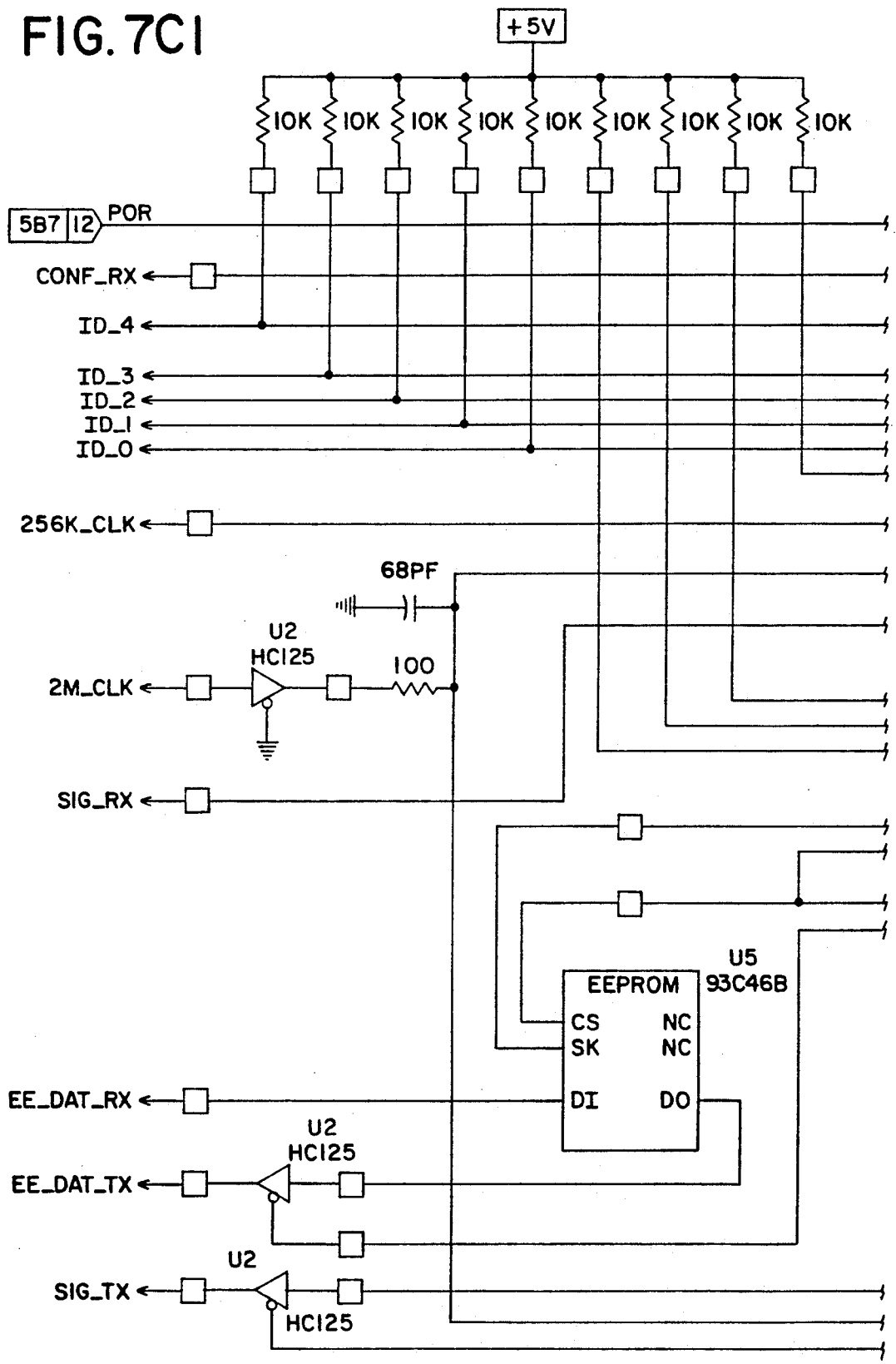
FIG. 7C1

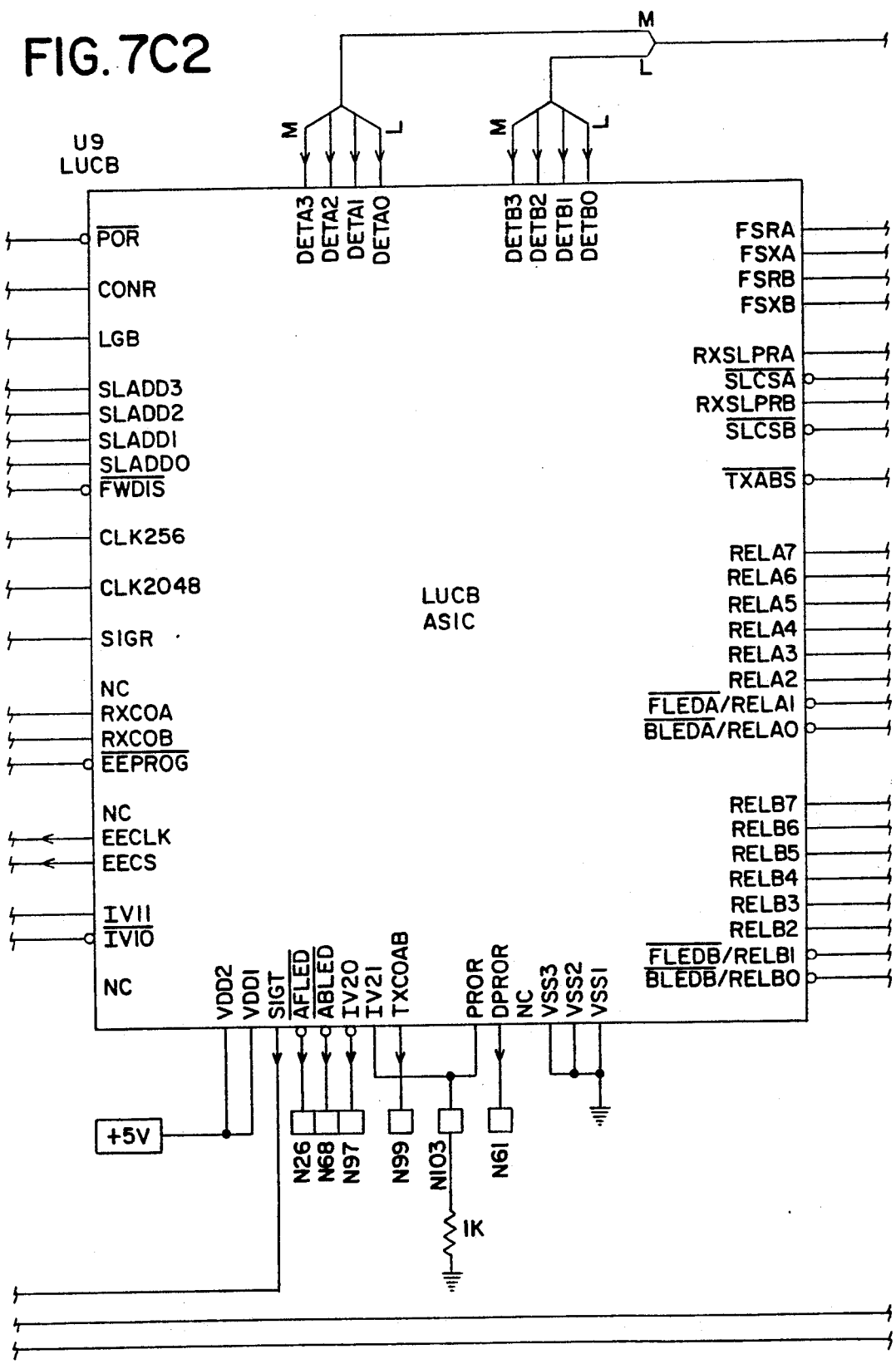

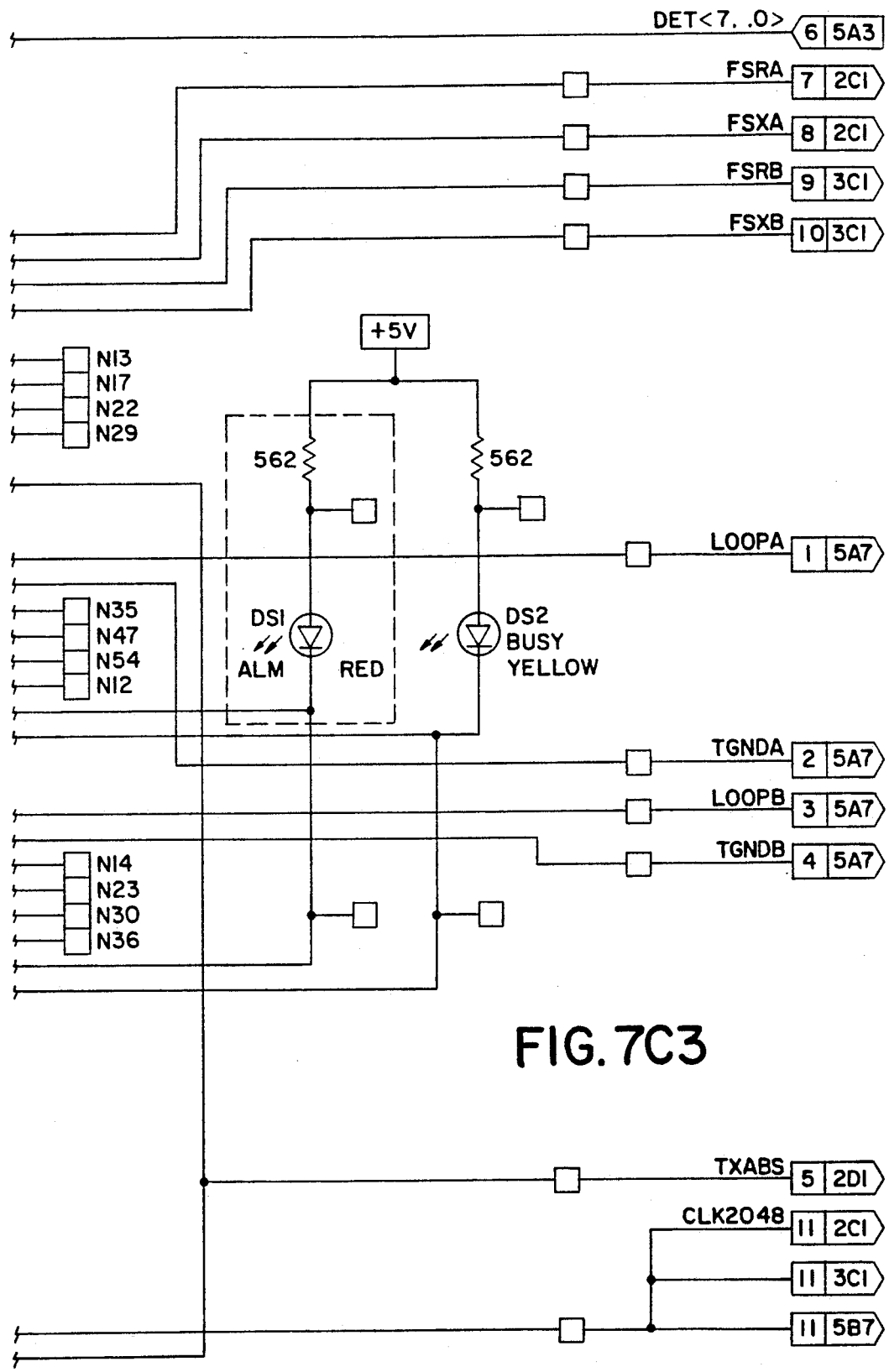
FIG. 7C3

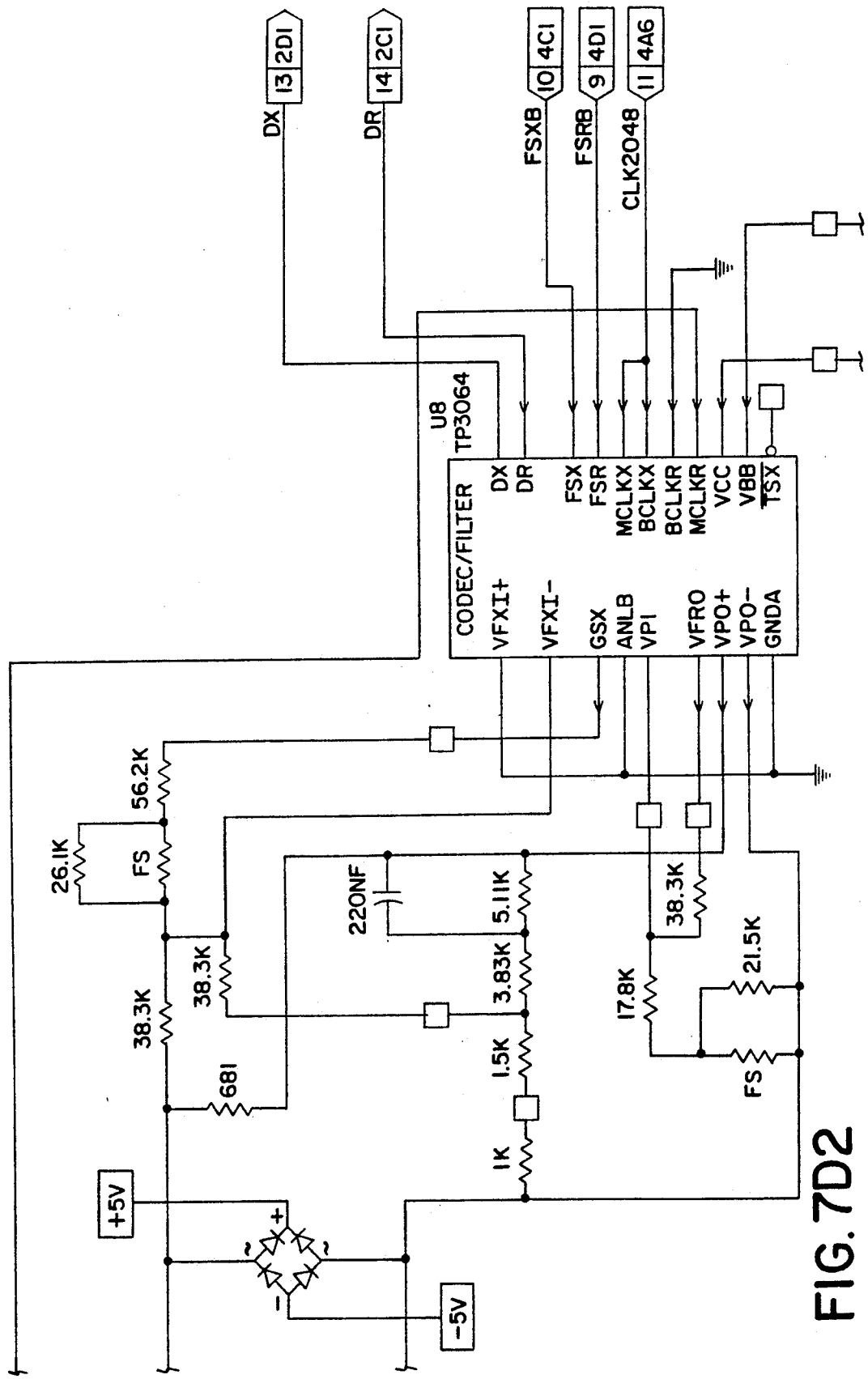
FIG. 7D2

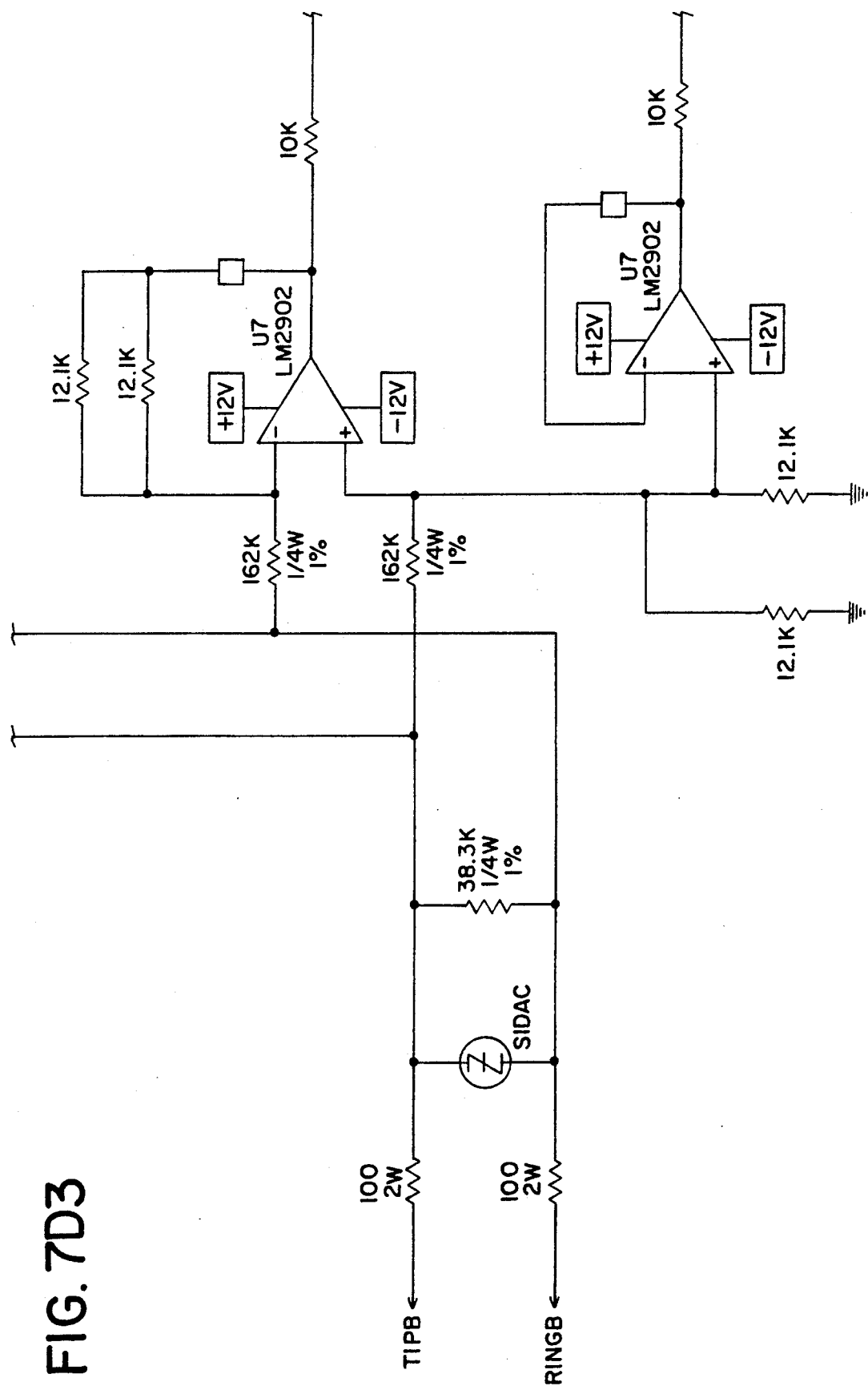
FIG. 7D3

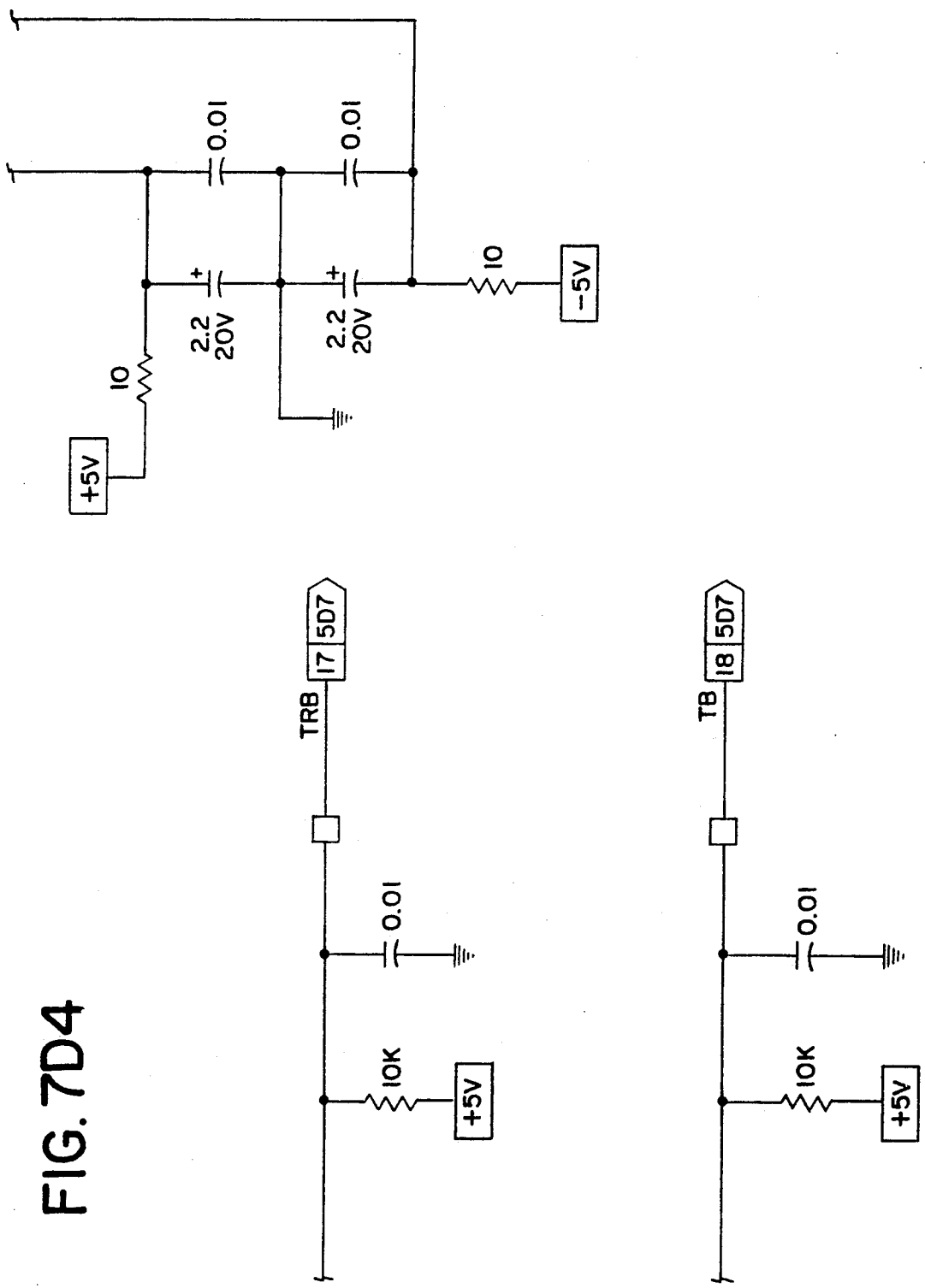
FIG. 7D4

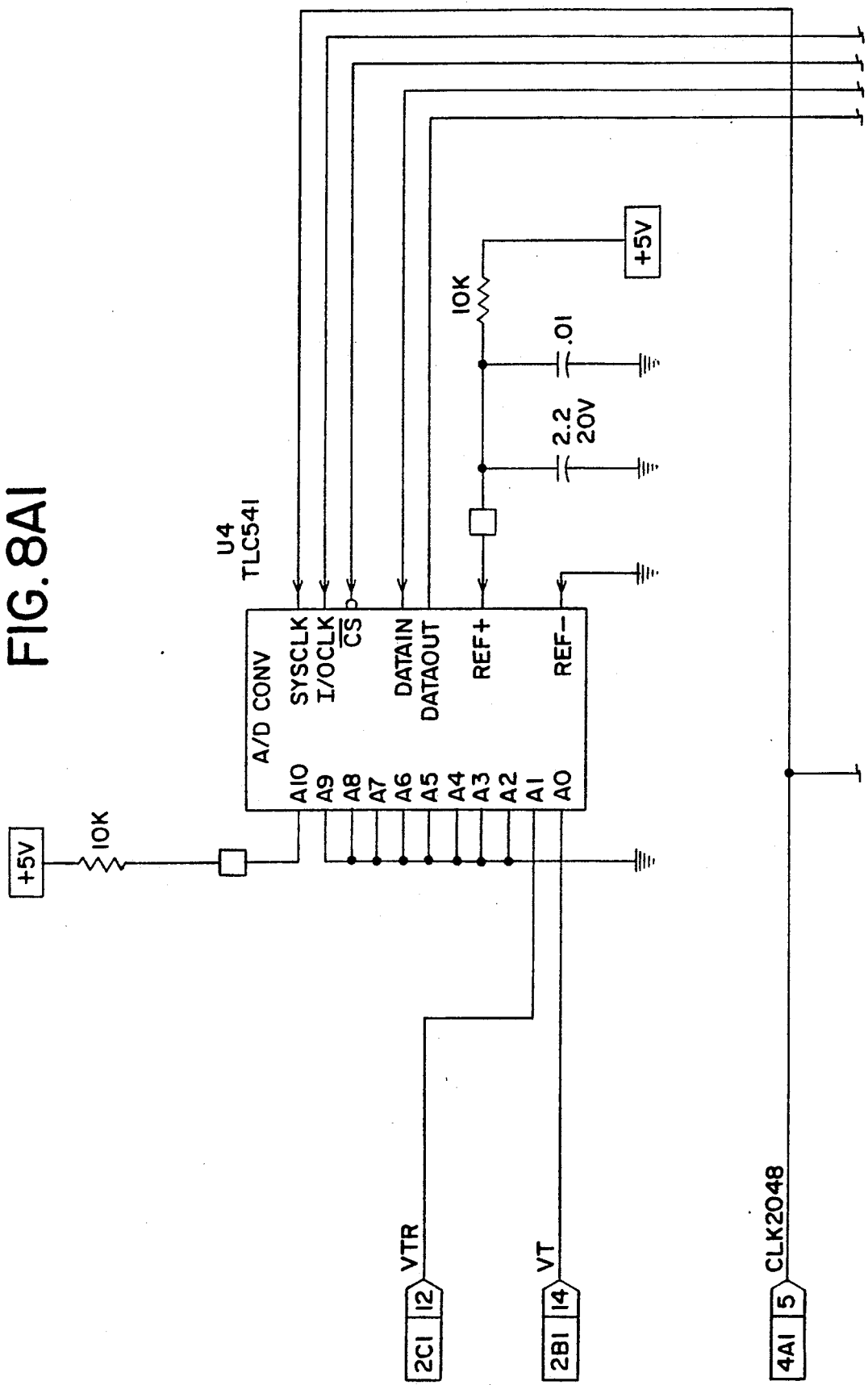

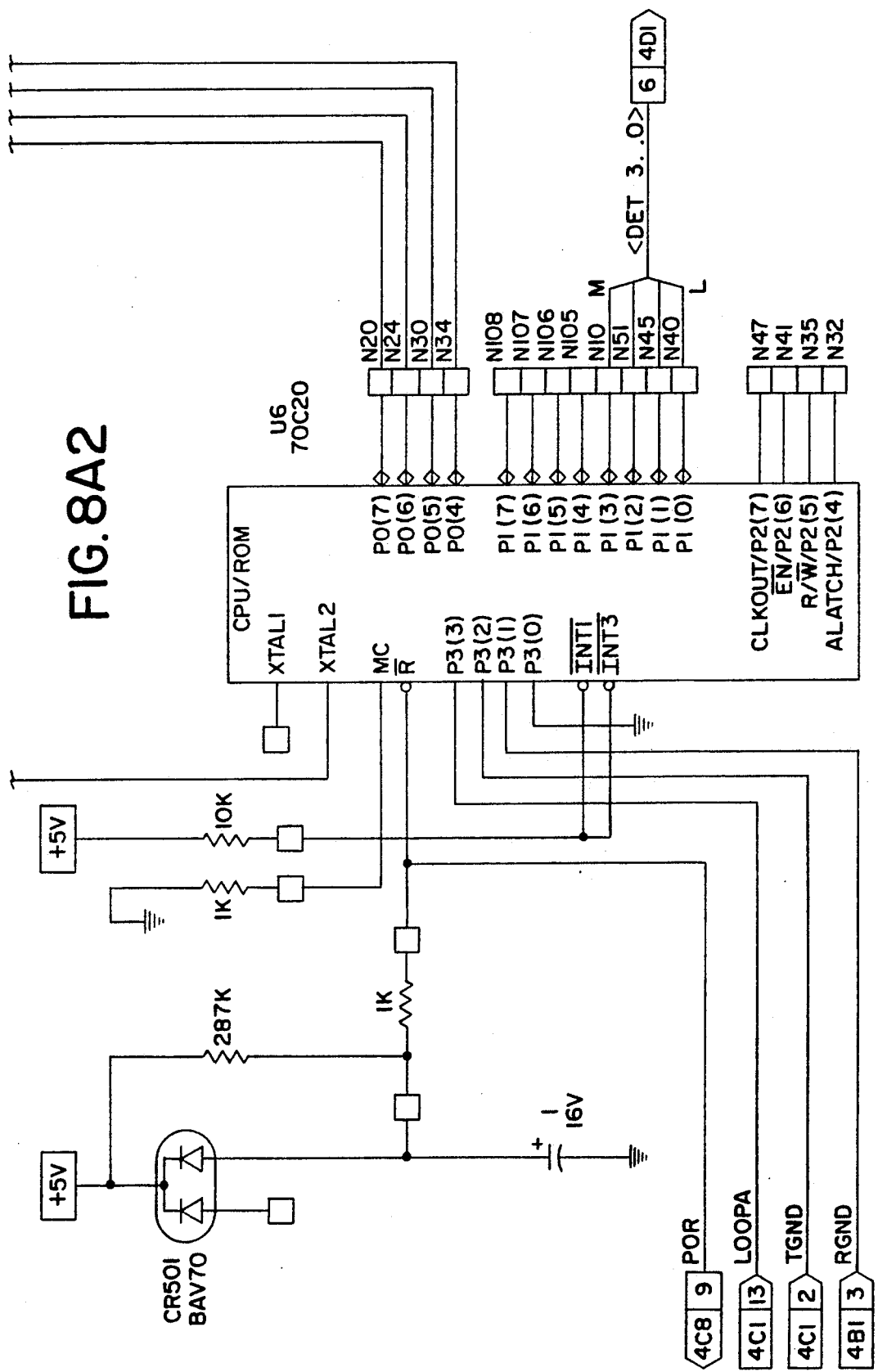

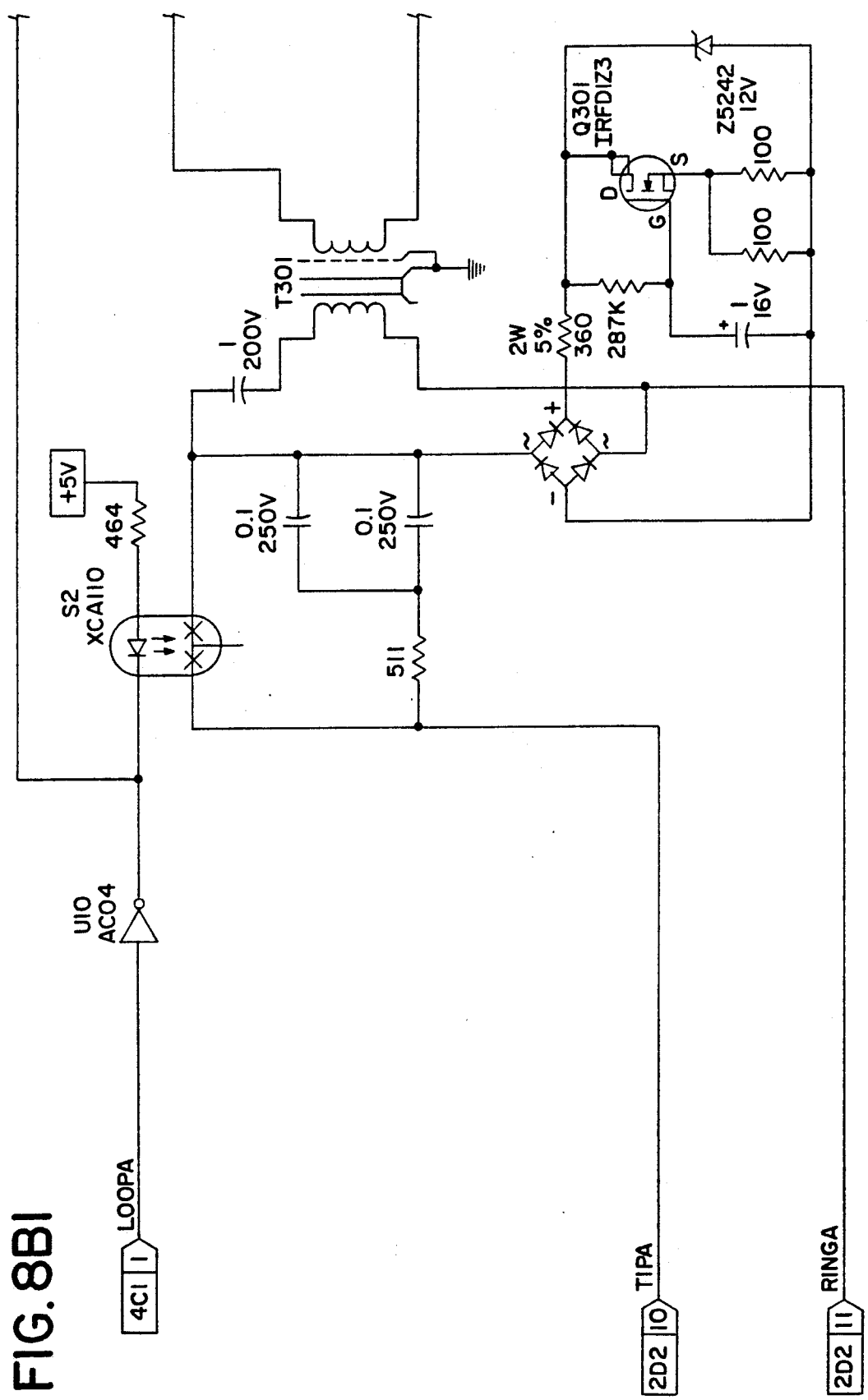
FIG. 8B1

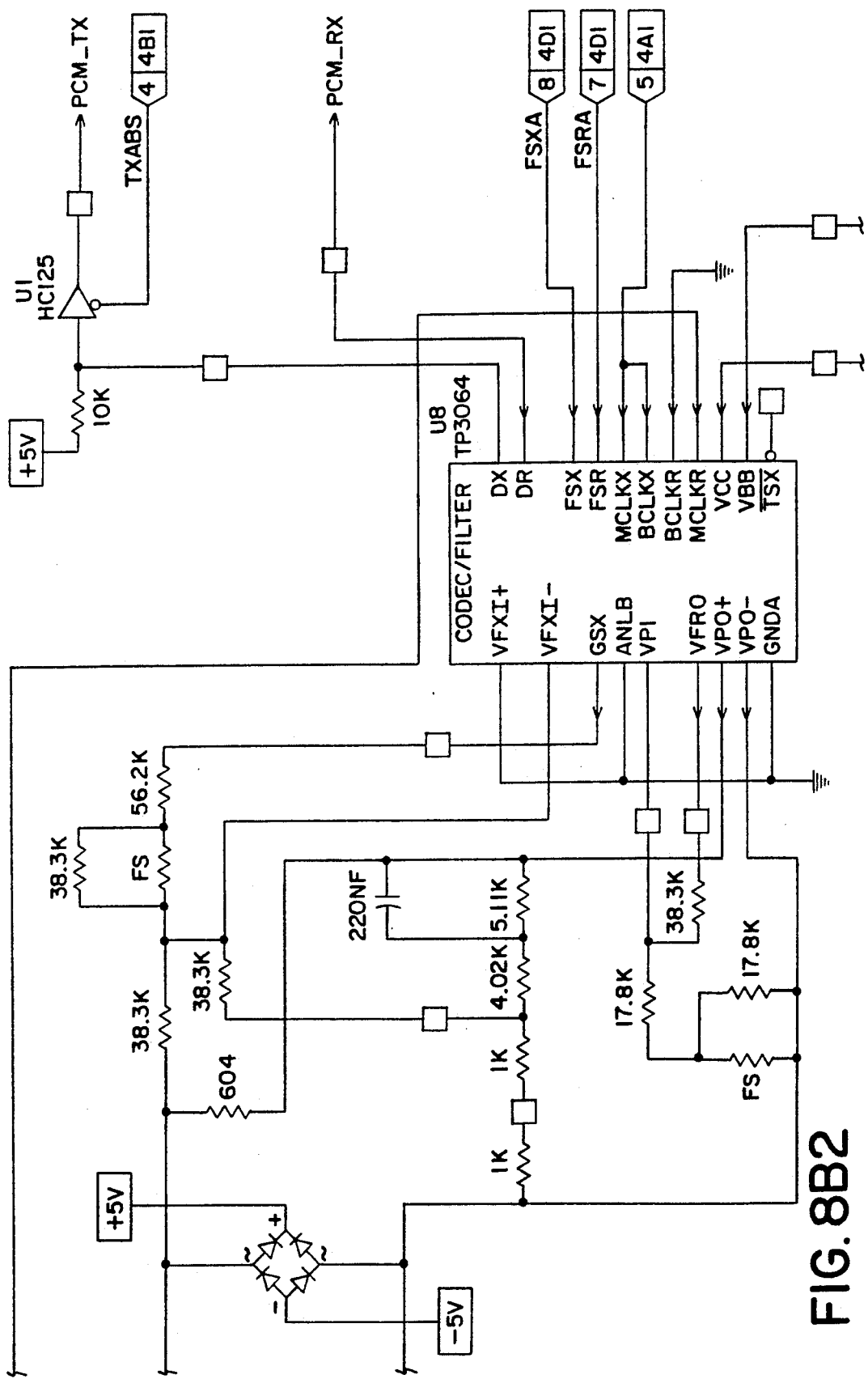
FIG. 8B2

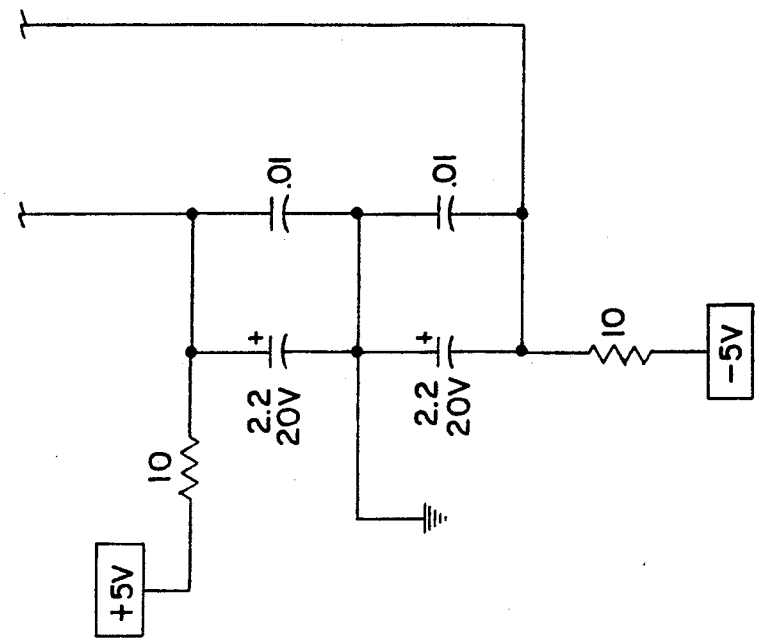
FIG.8B3

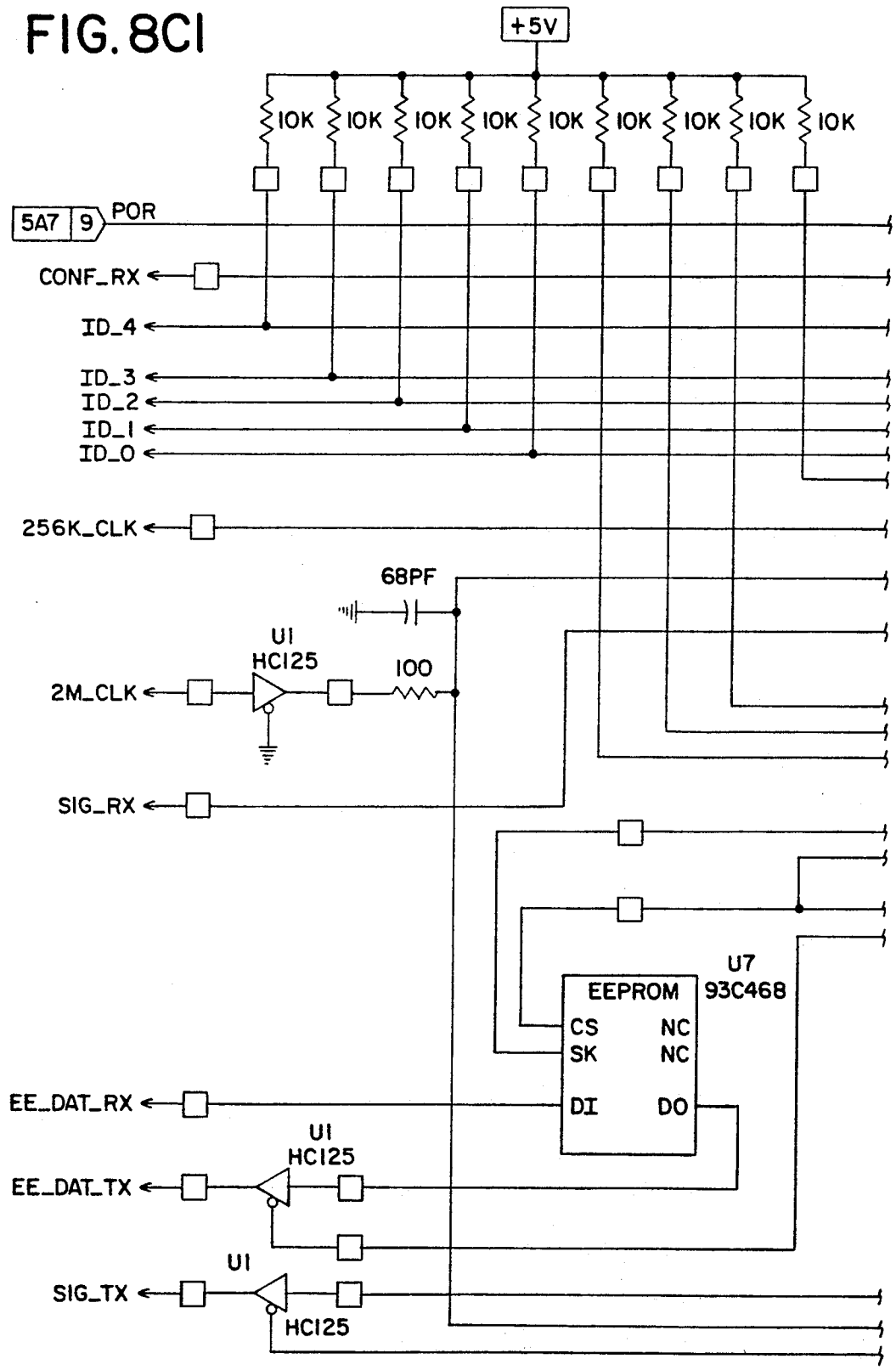

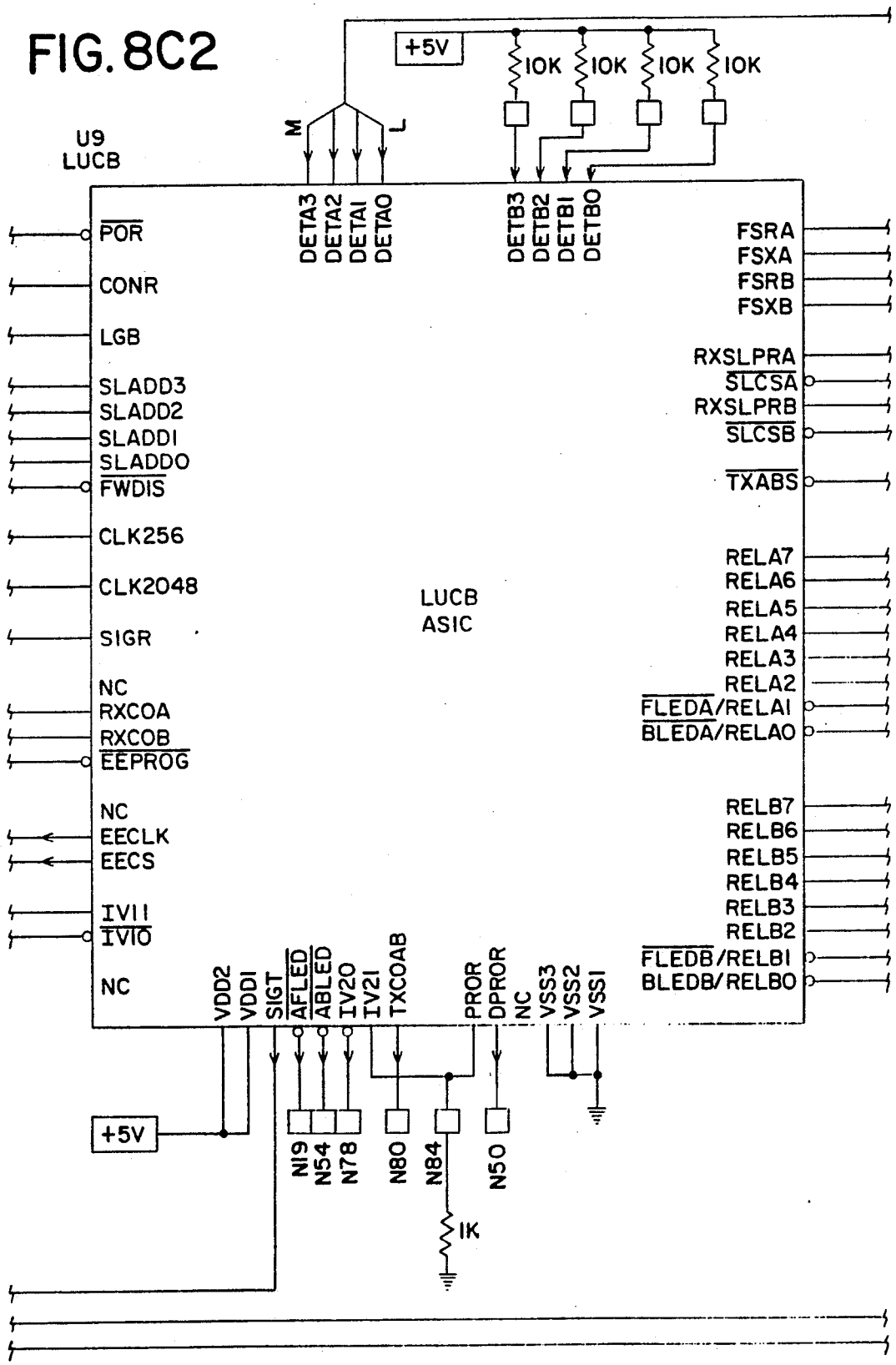

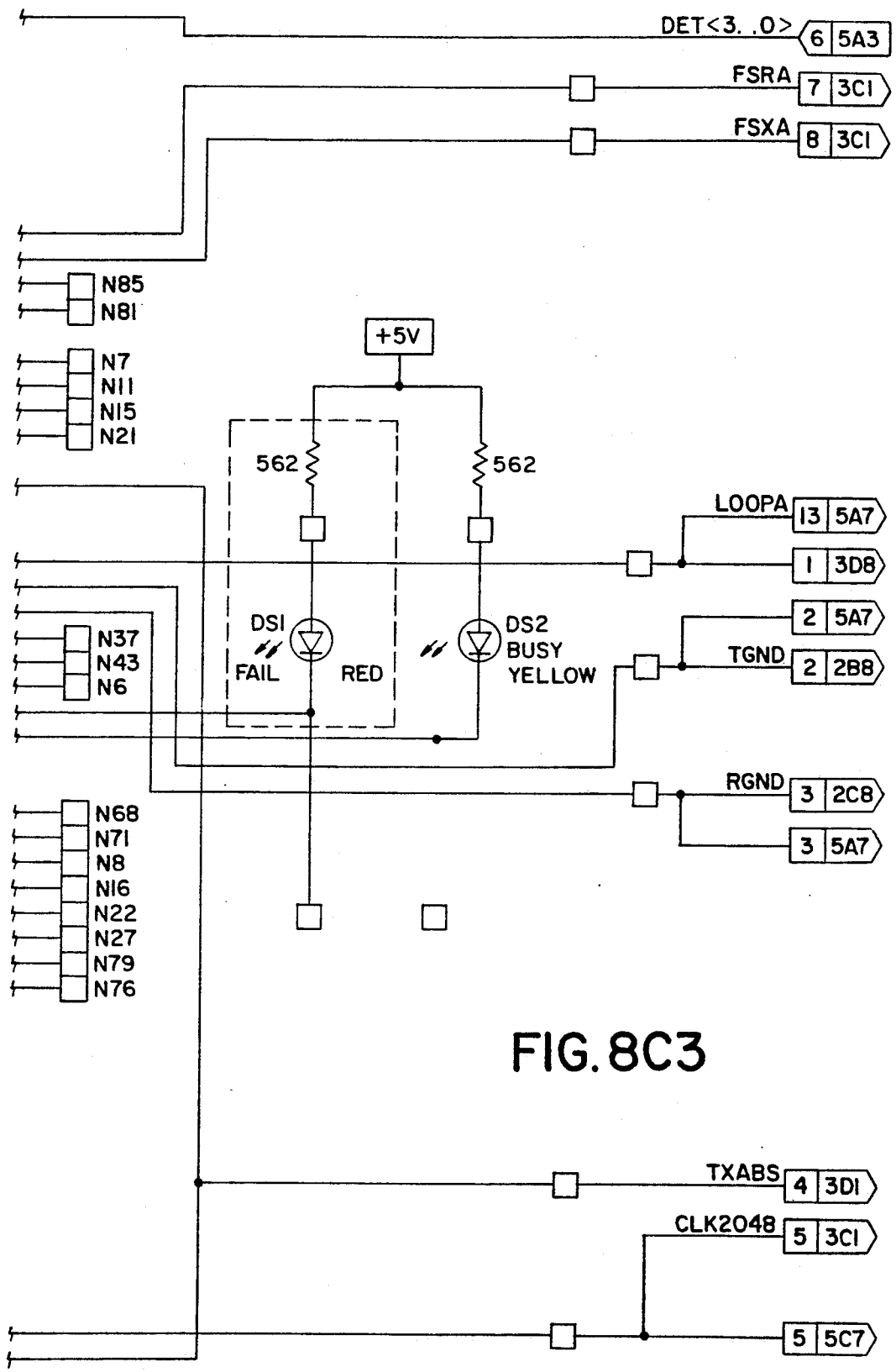
FIG. 8C3

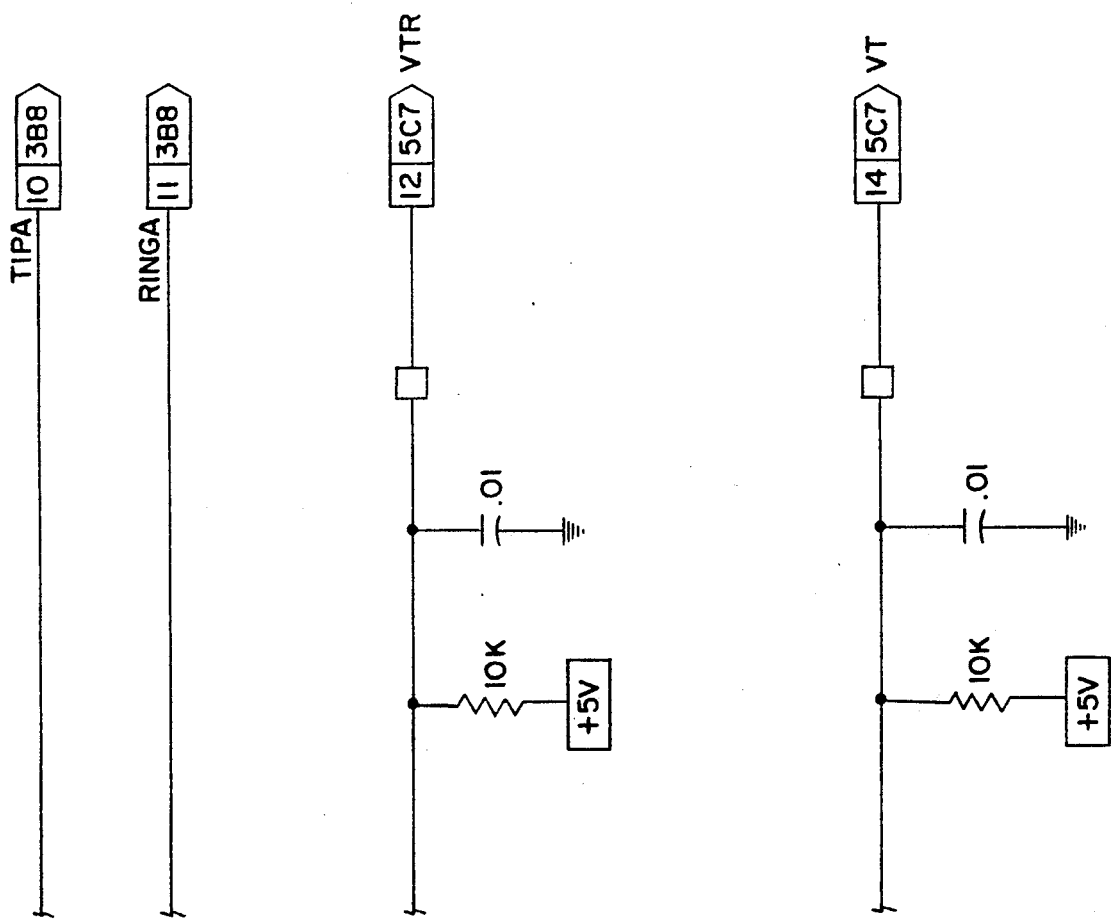
FIG. 8D2

APPARATUS AND METHOD TO DETECT TELEPHONY SIGNALING STATES

TECHNICAL FIELD

This invention relates to apparatus and methodology for detecting signaling states associated with telephony signals so as to report such detected signals to common equipment such, as a central office terminal. Specific implementation is directed to a universal voice grade/-central office terminal line card, a two-party divided/-central office terminal line card and a coin/central office terminal line card.

BACKGROUND ART

Subscriber lines associated with end user voice grade telephones, two-party divided analog subscriber telephones and coin operated public telephones terminate at a central office terminal by means of what are commonly referred to as line cards. Such lines cards typically provide two-wire loop-start or ground-start service in a carrier serving area environment. Such a line card may be used for plain old telephone subscriber service (POTS) or for loop-start or ground-start private branch exchange (PBX) service.

The signaling states associated with such subscriber lines have previously been detected through use of discrete analog circuitry and then encoded using bit-map detectors as dictated by signaling bus width. For instance, if six detector states are to be detected and if there are four signaling lines in the signaling bus, then encoding of the six possible states must be performed with corresponding decoding at the other end. For designs requiring more signaling states (signaling states are also referred herein as detectors) than the signaling bus width, the added cost and printed circuit board area associated with such encoders can quickly become prohibitive.

The present invention provides an alternative approach to signaling detection and uses a microcomputer in association with an analog to digital (A/D) converter and an analog front-end circuit to reduce the cost and space requirement to implement these signaling detection functions. The actual detection parameters are controlled by firmware residing within a microcomputer.

The detection circuit and routines employed therein can be used to detect virtually any telephony signaling state in a manner which can be easily modified or augmented as different signaling states are desired for purposes of detection. In addition, the detection circuit requires a limited amount of circuit board area for implementation which is independent of the type and number of signaling states to be detected.

SUMMARY OF THE INVENTION

A detection circuit for detecting telephony signaling states from interconnected subscriber lines. The detection circuit uses a microcomputer and an associated analog-to-digital converter (A/D) to monitor the central office subscriber lines and to determine the signaling state present. The circuit is multiplexed to allow a common detection circuit for both central office subscriber lines normally associated with a single line card. The inputs to the A/D come from amplifier circuits which are connected to the central office subscriber lines. The microcomputer reads digitized data samples from the A/D and determines the signaling state present. The signaling states to be detected can vary due to the type of line card in which the detection circuit is associated. For a universal voice grade/central office terminal (UVG/COT) line card, the detection circuit can detect application of ringing voltage, absence of loop power (tip lead open or forward disconnect), initiation of mechanized loop test (MLT), battery reversal, and tip lead ground from the central office for both conventional or floating battery applications.

For a two party divided/central office terminal (2PD/COT) line card, the following signaling states can be detected: forward disconnect, open switching interval, -R ringing, -T ringing, MLT, idle, and automatic number identification (ANI).

For a coin/central office terminal (COIN/COT) line card, the following states can be detected: forward disconnect, open switching interval, -R ringing, MLT, idle, positive loop supervision, negative coin check, positive coin check, negative coin control, and positive coin control.

In all embodiments of the present invention, the detection circuit, after detection of the signaling state, encodes the information and ports it from the microcomputer to an associated line unit controller (LUC). The LUC then outputs the encoded information to common equipment via the signaling bus.

The microcomputer associated with the detection circuit contains firmware which operates upon the incoming digitized data samples to determine the signaling state of the incoming information. The operation of this detection process includes an initialization procedure which initializes various interrupt registers and defines the input/output port configuration, clears the random access memory (RAM) of the microcomputer and enables a timer interrupt so as to provide an interrupt every four milliseconds.

A timer interrupt service routine then performs the following functions:
1) obtains the raw digitized data samples from the A/D and filters the samples as required,
2) determines the signaling state represented by the incoming digitized data samples, and
3) outputs the detected signaling states to the associated LUC.

A slope detection routine is used for ring detection while voltage level comparison is used for other signaling state detection. Due to the fact that the signaling state detection is performed on digitized data samples, the signaling states to be detected for a particular line card can be easily changed by modification of the associated firmware stored within the microcomputer. As a result, the signaling state detection for any given line card is accomplished with the same circuitry; thereby minimizes the amount of printed circuit board area required for the detection process regardless of the number of signaling states which must be tested.

OBJECTS OF THE INVENTION

It is therefore a principal object of the present invention to provide a detection circuit and method for detecting signaling states associated with telephony signals by digitizing the incoming telephony signal, digitally filtering the digitized data samples, analyzing the filtered digitized data samples to determine one of a plurality of signaling states, and outputting encoded information identifying the detected signaling state.

A further object of the present invention is to provide a detection circuit of the above character for use in line cards associated with various types of subscriber line service wherein the detection circuit associated with each type of line cards remains the same with the different signaling states required for detection being detected by modification of the firmware associated with a microcomputer forming part of the detection circuit.

Another object of the present invention is to provide a detection circuit of the above description in which a ringing signaling state is detected by determining the slope of successive digitized data samples and if the polarity of the determined slope remains the same for successive slope determinations so as to detect a ringing signal if a predetermined number of slope determinations are of the same polarity and are each greater than a predetermined value.

A still further object of the present invention is to provide a detection circuit of the above description which forms part of a telephony line card.

Other objects of the present invention will in part be obvious and will in part appear hereinafter.

BRIEF DESCRIPTION OF THE DRAWINGS

For a fuller understanding and nature and objects of the present invention, reference should be made to the following detailed description taken in connection with the following drawings, in which:

FIG. 1, comprising FIGS. 1A and 1B is a block diagram of a universal voice grade/central office terminal (UVG/COT) line card incorporating the detection circuit of the present invention and showing the interconnection of the tip and ring leads from the central office interface with circuitry associated with the detection circuit as well as the output detection states generated by the detection circuit as communicated to the line unit controller (LUC) forming part of the line card. This block diagram is also generally applicable to the two-party divided/central office terminal (2PD/COT) line card and the coin/central office terminal FIG. 2 comprising FIGS. 2A1-2A2 for FIG. 2A, FIGS. 2B1-2B4 for FIG. 2B, FIGS. 2C1-2C3 for FIG. 2C and FIGS. 2D1-2D4 for FIG. 2D, comprising FIGS. 2A-2D is a detailed schematic of the line card, including the detection circuit, shown in FIG. 1.

FIG. 5 shows a waveform for a typical incoming ringing signal.

BEST MODE FOR CARRYING OUT THE INVENTION

Overview

FIG. 1 illustrates a block diagram of a universal voice grade/central office terminal (UVG/COT) line card 20 which incorporates a detection circuit 22 according to the present invention. This block diagram also illustrates the overall modules associated with a two-party divided/central office terminal (2PD/COT) and a coin/central office terminal (COIN/COT) line card. Regardless of the line card type, the detection circuit hardware 22 is the same, with the only difference in the firmware associated with microcomputer 26.

Figure 7D:
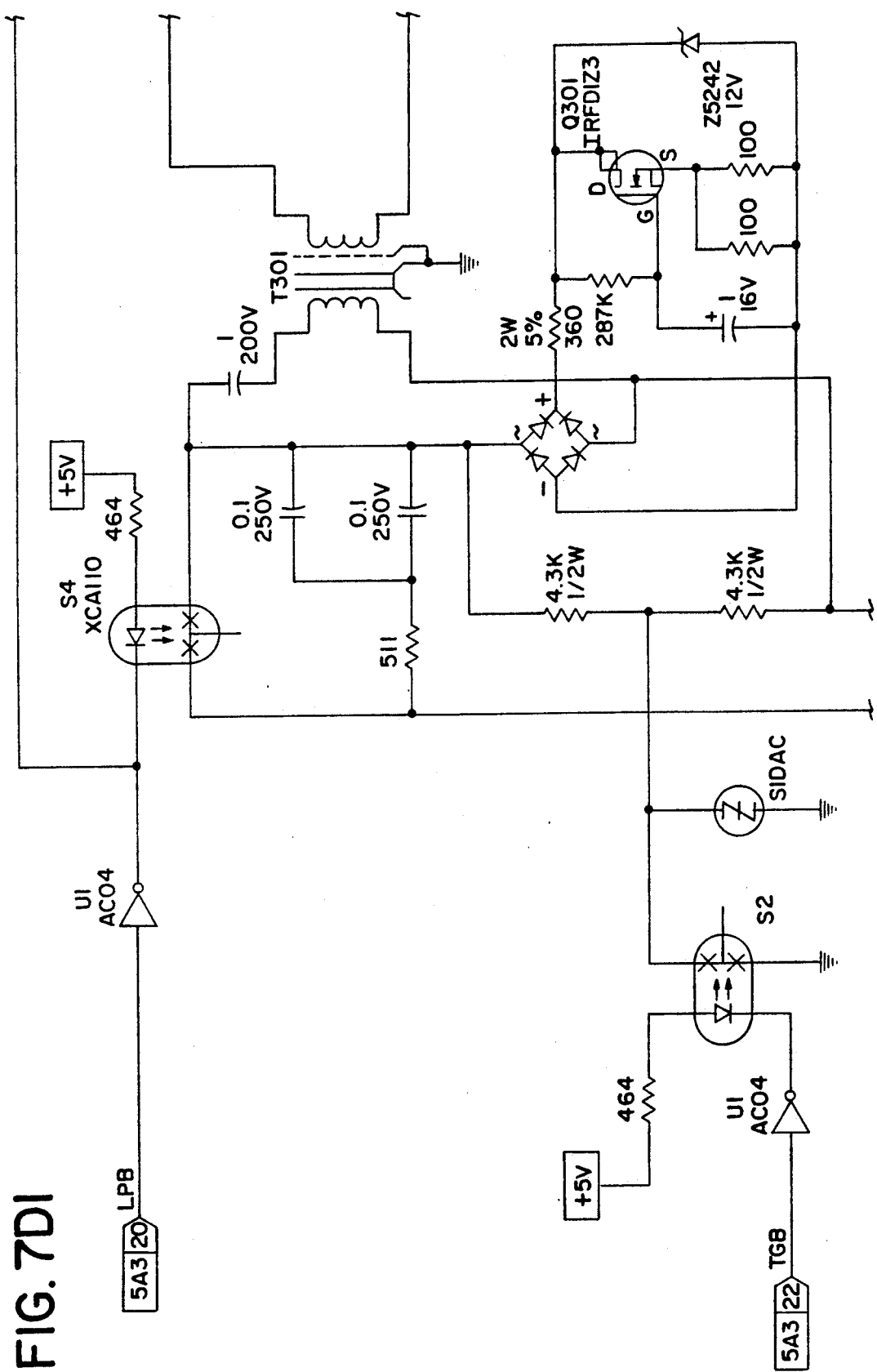
FIG. 7 comprising FIGS. 7A-7D, comprising FIGS. 7A1-7A2 for FIG. 7A, FIGS. 7B1-7B4 for FIG. 7B, FIGS. 7C1-7C3 for FIG. 7C, and FIGS. 7D1-7D4 for FIG. 7D, is a schematic diagram of the two-party divided/central office terminal (2PD/COT) line card.

The detailed schematic diagram for the UVG/COT line card is shown in FIGS. 2A-2D. This line card interfaces with two voice grade subscriber lines which are referenced as channel A and channel B. The interconnection of signals between these figures are identified by the first number of a three character alphanumeric string. For instance, in FIG. 2A the detector output bus 36 is output to "4D1". The number 4 refers to FIG. 2C according to the following map which also identifies the mapping for FIG. 7 directed to the two-party divided/central office terminal line card and FIG. 8 directed to the coin/central office terminal line card:

| Identifying Number | FIG. 2 | FIG. 7 | FIG. 8 |
| --- | --- | --- | --- |
| 2 | 2B | 7B | 8B |
| 3 | 2D | 7D | 8D |
| 4 | 2C | 7C | 8C |
| 5 | 2A | 7A | 8A |

FIG. 2B shows the circuitry for interfacing with the tip lead 28 (TIPA) and the ring lead 30 (RING A) of channel A. The circuitry for channel B shown in FIG. 2D is the same as for channel A except for the detection of the PCM-RX and PCM-TX signals.

The line card is intended to be located within a synchronous optical network (SONET) access line shelf and includes two identical line circuits on each card. Each line circuit provides two-wire loop-start or ground-start service in a carrier serving area environment. The line card can be used for plain old telephone subscriber service (POTS) or for loop-start or ground-start private branch exchange (PBX) service. The detection circuit 22 within the UVG/COT line card provides detection of the following signaling states 1) ringing voltage, 2) absence of loop power (that is tip lead open or forward disconnect), 3) initiation of Mechanized Loop Testing (MLT), 4) battery reversal, and 5) tip ground from the central office for conventional or floating battery applications. As seen in FIGS. 1 and 2B, the line card also provides a current sink 49 for loop current and ring ground 53 to the central office equipment. The line card in addition provides for limited protection against electrical surges and power cross (that is as applied to the central office line), as well as electronic inventory control capability and on-hook transmission.

A detailed circuit diagram of the detection circuit is shown in FIG. 2A where it is seen that it incorporates an analog to digital converter and multiplexor (A/D) 24, a microcomputer including associated program memory and random access memory 26, and associated discrete components, including resistors and capacitors.

As is seen in FIGS. 1 and 2B, detection circuit 22 monitors the central office tip and ring leads 28 and 30 as provided to the A/D converter 24 from the output of differential amplifiers 32 and 34 respectively. Similar tip and ring leads and amplifiers are also present for channel B as shown by block 27, and tip lead 28' and ring lead 30'. The detection circuit multiplexes the digitized analog signals from channels A and B and presents the digitized data samples to microcomputer 26.

The microcomputer reads the digitized data samples and determines the signaling state for each channel. The firmware contained within the microcomputer controls the microcomputer operation so as to digitally filter and analyze the incoming digitized data samples. The detected signaling states are encoded and presented on parallel detection lines 36 for both channels associated with the line card.

The encoding signaling states are ported to a line unit controller (LUC) 38, wherein they are reformatted and output to common equipment via the SIGT 40.

Analog Voltage Amplifier And Detection Circuit Description

As seen in FIGS. 1 and 2B, signal 42 represents a differentially amplified tip to ring voltage signal for channel A (VTRA) while input 44 represent an amplified tip to ground voltage signal for channel A (VTA). Similar analog signals are generated in block 27 for a tip to ring voltage signal (VTRB) and a tip to ground voltage signal (VTB) for channel B (see FIG. 2D).

As seen in FIG. 2B, amplifiers 32 and 34 comprise part of a general purpose quad optical amplifier which is configured as a differential amplifier to derive the above mentioned tip-to-ring voltage, and as a buffer to connect the tip-to-ground voltage to the input for analog to digital converter 26 (see FIG. 2A). Resistors R226, R227, R228, R229, and R230 and the parallel combination of resistors R236 and R237 set the gain for the VTRA and VTA analog signals respectively and also help to form the signature associated with the mechanized loop test signal. Resistors R231, R232, and resistors R238 and R239 respectively form summing junctions to offset the VTRA and VTA levels so as to allow bi-polar analog to digital operation. A passive summer is required to minimiZe error Which otherwise would be introduced by use of the power supply as a reference for the analog to digital converter. This approach provides for nearly no error at the center of the operating range which is where highest accuracy is required.

Since the analog to digital converter only accepts input voltages in the range of zero to five volts, the $VTR_{IN}$ and $VT_{IN}$ voltages as measurable between leads 28 and 30 and leads 28 and ground 25 respectively are attenuated and offset from their input value. In particular, the tip and ring voltage for both channels are first attenuated (divided) by a factor of 26.8 and then subtracted from each other by amplifier 32. The resultant voltage, $VTR_{IN}/26.8$ is further attenuated by a factor of 0.5, and offset by +2.5 volts, through a resistor divider network comprising R231 and R232.

The resultant voltage is $VTR_{IN}/53.6 + 2.5$ v. Thus zero volts $VTR_{IN}$ corresponds to +2.5 volts on line 42 and 42, (VTRA or VTRB).

In addition, the negative range of voltage is shifted to span zero to +2.5 v. The signal conditioning circuit described can thus resolve voltages in the plus or minus 134 v range. Although negative or positive voltages beyond this range will not damage the circuit, they are respectively clipped at zero or 5 volts on input VTRA 42 and VTRB 42'.

Attenuation of the $VT_{IN}$ voltage is 27.5 by resistors R236, R237, with buffering by amplifier 34. Further attenuation by a factor of 0.5 and an offset of +2.5 v is accomplished by resistor divider network R238 and R239. The resultant signal, VTA or VTB, is equal to $VT_{IN}/58.6 + 2.5$ v. The slight difference in gains between VTR and VT produces a small amount of error into the calculations performed by microcomputer 26, although the firmware provides sufficient tolerance to accommodate the expected deviations and induced errors.

Both the VTR and VT output voltages are filtered by one-pole, low-pass resistor-capacitor (RC) filters with a cutoff frequency of 1591 hertz. The filters remove high frequency noise since the only sinusoidal signal of interest is ringing voltage having a frequency of 20 hertz. The low-pass filters for VTR and VT comprise R231 and C208, and R238 and C209 respectively.

Analog to Digital (A/D) Converter 24

The analog to digital (A/D) converter shown in FIG. 2A is an eleven channel, eight-bit resolution, serial-output device (Texas Instruments part no. TLC 541). It is controlled by microcomputer 26 so as to sample and digitize each of the four inputs; that is, the VTR and VT inputs for both channels (channels A and B). The conversion reference is formed by using the power supply as decoupled by a network formed by resistors R504 and capacitors C502 and C503. The 2.048 megahertz (mhz) clock is received via line 46 and acts as the system clock as well as the chip select and the input/output clock as controlled by the microcomputer. The serial operation of the analog to digital converter requires that the microcomputer simultaneously read the current channel input values while strobing the next channel's address.

Microcomouter 26

As seen in FIGS. 1 and 2A, the microcomputer is a masked read only memory (ROM) device, specifically a Texas Instrument part no. TMS70C20 microcomputer. This particular microcomputer contains 128 bytes of random access memory (RAM), 2 kilobytes of read only memory (ROM), a 13 bit timer, a bi-direction 8-bit input/output (I/O) port, a bi-directional 4-bit I/O port, a 4-bit input port, and a 4-bit output port. The microcomputer is configured in a single chip mode so that program control is performed via the onboard read only memory. It should be noted that for test purposes, the MC pin associated with microcomputer 26 may be pulled high by an associated test fixture (not shown), thereby disabling this mode and allowing operation via an off-chip program.

The on-chip read only memory initializes all RAM as well as the I/O lines, and further configures the timer to execute a 4 millisecond loop. It then waits in an idle state for a timer interrupt to occur. The timer interrupt service routine serially reads the four digital data samples (that is VTR and VT for channels A and B), filters the data, determines the signaling state for both channels from the filtered data, and outputs the information to the line unit controller (LUC) before returning to a low-power idle state. The microcomputer detects the application of ringing voltage, absence of loop-power (tip lead open or forward disconnect), initiation of MLT testing, battery reversal, and tip-ground from the central office for conventional or floating battery applications. The detection states are encoded in a TR-303 format and ported to the LUC via output lines 36. The LUC then outputs the information to common equipment via serial SIGT bus 40.

The masked-read only memory within microcomputer 26 contains the control program for digitally filtering and performing the signaling detection process. The flowchart for this computer program is set forth in FIGS. 3 and 4A-4D for the UVG/COT line card. A glossary for various acronyms used are presented below:

| | |
|---|---|
| A/D | Analog to Digital Converter |
| CO | Central Office |
| COT | Central Office Terminal |
| LUC | Line Unit Controller IC |
| LCF | Loop Current Feed (1 loop start idle mode) |
| LCFO | Loop Current Feed Open |
| MLT | Mechanized Loop Test |
| RLCF | Reverse Loop Current Feed |
| RT | Remote Terminal |

Figure 2C:
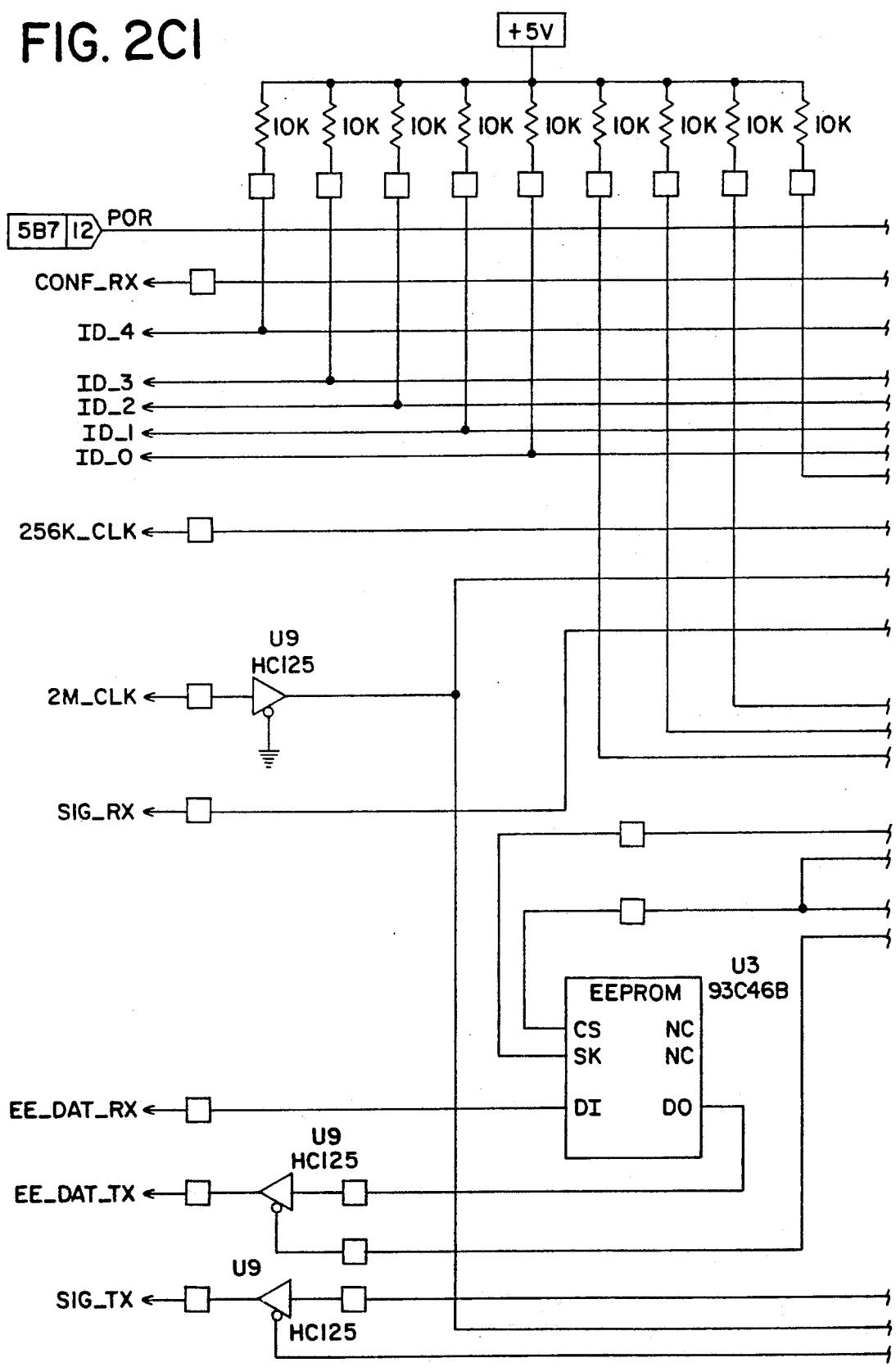
Figure 3:
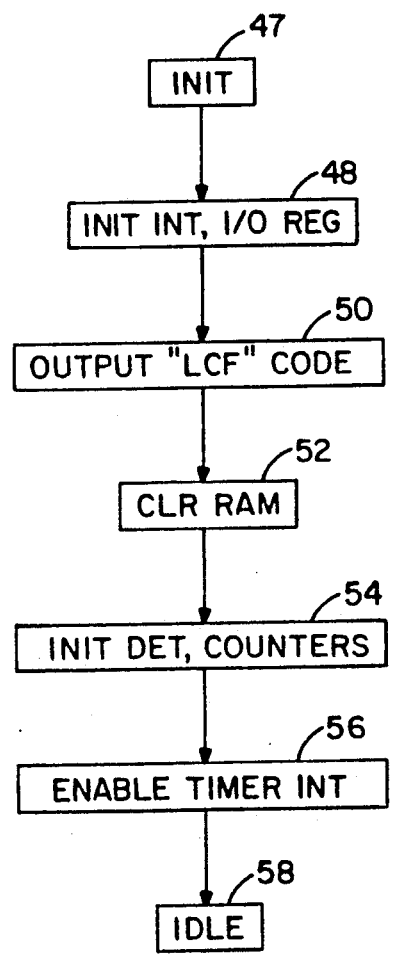
FIG. 3 is a flowchart of the initialization routine of the computer program used in the signaling state detection process.

The initialization routine is shown in the flowchart of FIG. 3. As shown there, upon start-up, the program begins by initializing the interrupt registers and defining the input/output (I/O) port configurations (step 48). The program then proceeds to generate an output code representing the loop-start idle mode (LCF), step 50. This code is arbitrarily chosen and is generated until a valid code is output as explained below.

The next task accomplished in the initialization procedure is to clear the random access memory (RAM), step 52. Stored within the RAM are all the flags and counters associated with the detection algorithms. The initialization of the counters and flags is performed at step 54.

Finally, the timer interrupt is enabled so as to provide an interrupt every four milliseconds. The four millisecond time interval is used to clock digitized samples of the incoming buffered analog signals (VTRA, VTA, VTRB and VTB). The time interval is short enough so that multiple data samples can be analyzed and compared for purposes of slope determination which in turn is used for detecting a ringing signal state having a frequency of approximately 20 hertz.

The final function of the initialization routine is to place the microprocessor in an idle mode so as to minimize power consumption, step 58. The timer interrupt is then used to activate the processor so as to service each interrupt and then return the microcomputer to the idle mode.

The timer interrupt service routine is shown in the flowchart comprising FIGS. 4A-4D.

The tasks accomplished by the timer interrupt service routine are summarized as follows:
a) Obtain the raw digital data samples from the A/D converter 24 (FIG. 1) and filter this data as required.
b) Determine the signaling state represented by the data.
c) Output the detected signaling state to LUC 38.

Figure 4A:
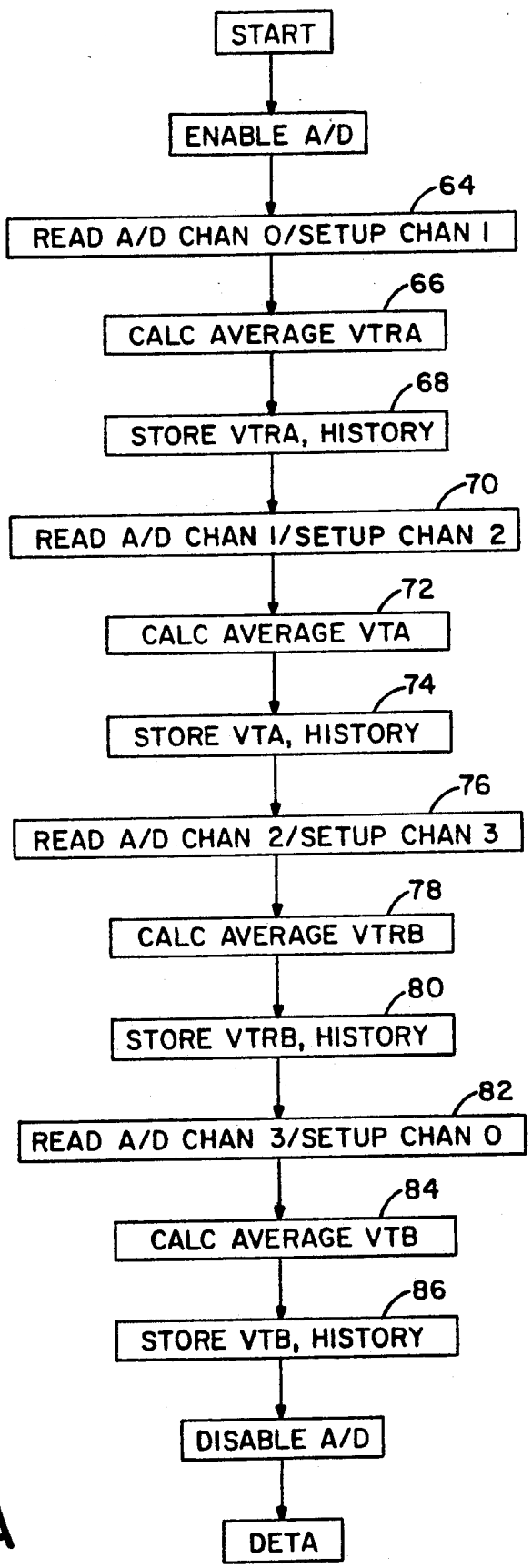
FIGS. 4A through 4D comprise a flowchart for the timing interrupt routine, forming part of the computer program used in the signaling state detection process.

The portion of timer interrupt service routine shown in FIG. 4A accomplishes the first task; that is, obtaining the digital data samples from A/D converter 24. The A/D converter is a multiplexed, serial I/O device, and therefore requires an initial application of a chip select (pin 15, see FIG. 2A) to enable the device. An output port line (N75) from microprocessor 26 is utilized as an I/O clock to simultaneously clock out the data for the current data sample while strobing in the address for the next data sample to be read. These data samples refer to the digitized values of VTRA, VTA, VTRB, VTB shown in FIG. 1 and 2A. The flow chart shown in FIG. 4A respectively refers to these digitized voltage values as channels 0, 1, 2 and 3. Thus step 64 reads the digitized value of channel 0 (VTRA) while preparing to read the digitized value of channel 1 (VTA). Similarly, steps 70, 76 and 82 respectively read the digitized value of channels 1, 2 and 3 while preparing to read the digitized values of channels 2, 3 and 0.

Between reading each of the four data samples, the current reading of each sample is stored along with the two previous readings for the same input voltage (VTRA, VTA, VTRB, or VTB). These raw readings are used by the ring detection algorithm. All other signaling states detection routines use an average reading for each input voltage, which is also computed and stored at this time (steps 66 and 68 for VTRA, steps 72 and 74 for VTA, steps 78 and 80 for VTRB, and steps 84 and 86 for VTB) These average readings are referred to as AVTRx (Average Voltage from Tip to Ring—where "x" is used to denote subscriber channel A or B of the line card) and AVTx (Average Voltage from Tip to Ground). All of these variables are stored in RAM within microcomputer 26 and updated every cycle time (4 milliseconds). At the conclusion of this sequence, the A/D is disabled.

The signaling state represented by the data is then determined. With the exception of ringing, all detection states are threshold detections. The routine is organized such that a state must be detected valid for a minimum number of times defined by the variable "qty" which must equal a number defined by "HYSPOS". Each time this sequence occurs, the detection output is updated and all detection counters are cleared, allowing the process to begin again.

Figure 4B:
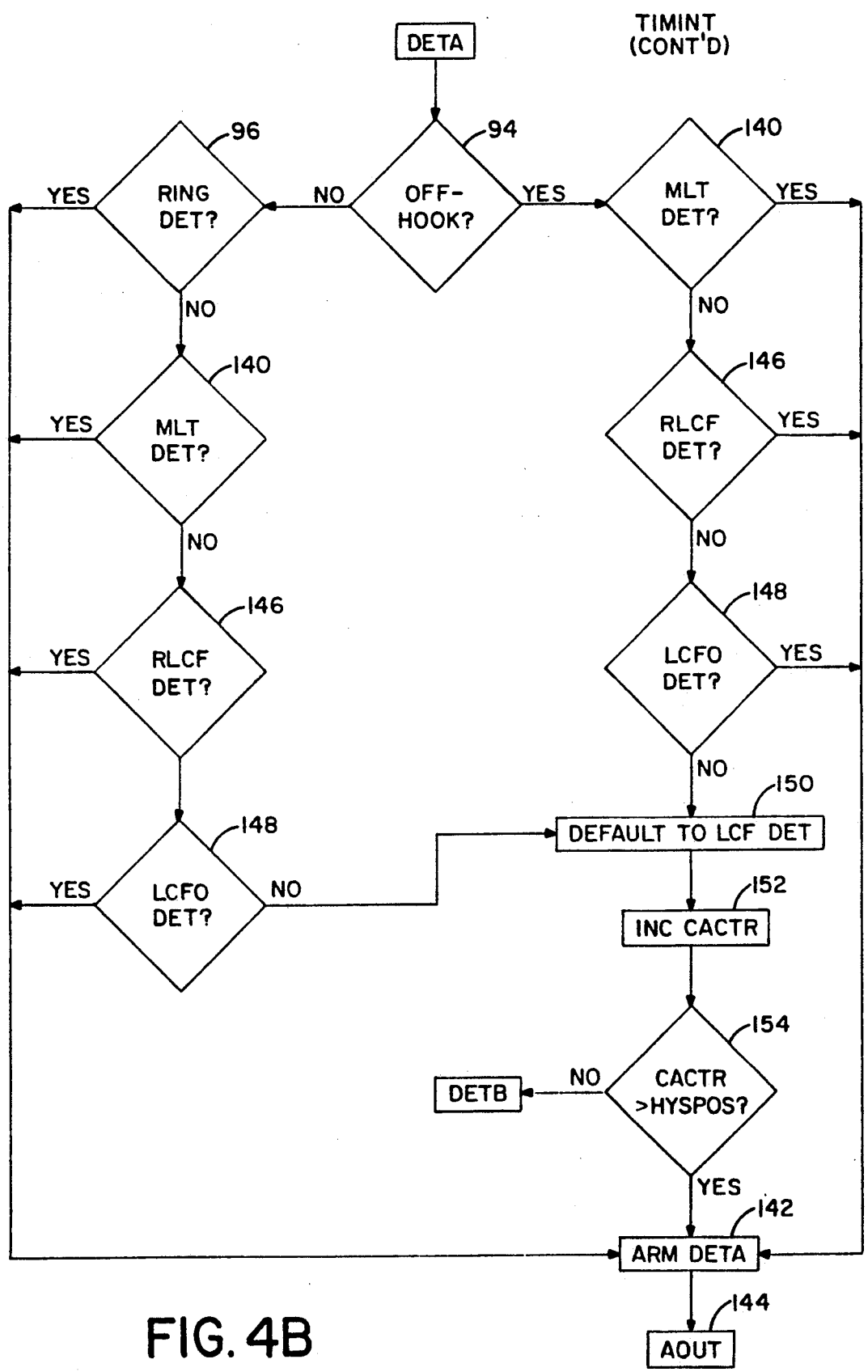

For some of the detection states, the thresholds are modified to reflect on-hook or off-hook conditions. The flow chart therefore shows two separate paths for the signaling state detection process as decided by OFF-HOOK conditional block 94 (FIG. 4B). It should be noted that the ring state can only be detected while on-hook, thereby eliminating the possibility of ringing a phone in a subscriber's ear. In particular, as seen in FIG. 2A, microcomputer 26 monitors the LOOPA and LOOPB bits from LUC38 to determine if either channel is off-hook. If an on-hook state is present (i.e., not off-hook) then ringing signal state testing is performed for that channel.

Thus when the software determines that the subscriber is on-hook, the first detection routine is the ringing signaling state detector (conditional block 96). This ringing signaling state detector flow chart is shown in FIG. 4D. This routine determines if a number of sequential slope determinations all have the same polarity with an absolute magnitude greater than a predetermined value (defined by variable THRESH).

Figure 6:
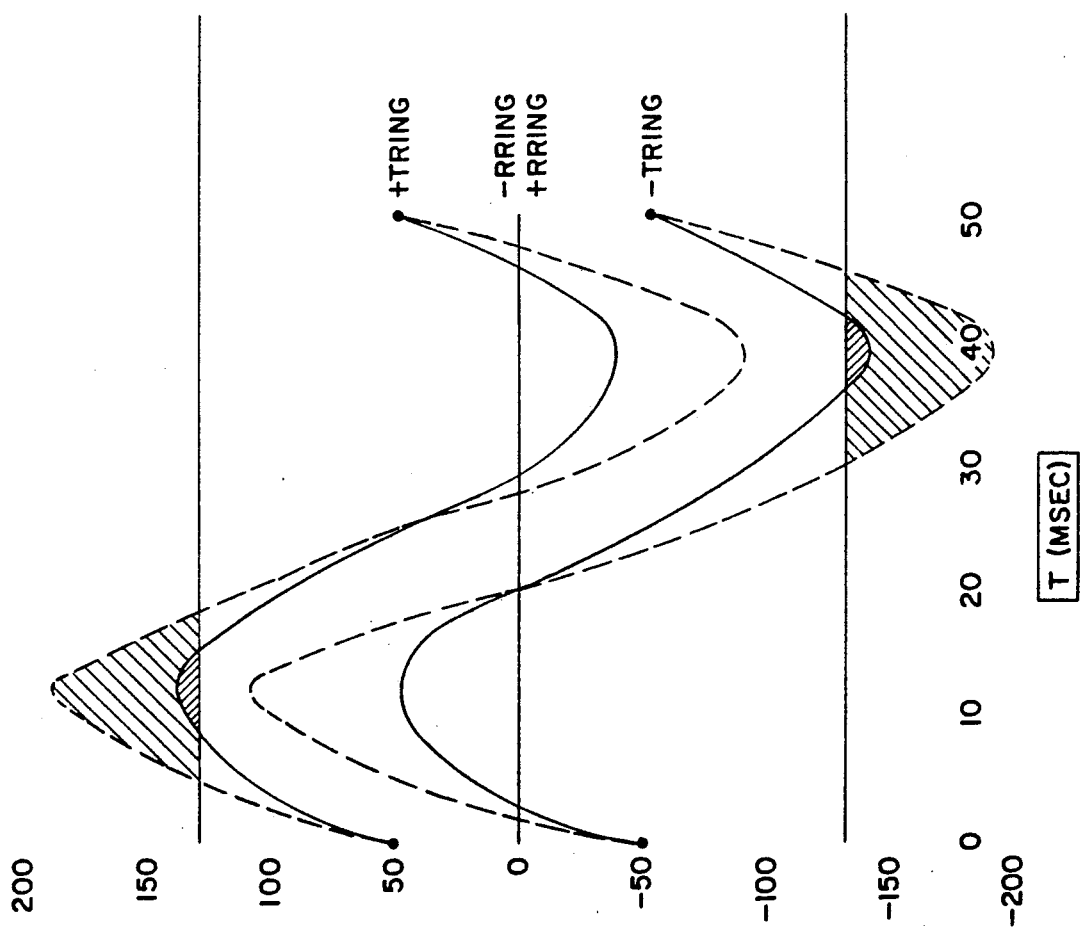
FIG. 6 shows a second typical incoming ringing signal waveform.

As seen in FIGS. 5 and 6, the four millisecond interval readings represent digitized values of the incoming analog voltage, such as waveform 100. Depending on the type of line card, the ringing signal can be -R ringing, where the ringing signal is applied to the ring lead with the tip lead grounded, or -T ringing, where the ringing signal is applied to the tip lead with the ring lead grounded. In any event, the waveform is the same, with a nominal frequency of 20 hertz. Typical readings are shown by data points 102.

Since the ring waveform as a nominal frequency of 20 hertz, its period is 50 milliseconds (T=1/f). Therefore for each half-period (25 milliseconds) the slope of waveform 100 is the same (positive or negative) and at least three consecutive slope determinations are required to be of the same polarity for a ringing signaling state to be considered valid. A slope determination requires two readings to be compared such that for a positive slope, reading i+2 must be greater than reading i and for a negative slope, reading i+2 must be less than reading i.

The ringing detect routine therefore determines if a quantity (qty) of successively determined slopes are of the same polarity. The program variable NUFF maintains the number of consecutive slopes required for ring detection. This number is equal to three. For a slope to qualify, it must have a magnitude greater than a threshold, called "THRESH" (see steps 116 and 118 for positive and negative slopes, FIG. 4D). Because there is no provision for a signed subtraction in the instruction set of the TMS 70C20 microcomputer, it is necessary to first determine the polarity of the slope and route the program flow accordingly (step 114). The slope is calculated by subtracting the data value saved two sampling periods earlier from the current value. The data values used thus spans 8 milliseconds in time.

Since a constant 4 millisecond timer interrupt is used per data sample, the 8 millisecond time interval is constant and therefore the denominator of the slope calculation can be omitted. If a valid slope is detected, a counter indicating the polarity is incremented, and the counter for the opposite polarity is cleared (see steps 120 and 122). When the incremented counter reaches a set threshold ("NUFF"), the RAM location containing the detection status for that channel (DETx ie, DETA or DETB) is updated with the signaling code for ringing, and the program branches around the remaining detectors for this channel (steps 124, 126 and 128). If this threshold is not reached, the routine still branches around the remaining detectors for this channel and goes to the next task (step 130); that is, determines the signaling status of channel B. If an insufficient slope is detected at step 118, the routine clears both polarity slope counters (PSLOP and NSLOP), step 132, and jumps to the next detector for this channel (step 134). For the UVG/COT line card, this next detector (signaling state) is the MLT signaling state (140) as shown in FIG. 4B. Note that the only path to the following detectors lies through this leg of the routine.

Thresholds are optimized to provide discrimination from voltage transients and frequency variations. Voltage transients are filtered out by the use of the "SLOPE" threshold (see step 118), and frequency discrimination is inherent in the routine since valid detection requires "NUFF" successive slopes of the same polarity. If the frequency is too high, the polarity of the slope changes before the requirement for the quantity of "NUFF" successive slopes is met. Similarly if the frequency is too low, the amplitude threshold ("SLOPE") is not met. In addition the waveshape must be primarily sinusoidal in order for detection to occur. Consequently a square wave is not detected as a ringing signal.

As seen in FIG. 4B, the next signal to be tested (step 140) is the mechanized loop test (MLT), whether an off-hook or on-hook condition is present. This signaling state detector block determines if AVTx (Average Voltage of Tip to Ground) is greater than or equal to a value called "VMLT". If this condition is met, the CTxCTR counter is incremented and then checked to see if this condition has occurred a sufficient number of times for MLT to be considered valid.

As seen in Table 1, this routine determines if the condition remains valid for "HYSMLT" cycles instead of the typical "HYSPOS". As seen in Table 1, HYSMLT is set to a value of 11 while HYSPOS is set to a value of 5. This different standard is used to differentiate between a valid MLT initiate signal and the positive portion of the ringing signal that is clipped by A/D 24 (see shaded areas in FIGS. 5 and 6). If valid MLT has been detected for the appropriate number of cycles, the signaling code for MLT detection is loaded into the RAM location for the appropriate channel (DETx), and the program bypasses the remaining tests for this channel (steps 142 and 144).

If the input data does not meet the requirements for ringing or MLT, the program continues to the RLCF detector (step 146). This routine checks for AVTRx more negative than a negative threshold called "V1". If this condition is met, the TDxCTR counter is incremented.

The next check determines whether this condition has been true for an adequate number of cycles ("HYSPOS") and also determines whether to place the code representing RLCF in the DETx RAM location.

If RLCF detection is false, it is known that VTRx is a static voltage more positive than "V1". The next step is to determine if an LCFO signal is present (step 148). This routine involves two steps. The first step determines if VTRx is between "V1" and "V6". Since it is known that VTRx is more positive than "V1", it is only necessary to determine if the voltage is more negative than a value called "V6". If this requirement is met, a valid LCFO is deemed to have occurred. If this condition is not met, a second test is conducted. This test requires that VTRx be more negative than a value called "V4" (note that it is already known to be more positive than "V6") and that VTx be more negative than "V5". This second test represents the range of conditions that are seen during a traditional tip-open (while on-hook) condition. Such a set of conditions also constitutes a valid LCFO detection, and the program increments the counter representing this condition (DxCTR) and checks if this condition has been met an adequate number of times ("HYSPOS"). If the conditions have been met for "HYSPOS" number of times, DETx is loaded with the code representing LCFO (step 142). If not, the program jumps past the remaining detectors in this channel to the next task.

If the analyzed data has not satisfied any of the previous detectors, then the channel is assumed to be in the LCF mode (step 150). Again, the appropriate counter (CxCTR) is incremented (step 152) and a test is made to determine if this condition has been present for an adequate number of cycles ("HYSPOS", step 154).

Whenever the contents of DETx are updated it means that the condition represented by the value in DETx has been valid for the required number of cycles. At this time, all of the static detector counters (all counters except for ringing) are cleared (steps 160, 162, 164, 166, FIG. 4C). The value stored in DETx is then used to refresh the output sent to the LUC (step 176) until another valid signaling state has been detected. It should be noted that this new signaling state condition may be the same as the previously reported one, or any of the others.

As seen in FIG. 4B, the flow path taken when a determination was made that the subscriber is off-hook (LOOP true) is very similar to the on-hook routine. The differences are as follows:

The ring detector is not present.

The threshold for RCLF signaling stage detection is changed from more positive than "V1" to more positive than a value called "V5".

The threshold for the first LCFO detector is changed from more negative than "V6" to more negative than a value called "V2". The second test.(for tip open) is omitted, as it is redundant while off-hook.

Both paths of the detector portion of the software use the same counters for similar functions, thereby allowing uninterrupted operation if the loop status changes.

Figure 4C:
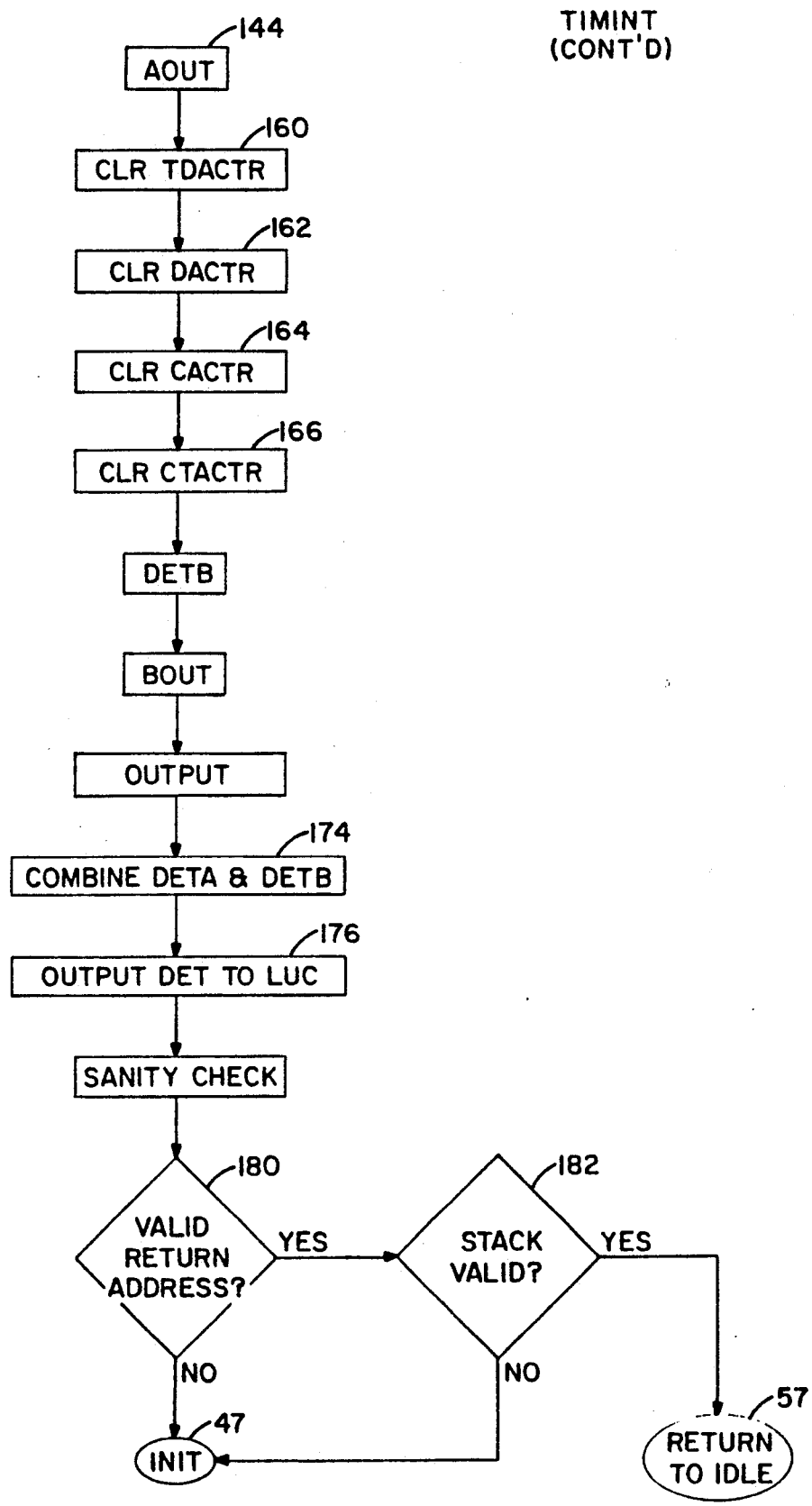
Figure 4D:
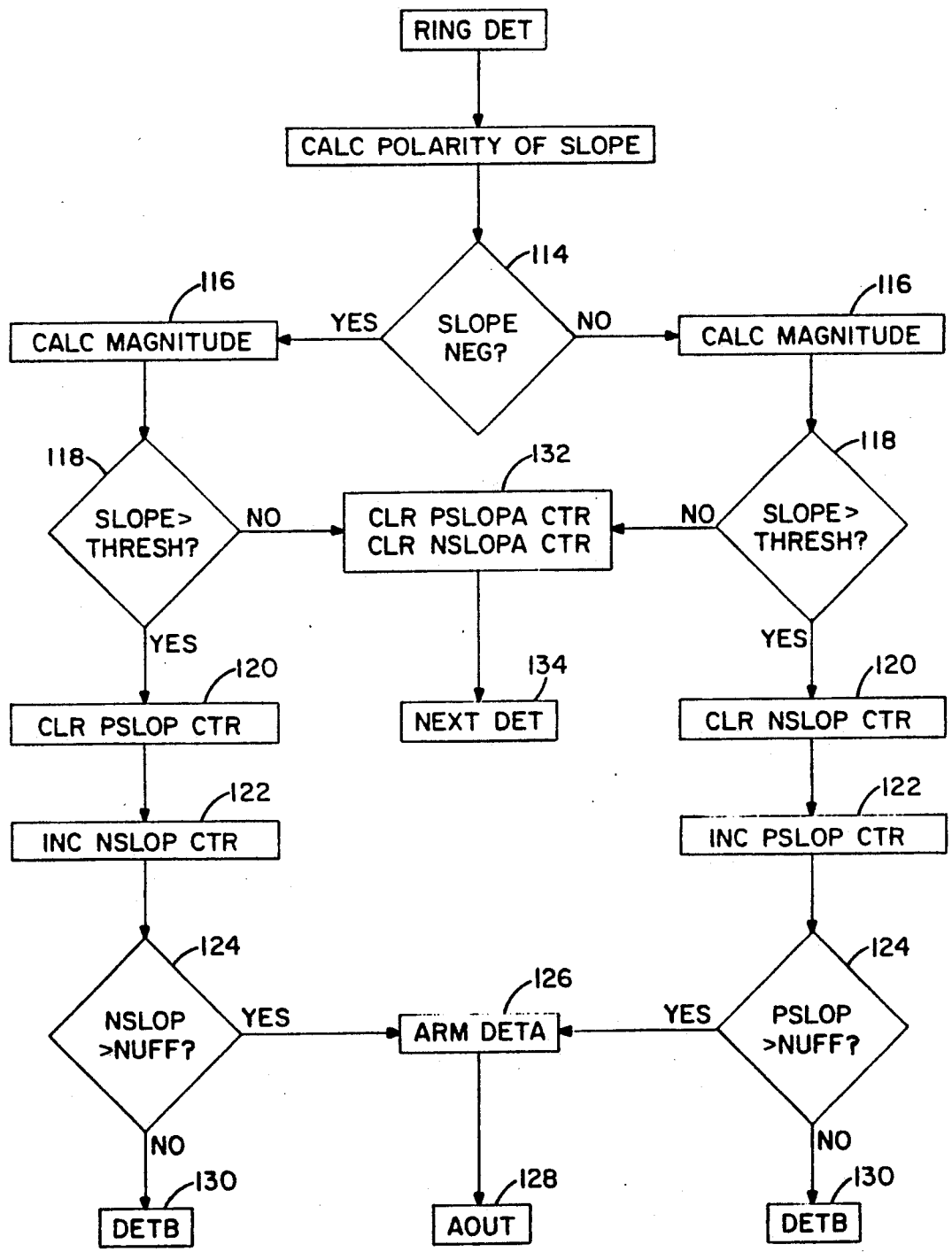

As seen in FIG. 4C, after the control program has determined the detection status of channels A and B, their values are combined, step 174, and the detection status data is output to the LUC (step 176, FIG. 4C) via parallel bus 36 (see FIG. 1).

Before returning to the idle state, the TIMINT routine determines whether the return address is valid (step 180) and also checks the stack pointer for the correct depth (step 182). If either test fails, the program branches to the INIT routine (step 47—see FIGS. 4C and 3), which re-initializes the entire process. If the program finds no fault in these areas, the program returns to idle (step 58) and awaits the next timer interrupt.

There is no watchdog timer to continually check the proCessor's sanity in the hardware. A path to return to normal program execution if the stack pointer falls outside of its predefined boundaries is provided by a trap vector defined in the trap and reset vector table. All unused ROM locations within microcomputer 26 are filled with opcode FF hexadecimal. An opcode of FF translates to a TRAP23 instruction, which forces the program counter to location FFD0 hexadecimal in the ROM. This location is defined by the vector table to point to the reset vector. Therefore, the software resets itself if it ever goes to any unused area of ROM.

Line Card Module Hardware Description (Other than Detection Circuit) Voice Frequency (VF) Path A bi-directional VF path exists from the central office tip and ring lead 28 and 30 through the VF relay 29 and the line transformer 51 to the PCM data busses 31 and 33 at the output of the codec/filter combination 35. It should be noted that this path does not include the loop relay, thus satisfying the requirement for on-hook transmission. The input impedance has been optimized to terminate a 900 ohm plus 2.16 uF loop.

VF Relay 29

As seen in FIG. 2B a one-shot (U10) is employed to open VF relay 29 (S1) for a short time interval each time the loop is opened. This prevents the VF circuitry from contributing to any dial-pulse distortion. The time constant is set by R201 and C201 to keep the VF path open for the longest specified dial pulse interval. The one-shot is triggered from the same logic used to drive the DC current sink. A "74AC" series logic gate (U7) is used to provide adequate drive current to the relays.

Codec/Filter Combination 35

The codec/filter combination 35 is an analog-to-digital encoder and decoder integrated circuit (IC). It encodes the analog VF signals from the transmit port (TX) of the hybrid network 37 into u-law PCM (Pulse Code Modulation) on output line 33 and decodes u-law PCM on line 31 into an analog VF signal to be applied to the central office line. The output PCM signal (transmit) is applied to the edge connector through a buffer IC and thus sent to the common equipment through the backplane. The receive PCM signal is connected from an edge connector pin to the codec input.

The filter section of the module consists of a lowpass filter in each direction that limits the VF frequency response to 3.4 KHz. This high frequency rolloff is required to prevent adding noise and distortion from the encoding and decoding process. In addition, there is a low frequency rolloff (200 Hz) in the PCM transmit direction to reduce noise from power line induction. The PCM signals are time division multiplexed serial data lines. The codec inserts and extracts data from the appropriate time slots using the Frame Synch Transmit and Frame Sync Receive strobes (FSXA and FSRA). The strobes are generated by the Line Unit Controller (LUC). As seen in more detail in FIG. 2B, the VF signals from the transmit port of the hybrid network are converted into a u-law PCM signal stream (PCM TX) which is buffered by U9 and output to the common equipment through the backplane.

Transmit and receive drive amplifiers are included in the codec IC (U4). Resistors R215-R219 form the network required to select the transmit level, with R218 provided as a factory selectable value. Resistors R220-R223 are used to set the receive level, with R221 provided as the factory adjustment. These adjustment resistors are required to compensate for tolerance variation in components used throughout the VF path. These networks are centered to provide 0 dBm transmit and 0 dBm receive levels with a nominal factory select value of approximately 40K. A five percent increase from this nominal value yields approximately a 0.05 dBm increase in amplitude. It should be noted that this is not a linear relationship, since the factory selectable resistors are in parallel with the fixed feedback resistors.

Hybrid Network 37

The codec VF input and output are connected to a hybrid balance network. The purpose of the balance network is to reduce the VF signal from the codec toward the central office line that is reflected back toward the codec and toward the party that is talking. This result is accomplished by summing an equal and opposite decoded receive PCM signal back into the transmit VF signal. The balance network provides an impedance equal to the input VF circuitry in order to generate this signal. As seen in FIG. 2B, the hybrid network converts the four wire transmit and receive VF signals into two wire signals required by the line transformer. Resistors R211-R214 and capacitor C207 constitute a scaled model of the impedance network looking back toward the central office lines which is used to prevent the received (VF from the PCM stream) signal from being fed back into the transmit (VF toward the PCM stream) section. This network is used to develop a VF signal equal to the received signal which is then subtracted from the transmitted signal at the codec, effectively canceling the effect of the central office hearing the user's speech reflected in the user's ear.

Transformer 51

Transformer 51 is the VF interface between the four wire (ground referenced) low voltage common equipment environment and the two wire (floating) high voltage loop environment. The design utilizes a transformer (T201) with a one-to-one turns ratio that is fed by amplifiers contained in the codec IC. This transformer provides coupling to the central office line while maintaining excellent isolation. A capacitor (C204) in series with the line side of the transformer blocks DC current flow to prevent saturation. It also provides the bulk of the imaginary portion of the specified line matching impedance. Most of the real portion of the matching impedance is made up of the series resistance of resistors R205 and R246 in series with the VF relay and resistor R210. The transformer and the hybrid network also enter into this resistance value.

Transient Protection Module 39

The transient protection module employs a two-terminal voltage clamp that is triggered by a current overload for lightning and power cross protection. Resistors R205 and R246 are used in series with these devices to limit the current. These resistors are the type that open when subjected to excessive current flow, but which can also withstand a pulse. This design ensures that if AC power is applied to the central office line, the resistors will fuse open and prevent any other damage from occurring.

Framing and Signaling Logic

The framing and signaling logic circuits are embedded in a Line Unit Controller 38 (LUC) IC. This LUC is described in a copending application filed by the present assignee, bearing Ser. No. 7,451,436—Dec. 15, 1989 entitled Line Unit Interface Circuit, filed on the same date herewith, which is hereby incorporated by reference. From the backplane, the LUC receives a 2.048 MHz clock, a 256 KHz clock used as a framing signal, the signaling data SIGR, and a configuration data input, CONR, that contains data to assign the transmit and receive time slot and enable the inventory control programmable read only memory (EEPROM 41). The circuit transmits the output signaling data SIGT to the backplane.

The logic section generates the frame sync for codec 35, the clock and enable for the inventory control EEPROM 41, drive for the busy LED 43, and drive for the loop and ring-ground relays. The relay drives are decoded from the SIGR input.

Signaling Relays

The loop relay 45 is controlled from the common equipment via the LUC. When activated, it switches a DC current sink across the central office subscriber lines. The dial pulse relay is opened by the the absence of the loop control signal, however it is closed again after a short time delay. This action is taken to ensure that the VF circuitry does not introduce any dial pulse distortion. When the loop relay 45 is actuated, a loop current sink 49 presents a low DC impedance and a high AC impedance across the central office tip and ring lines 28 and 30. This allows the central office to detect line seizure while not impairing the VF impedance characteristics. Maximum loop length is 300 ohms.

As seen in FIGS. 2B and 2D, the DC current sink is applied across tip and ring leads 28 and 30 in order to indicate an off-hook condition to the central office (CO). When the off-hook signaling code is received, relay switch S5 is closed. This places the DC current sink circuit, R207, R208, Q201, R209 and R245 across the tip and ring leads. The current sink is designed to draw approximately 40 mA DC loop current, but still provide a high impedance to VF signals. Rectifier bridge CR202 allows the circuit to operate with loop current flowing in either direction, when the battery is reversed for example.

Snubber

Whenever an inductor with current flowing through it is suddenly opened, a large (and potentially damaging) voltage spike can occur. This phenomenon is commonly called "inductive flyback" or "inductive kick". A "snubber" circuit provides a path for current to flow during this transient condition, which limits the voltage spike. As seen in FIG. 2B, the snubber consists R206, C202, and C203 applied from the tip and ring leads and protects the line card from a relay or other inductive source that is suddenly "opened" at the CO.

Rino Ground

A ring ground notifies the central office of a request for service from a ground-start line. As shown in FIG. 2B, solid-state relay (S3) and its associated circuitry provides the capability of grounding the ring lead through 820 ohms (R224). The control for this relay is decoded from the common equipment signaling by the LUC (U6).

Inventory Control EEPROM 41

The inventory control PROM 41 is a 128 by 8 bit electrically erasable programmable read-only memory (EEPROM) IC. The clock and chip enable signals are applied from the common equipment through the LUC. The input data is applied from the backplane and the output data goes to the backplane through a buffer.

Signal Conditions Required for Detection of MLT Signature

The signaling states to be detected have specific signatures which must be present for proper detection. Although these signaling state signatures are generally defined in AT&T Technical Reference entitled "Description of the Analog Voiceband Interface Between the Bell System Local Exchange Lines and Terminal Equipment", pub. no. 61100, TR-57, dated January 1983, Copyright American Telephone and Telegraph Company, 1983, which is hereby incorporated by reference, the specific requirement for MLT testing is presented below:

Mechanized Loop Test equipment requires a signature resistance between tip and ring and both tip and ring to ground to determine which series of tests to apply. Resistors R226, R227, and R228 (see FIG. 2B) provide a signature of 31K ohms tip-to-ring resistance, and approximately 162K from tip and ring to ground.

Two-Party Divided/Central Office Terminal Line Card

FIGS. 1 and 7A–7D form the overall block diagram and schematic diagram for the two-party divided/central office terminal (2PD/COT) line card. The operation of this line card is essentially similar to that of the UVG/COT line card. The architecture of the 2PD/COT detection circuit is the same as that for the UVG/COT detection circuit.

The signaling states detectable by the detection circuit are 1) forward disconnect, 2) open switching interval, 3) -R ringing, 4) -T ringing. 5) MLT, 6) idle, and 7) automatic number identification (ANI).

A description of some of the detectable signaling states is presented below.

Forward Disconnect (Tip Open)

The Forward Disconnect detector is split into two sections, one to detect a Forward Disconnect caused by a Tip Open, and one to detect a Forward Disconnect caused by an open switching interval (OSI), ring open, or tip and ring grounded. A DISC signaling code is output in either case. The detector checks for VT equal to or less than −7 v and VTR equal to or less than 36 v.

Forward Disconnect

This is the second Forward Disconnect detector, mentioned above, that looks for an OSI. The detector checks for −7 v equal to or less than VTR and VTR equal to or less than 7 v.

MLT

This routine detects the Mechanized Loop Testing (MLT) initiate signal. MLT is detected in both the on-hook and off-hook states. The detector checks for 95 v equal to or less than VT.

ANI Request (loop closed only)

An Automatic Number Identification (ANI) test is performed to determine which party, of a two-party line, is initiating a call. This test is used primarily for billing purposes on toll calls. The ANI request code is transmitted to the remote terminal (RT) when an off-hook condition first occurs. The 2PD/COT waits for response and latches the result, tip party or ring party, for the duration of the call.

The ANI firmware is somewhat different than most of the detector routines. Once a loop closure is detected, an ANI flag (ANIFLA) and a BUSY indicator (BUSYA) are set and the TR-303 format ANI Request code is transmitted to the RT. After issuing the request, the COT card waits eighty more seconds to allow the RT sufficient time to perform the test. The RT can respond with a Tip-Ground code, indicating the tip party is off-hook, or with a loop open code indicating the ring party.

The BUSY flag disables the detection states while the RT is responding to the ANI request, so a loop open response (ring party) will not actually open the loop and disconnect the call. After waiting for eighty more seconds, the firmware monitors the response from the RT and applies a Tip-Ground if the Tip Party is off-hook. The IDLE code is output and the firmware goes into a twenty millisecond delay routine in which nothing is detected. The delay is necessary to allow the RT to clear its ANI response. The ANI flag prevents another ANI test from being performed and is cleared when the loop opens.

Ringing (loop open only)

The ring detector routine is only performed when the subscriber is on-hook (loop open). It is the first routine to be performed. The routine works on the premise of detecting three successive slopes of the same polarity. In addition, each of the three slopes must be greater than 20 v. This routine prevents minor changes between sampling periods, including 60 Hz induction, from being detected as slopes of a ringing signal. The slope is calculated by subtracting the data value from two sampling periods previous from the current value. If a valid slope is detected, a counter indicating the polarity is incremented, and the counter for the opposite polarity is cleared. When this counter reaches the threshold "NUFF", in this case 3, the signaling code for ringing is output, and the program branches around the remaining detectors. If no slope is detected, the software clears both polarity slope counters and jumps to the next detector.

Coin/Central Office Terminal Line Card

FIGS. 8A-8D form the overall schematic diagram for the COIN/COT line card. The operation of this card is similar to the UVG/COT and 2PD/COT line cards except that only one subscriber (coin) line is associated with the card. Additional voltages are also converted to digitized data samples by the A/D converter 24.

A description of the unique aspects of this line card as well as a description of some of the detectable signaling states is presented below.

MLT Signature

Figure 8D:
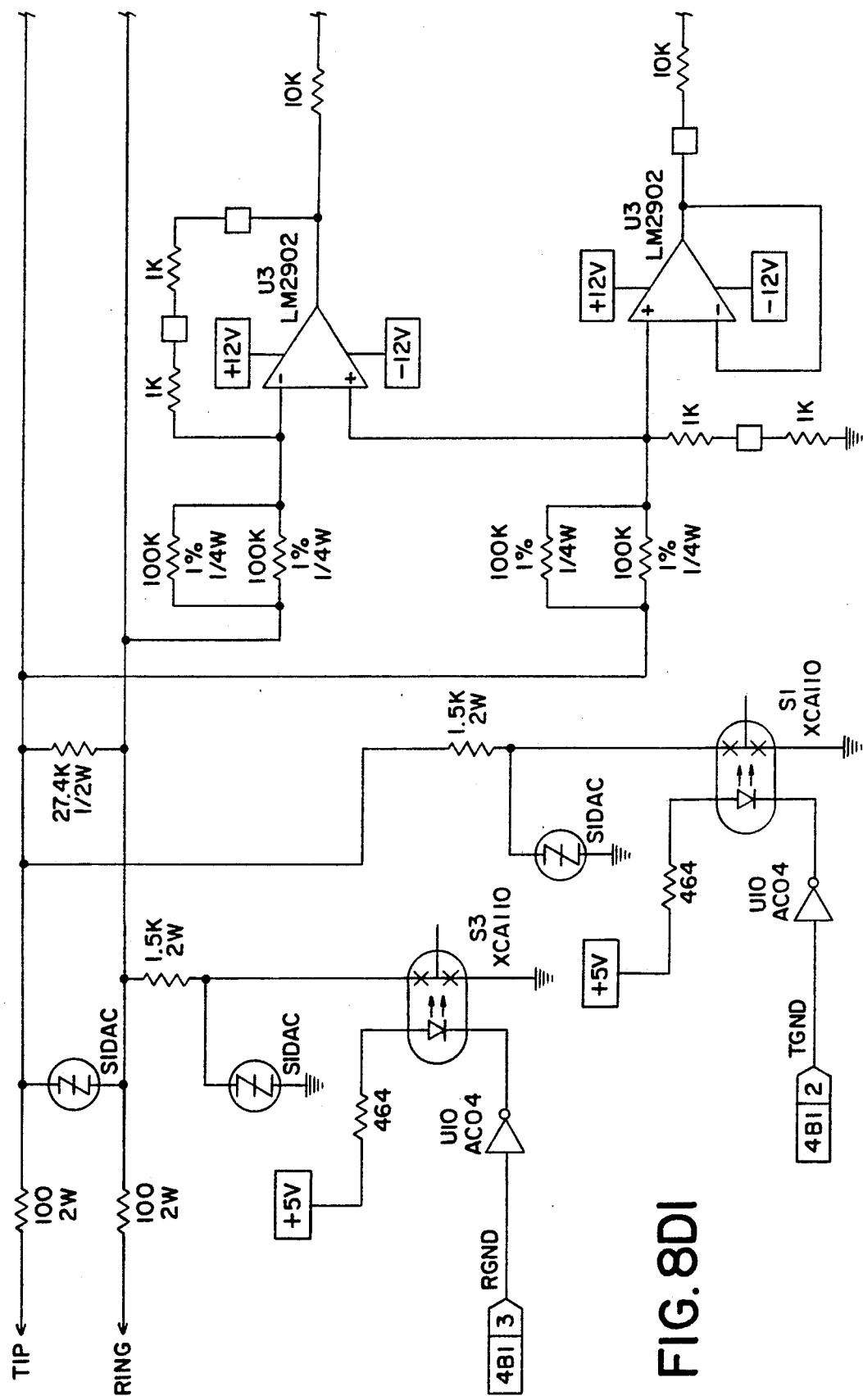
FIG. 8 comprising FIGS. 8A-8D, comprising FIGS. 8A1-8A2 for FIG. 8A, FIGS. 8B1-8B3 for FIG. 8B, FIGS. 8C1-8C3 for FIG. 8C, and FIGS. 8D1-8D2 for FIG. 8D, is a schematic diagram of the coin/central office terminal line card.

Signature resistors from tip-ring, tip-ground, and ring-ground are used by MLT equipment in the central office to determine what type of board is connected and which tests to apply. As seen in FIG. 8D the COIN/COT has a 27.4K (R207) tip-ring signature, and approximately 50K tip-ground and ring-ground resistance (R208/R209 and R210/R211).

Ring Ground

A Coin First (CF) telephone employs a modified ground-start signaling scheme to initiate a call. Initially, the CO opens the tip, applies battery to ring, and monitors the ring to ground current. When a (CF) phone goes off hook and after the initial monetary rate is deposited, the coin station applies a ground to the ring lead. The RT detects this ring ground and signals the COT line card. As seen in FIG. 8D, the COT replicates the ring ground (actually 1.5 Kohm to ground (R205)), by closing switch (S3). The CO detects current flow in the ring lead, and closes the tip lead. The battery is now connected across tip and ring. Upon detecting an idle battery condition, VTR, the CF phone reverts to a loop-start mode by sending a loop closure code. The loop closed code, at the COT, opens the resistance ring to ground (S3 and R205), and causes loop current to flow by applying a DC current sink across tip and ring. The CO detects loop current and applies dial tone. A phone call can finally be made as usual.

Tip Ground

A Dial Tone First (DTF) phone employs a loop-start signaling scheme. When the user goes off-hook, dial tone is applied to the line. Certain numbers, such as 0, 911, etc., may be dialed without a deposit. For all other numbers, the CO performs a coin presence test to verify that the initial monetary rate has been deposited. The coin phone grounds the tip lead if the initial rate is deposited. During a coin presence test the CO opens the ring lead and applies battery to the tip lead. If current flows in the tip lead, then the initial deposit is considered made and the call is completed. IF a ground is not detected, a recording instructs the user to deposit the proper amount. The COT replicates the tip ground, actually 1.5 Kohm to ground (R206 and S1), when signalled by the RT. The tip ground resistance is removed after the coin check test is completed.

A coin presence test is also performed for both (DTF) and (CF) phones, during Nickel Local Overtime calls. Nickel Local Overtime requires a deposit, traditionally a nickel, every 60 seconds for certain local calls. At the end of each 60 second period, a coin check is performed to verify that a nickel had been deposited. Switch (S1) closes and applies 1.5 Kohm to ground (R206) if the nickel is in the coin hopper.

Coin presence tests are also applied following a coin refund or coin collect signal. Such tests verify that the coin hopper is indeed empty. A tip ground signal in such a case would indicate that a coin is stuck in the hopper.

Signal Processing

The signal processing routine is split into three branches, one for the looped state, one for the un-looped state, and one for the un-looped state with a tip-ground resistance applied. Each state, looped and un-looped, contains essentially the same detection routines, however it is necessary to modify the thresholds in some of the looped detectors. In addition, Ringing and MLT signaling states are only detected in the un-looped state. A signaling state must be detected five times before that signaling code is considered valid and thereby outputted to the LUC.

Forward Disconnect (Tip Open)

The Forward Disconnect routine is split into two sections, one to detect a Forward Disconnect caused by a Tip Open, and one to detect a Forward Disconnect caused by an open switching interval (OSI), ring open, or tip and ring grounded. A DISC signaling code is output in either case. The routine checks for VT equal to or less than $-7$ v and 0 v equal to or less than VTR which in turn is equal to or less than 7 v.

Forward Disconnect (OSI)

This routine is the second Forward Disconnect detector, mentioned above, that looks for an OSI. The routine checks for $-7$ v equal to or less than VT which in turn is equal to or less than 7 v and $-7$ v which is equal to or less than VTR which in turn is equal to or less than 7 v.

Positive Loop Supervision (loop closed only)

This routine detects the presence of reverse battery during a loop closure. Positive Loop Supervision is used to lock-out the keypad during certain periods of coin telephone service. The routine checks VTR equal to or less than $-13$ v.

MLT (loop open only)

This routine detects the Mechanized Loop Testing (MLT) initiate signal. This signal is detected only during a loop open state. the routine checks 73 v equal to or less than VT equal or less than 97 v and VTR equal to or greater than 64 v.

Negative Coin Check

This routine determines if there are any coins in the hopper. The routine checks for $-63$ v equal to or less than VT equal to or less than $-32$ v.

Positive Coin Check

Some telephone companies apply a positive voltage during the coin presence test. The routine checks for 32 v equal to or less than VT which in turn is equal to or less than 63 v.

Negative Coin Control

A signal issued to refund any coins in the hopper. The routine checks for VT equal to or less than $-86$ v.

Positive Coin Control

Some telephone companies apply a positive refund voltage. This routine checks for VT equal to or greater than 86 v.

The COIN/COT line card contains firmware within the detection circuit to detect the following signaling states: forward disconnect, open switching interval, -R ringing, MLT, idle, positive loop supervision, negative coin check, positive coin check, negative coin control, and positive coin control.

It will thus be seen as the object set forth above and those made apparent from the preceding description are efficiently attained and, since certain changes may be made in carrying out the above detection circuit and line card construction and method without departing from the scope of the invention, it is intended that all matter contained in the above description or shown in the accompanying drawings shall be interpreted as illustrative and not in a limiting sense.

It will also be understood that the following claims are intended to cover all of the generic and specific features of the invention described and all statements of the scope of the invention which is a matter of language might be said to fall therebetween.

Having described the invention, what is claimed is:

1. An apparatus to detect telephony signaling states, including a periodic ringing signaling state, and level signaling states, said signaling states communicated by analog voltages generated on the tip and ring leads of a subscriber line, comprising:
   A) means for periodically converting the analog voltage associated with the subscriber line into digital data samples, the frequency of the conversion occurring at a rate greater than the ringing signal to be detected;
   B) means, responsive to the on-hook status of the subscriber line for determining if a ringing signal state is present, comprising:
      1) means for storing a successive plurality of digital data samples;
      2) means for determining the slope of stored digital data samples;
      3) means for determining if a plurality of successive slopes are of the same polarity so as to generate a ringing signal state detection signal if such a plurality of successive slopes is determined;
   C) means for detecting at least one level signaling state by comparing the digitized data samples to a predetermined value; and
   D) means for outputting the detected signaling states.

2. An apparatus to detect telephony signaling states as defined in claim 1, wherein the sampling rate of the analog to digital converter means is at least twelve times faster than the frequency of the ringing signal to be detected.

3. An apparatus to detect telephony signaling states as defined in claim 1, wherein the analog voltages comprise a tip lead to ring lead differential voltage and a tip lead to ground voltage and wherein the analog to digital converter means includes means for periodically converting these voltages into separate digital data samples.

4. An apparatus to detect telephony signaling states as defined in claim 3, further comprising means for determining the average values of the tip to ring and tip to ground digital data samples and wherein these averaged tip to ring and tip to ground digital data samples are used by the means for comparing the digital data samples to a predetermined value so as to detect at least one level signaling state.

5. An apparatus to detect telephony signaling states as defined in claim 1, wherein the means for detecting at least one level signaling state further comprises means for averaging successive digital data samples of the same sampled analog voltage, and wherein the means for comparing the digital data samples to a predetermined value comprises means for comparing the averaged digital data samples to said predetermined value.

6. An apparatus to detect telephony signaling states as defined in claim 5, wherein the means for detecting at least one level signaling state further comprises a counter associated with each level signaling state to be detected, and at least one predefined number stored within the apparatus, wherein the counter associated with a particular signaling state is incremented whenever comparison is determined for that signaling state, and further comprising means for comparing the counter value with said corresponding number so as to detect the particular signaling state if the counter value equals said number.

7. An apparatus to detect telephony signaling states as defined in claim 6, wherein the telephony signaling states include a mechanized loop test (MLT), wherein the means for detecting at least one level signaling state comprises a counter (CT CTR) and wherein the means for comparing the digitized data samples to a predetermined value include means for comparing the average digitized data sample from tip to ground (AVT) to a predetermined level (VMLT) and if the average digitized data sample is greater than or equal to VMLT, incrementing the counter (CT CTR), and to continue to increment the counter (CT CTR) each consecutive successive time that this average digital data sample is greater than or equal to VMLT, and further comprising means for comparing the counter value to a number (HYSMLT) so as to detect the presence of the MLT signaling state if the counter value equals said number (HYSMLT).

8. An apparatus to detect telephony signaling states as defined in claim 7, wherein the predetermined HYSMLT number is greater than the first predefined number.

9. An apparatus to detect telephony signaling states as defined in claim 8, further comprising means for determining the presence of an RLCF signaling state by determining, after a failure to detect MLT signaling, whether the average voltage from tip to ring (AVTR) is more negative than a negative threshold value (V1), and if this condition is true incrementing a counter (TD CTR), and wherein said RLCF means continues to increment the TD CTR counter each consecutive successive time that the AVTR value is more negative than the V1 threshold value and further wherein the RLCF means upon determining that the counter equals the first predefined number (HYSPOS), determines the presence of an RLCF signaling state.

10. An apparatus to detect telephony signaling states as defined in claim 9, further comprising means for determining an LCFO signaling state by determining if the AVTR value is more positive than the V1 threshold and less than a second threshold (V6), and if less than V6, incrementing a counter (D CTR) and continuing to make this comparison such that said LCFO detection means compares the counter to the first predetermined value (HYSPOS) and if equal to said value, determines the presence of an LCFO signaling state, and further wherein the LCFO detecting means comprises means such that if the AVTR value is not less than the V6 threshold, determining if the AVTR value is less than a third threshold (V4) and further determining if the AVT value is less than a fourth threshold (V5) and if both conditions are true, incrementing the D CTR counter and continuing this comparison so as to increment the D CTR counter each successive time the conditions are met and comparing the counter to the first predefined number (HYSPOS) and if equal to said first predefined number, determines the presence of an LCFO signaling state.

11. An apparatus to detect telephony signaling states as defined in claim 8, further comprising means so that if none of the previous level signaling states are detected, a counter (C CTR) is incremented and if the counter value is equal to the first predetermined value (HYSPOS, determining an LCF signaling state to be present.

12. An apparatus to detect telephony signaling states as defined in claim 11, wherein the threshold value for the RLCF detection means is changed from less than V1 to less than a fifth predetermined value (V5) if the subscriber line is off-hook and further wherein the second LCFO detector means is omitted and the first LCFO detector means predetermined value is changed from less than V6 to less than another predetermined value (V2) if the subscriber line is off-hook.

13. An apparatus to detect telephony signaling states for two subscriber line pairs (channels) as defined in claim 10, wherein the ring detector means, the MLT detector means, the RLCF detector means, the LCFO detector means and the LCF detector means individually compare the digitized average tip to ring and tip to ground values data samples for both subscriber channels with the respective threshold values and determines the signaling state for both subscriber channels and further comprises means for combining the detection states for both channels and outputting the respective information for both channels to interconnectable telephony equipment.

14. An apparatus to detect telephony signaling states as defined in claim 1, wherein the means for detecting at least one signaling state includes means for detecting forward disconnect, open switching interval, -R ringing, -T ringing, mechanized loop test, idle, and automatic number identification.

15. An apparatus to detect telephony signaling states as defined in claim 14, wherein the means for detecting at least one level signaling state further comprises means for determining average values of the digital data samples and wherein these averaged digital data samples are compared to predetermined voltage values for determining the presence of the level signaling states.

16. An apparatus to detect telephony signaling states as defined in claim 15, further wherein the means for detecting at least one level signaling state comprises a counter for each of the level signaling states to be detected and wherein the counter value is incremented for the signaling state to which it is associated if the averaged digital data samples are within predefined voltage values, and wherein if the counter value for the counter associated with the signaling state equals a predefined number, determining the associated level signaling state to be present.

17. An apparatus to detect telephony signaling states as defined in claim 16, having means for clearing a counter value if the next averaged digital data sample does not have a value which would increment the counter.

18. An apparatus to detect telephony signaling states as defined in claim 1, wherein the plurality of successive slopes must at least be equal to three in order for a ringing signaling state detection signal to be generated.

19. An apparatus to detect telephony signaling states as defined in claim 18, wherein the means for determining if a plurality of successive slopes are of the same polarity includes means for determining if the magnitude of said slope determinations are greater than a predefined value, and only considering the slope determination to be valid if it is greater than said predefined value.

20. An apparatus to detect telephony signaling states as defined in claim 1, wherein the means for detecting at least one signaling state includes means for detecting forward disconnect, open switching interval, -R ringing, -T ringing, mechanized loop test, idle, positive loop supervision, negative coin check, positive coin check, negative coin control, and positive coin control.

21. An apparatus to detect telephony signaling states as defined in claim 20, wherein the means for detecting at least one level signaling state further comprises means for determining average values of the digital data samples and wherein these averaged digital data samples are compared to predetermined voltage values for determining the presence of the level signaling states.

22. An apparatus to detect telephony signaling states as defined in claim 21, further wherein the means for detecting at least one level signaling state comprises a counter for each of the level signaling states to be detected and wherein the counter value is incremented for the signaling state to which it is associated if the averaged digital data samples are within predefined voltage values, and wherein if the counter value for the counter associated with the signaling state equals a predefined number, determining the associated level signaling state to be present.

23. An apparatus to detect telephony signaling states as defined in claim 22, having means for clearing a counter value if the next averaged digital data sample does not have a value which would increment the counter.

24. A apparatus to detect telephony signaling states, said signaling states communicated by analog voltages generated on the tip and ring leads of a subscriber line, comprising:
A) means for periodically converting the analog voltage associates with the subscriber line into digital data samples;
B) means for determining the average values of successive data samples;
C) means for comparing the average digital data samples to at least one predetermined value;
D) means for counting;
E) means associated with the comparison means for incrementing the counter if the average digital data sample is equal to or greater than the predetermined value;
F) means for storing a predefined number;
G) means for generating a detection signal associated with a signaling state if the counter has a value equal to the predefined number; and
H) means for outputting the detected signaling state.

25. An apparatus to detect telephony signaling states as defined in claim 24, wherein the telephony signaling states include a mechanized loop test (MLT), wherein the means for detecting at least one level signaling state comprises a counter (CT CTR) and wherein the means for comparing the digitized data samples to a predetermined value include means for comparing the average digitized data sample from tip to ground (AVT) to a predetermined level (VMLT) and if the average digitized data sample is greater than or equal to VMLT, incrementing the counter (CT CTR), and to continue to increment the counter (CT CTR) each consecutive successive time that this average digital data sample is greater than or equal to VMLT, and further comprising means for comparing the counter value to a number (HYSMLT) so as to detect the presence of the MLT signaling state if the counter value equals said number (HYSMLT).

26. An apparatus to detect telephony signaling states as defined in claim 25, wherein the predetermined HYSMLT number is greater than the first predefined number.

27. An apparatus to detect telephony signaling states as defined in claim 26, further comprising means for determining the presence of an RLCF signaling state by determining, after a failure to detect MLT signaling, whether the average voltage from tip to ring (AVTR) is more negative than a negative threshold value (V1), and if this condition is true incrementing a counter (TD CTR), and wherein said RLCF means continues to increment the TD CTR counter each consecutive successive time that the AVTR value is more negative than the V1 threshold value and further wherein the RLCF means upon determining that the counter equals the first predefined number (HYSPOS), determines the presence of an RLCF signaling state.

28. An apparatus to detect telephony signaling states as defined in claim 27, further comprising means for determining an LCFO signaling state by determining if the AVTR value is more positive than the V1 threshold and less than a second threshold (V6), and if less than V6, incrementing a counter (D CTR) and continuing to make this comparison such that said LCFO detection means compares the counter to the first predetermined value (HYSPOS) and if equal to said value, determines the presence of an LCFO signaling state, and further wherein the LCFO detecting means comprises means such that if the AVTR value is not less than the V6 threshold, determining if the AVTR value is less than a third threshold (V4) and further determining if the AVT value is less than a fourth threshold (V5) and if both conditions are true, incrementing the D CTR counter and continuing this comparison so as to increment the D CTR counter each successive time the conditions are met and comparing the counter to the first predefined number (HYSPOS) and if equal to said first predefined number, determines the presence of an LCFO signaling state.

29. An apparatus to detect telephony signaling states as defined in claim 28, further comprising means so that if none of the previous level signaling states are detected, a counter (C CTR) is incremented and if the counter value is equal to the first predetermined value (HYSPOS, determining an LCF signaling state to be present.

30. An apparatus to detect telephony signaling states as defined in claim 29, wherein the threshold value for the RLCF detection means is changed from less than V1 to less than a fifth predetermined value (V5) if the subscriber line is off-hook and further wherein the second LCFO detector means is omitted and the first LCFO detector means predetermined value is changed from less than V6 to less than another predetermined value (V2) if the subscriber line is off-hook.

31. An apparatus to detect telephony signaling states for two subscriber line pairs (channels) as defined in claim 30, wherein the ring detector means, the MLT detector means, the RLCF detector means, the LCFO detector means and the LCF detector means individually compare the digitized average tip to ring and tip to ground values data samples for both subscriber channels with the respective threshold values and determines the signaling state for both subscriber channels and further comprises means for combining the detection states for both channels and outputting the respective information for both channels to interconnectable telephony equipment.

32. An apparatus to detect telephony signaling states as defined in claim 24, wherein the means for detecting at least one signaling state includes means for detecting forward disconnect, open switching interval, -R ringing, -T ringing, mechanized loop test, idle, and automatic number identification.

33. An apparatus to detect telephony signaling states as defined in claim 24, wherein the means for detecting at least one signaling state includes means for detecting forward disconnect, open switching interval, -R ringing, -T ringing, mechanized loop test, idle, positive loop supervision, negative coin check, positive coin check, negative coin control, and positive coin control.

34. An apparatus to detect a ringing telephony signaling state, having a periodic analog voltage, said ringing signaling states communicated by the analog voltage generated on the tip and ring leads of a subscriber line, comprising:
A) means for periodically converting the analog voltage associated with the subscriber line into digital data samples, the frequency of the conversion occurring at a rate greater than the ringing signal to be detected;
B) means, responsive to the on-hook status of the subscriber line for determining if a ringing signal state is present, comprising:
1) means for storing a successive plurality of digital data samples;
2) means for determining the slope of stored digital data samples;
3) means for determining if a plurality of successive slopes are of the same polarity so as to generate a ringing signal state detection signal if such a plurality of successive slopes is determined; and C) means for outputting the ringing signaling state detection signal.

35. An apparatus to detect a ringing telephony signaling state as as defined in claim 34, wherein the sampling rate of the analog to digital converter means is substantially greater than the frequency of the ringing signaling state to be detected.

36. An apparatus to detect a ringing telephony signaling state as defined in claim 35, wherein the plurality of successive slopes must at least be equal to three in order for a ringing signaling state detection signal to be generated.

37. An apparatus to detect a ringing telephony signaling state as defined in claim 36, wherein the means for determining if a plurality of successive slopes are of the same polarity includes means for determining if the magnitude of said slope determinations are greater than a predefined value, and only considering the slope determination to be valid if it is greater than said predefined value.

38. A line card for interconnecting to at least one subscriber line so as to determine signaling states, including a periodic ringing signaling state, and level signaling states, associated with analog voltages generated on the tip and ring leads of the subscriber line, comprising:
A) means for periodically converting the analog voltage associated with the subscriber line into digitized data samples, the frequency of the conversion occurring at a rate greater than the ringing signaling state to be detected;
B) means, responsive to the on-hook status of the subscriber line for determining if a ringing signal is present, comprising:
1) means for storing a successive plurality of digital data samples;
2) means for determining the slope of stored digital data samples;
3) means for determining if a plurality of successive slopes are of the same polarity so as to generate a ringing signal state detection signal if such a plurality of successive slopes is determined;
C) means for detecting at least one level signaling state by comparing the digitized data samples to a predetermined value; and
D) means for outputting the detected signaling states;
E) a line unit controller for receipt of the detected signaling states for formatting the detected signaling states so as to generate outputs; and
F) means for providing loop-start or ground-start service in association with the output signals generated by the line unit controller.

39. A line card as defined in claim 38, wherein the means for providing loop-start or ground-start service comprises a loop current sink interconnected to the tip and ring leads of the subscriber line and under control of one of the outputs of the line unit controller for providing a low DC impedance and a high AC impedance to the tip and ring leads when activated.

40. A line card as defined in claim 39, wherein the means for providing loop-start or ground-start service includes a voice frequency relay, a line transformer, and a code/decode filter module, the voice frequency relay under control of one of the outputs of the line unit controller, the voice frequency relay controlling interconnection of the tip lead to the transformer, and wherein the line card further includes a hybrid network interconnected to the output of the transformer for reducing the voice frequency signal from the interconnected code/decode module toward the central office tip and ring lines, and a code/decode filter module connected to the hybrid network so as to convert the voice frequency signals into pulse code modulated signals and to decode incoming pulse code modulated signals into analog voice frequency signals so as to be applied to the tip and ring leads of the subscriber line.

41. A line card as defined in claim 38, wherein the means for detecting at least one level signaling state includes means for detecting tip lead open, forward disconnect, mechanized loop testing, battery reversal, and tip lead grounded.

42. A line card as defined in claim 38, wherein the means for detecting at least one signaling state includes means for detecting forward disconnect, open switching interval, -R ringing, -T ringing, mechanized loop test, idle, and automatic number identification.

43. A line card as defined in claim 38, wherein the means for detecting at least one signaling state includes means for detecting forward disconnect, open switching interval, -R ringing, -T ringing, mechanized loop test, idle, positive loop supervision, negative coin check, positive coin check, negative coin control, and positive coin control.

44. A method to detect telephony signaling states, including a periodic ringing signaling state, and level signaling states, said signaling states communicated by analog voltages generated on the tip and ring leads of a subscriber line, comprising the steps of:
   1) periodically converting the analog voltage associated with the subscriber line into digital data samples, the frequency of the conversion occurring at a rate greater than the ringing signal to be detected;
   2) if the subscriber line has an on-hook status, determining if a ringing signal state is present, comprising the substeps of:
      a) storing a successive plurality of digital data samples;
      b) determining the slope of stored digital data samples;
      c) determining if a plurality of successive slopes are of the same polarity so as to generate a ringing signal state detection signal if such a plurality of successive slopes is determined;
   3) detecting at least one level signaling state by comparing the digitized data samples to a predetermined value; and
   4) outputting the detected signaling states.

45. A method to detect telephony signaling states as defined in claim 44, wherein the sampling rate of the analog to digital conversion is at least twelve times faster than the frequency of the ringing signal to be detected.

46. A method to detect telephony signaling states as defined in claim 44, wherein the analog voltages comprise a tip lead to ring lead differential voltage and a tip lead to ground voltage and wherein the analog to digital conversion includes means for periodically converting these voltages into separate digital data samples.

47. A method to detect telephony signaling states as defined in claim 46, further comprising the step of determining the average values of the tip to ring and tip to ground digital data samples and wherein these averaged tip to ring and tip to ground digital data samples are used by the step of comparing the digital data samples to a predetermined value so as to detect at least one level signaling state.

48. An apparatus to detect telephony signaling states as defined in claim 44, wherein the step of detecting at least one level signaling state further comprises averaging successive digital data samples of the same sampled analog voltage, and wherein the step of comparing the digital data samples to a predetermined value comprises comparing the averaged digital data samples to said predetermined value.

49. An apparatus to detect telephony signaling states as defined in claim 48, wherein the step of detecting at least one level signaling state further comprises a counter associated with each level signaling state to be detected, and at least one predefined number stored, wherein the counter associated with a particular signaling state is incremented whenever comparison is determined for that signaling state, and further comprising the step of comparing the counter value with said corresponding number so as to detect the particular signaling state if the counter value equals said number.

50. A method to detect telephony signaling states as defined in claim 44, wherein the step of detecting at least one level signaling state includes detecting forward disconnect, open switching interval, -R ringing, -T ringing, mechanized loop test, idle, and automatic number identification.

51. A method to detect telephony signaling states as defined in claim 50, wherein the step of detecting at least one level signaling state further comprises determining average values of the digital data samples and wherein these averaged digital data samples are compared to predetermined voltage values for determining the presence of the level signaling states.

52. A method to detect telephony signaling states as defined in claim 51, further wherein the step of detecting at least one level signaling state comprises a counter for each of the level signaling states to be detected and wherein the counter value is incremented for the signaling state to which it is associated if the averaged digital data samples are within predefined voltage values, and wherein if the counter value for the counter associated with the signaling state equals a predefined number, determining the associated level signaling state to be present.

53. A method to detect telephony signaling states as defined in claim 52, further comprising the step of clearing a counter value if the next averaged digital data sample does not have a value which would increment the counter.

54. A method to detect telephony signaling states as defined in claim 44, wherein the plurality of successive slopes must at least be equal to three in order for a ringing signaling state detection signal to be generated.

55. A method to detect telephony signaling states as defined in claim 54, wherein the step of determining if a plurality of successive slopes are of the same polarity includes determining if the magnitude of said slope determinations are greater than a predefined value, and only considering the slope determination to be valid if it is greater than said predefined value.

56. A method to detect a ringing telephony signaling state, having a periodic analog voltage, said ringing signaling states communicated by the analog voltage generated on the tip and ring leads of a subscriber line, comprising the steps of:
   1) periodically converting the analog voltage associated with the subscriber line into digital data samples, the frequency of the conversion occurring at a rate greater than the ringing signal to be detected;

2) if the subscriber line has an on-hook status, determining if a ringing signal state is present, comprising the substeps of:
   a) storing a successive plurality of digital data samples;
   b) determining the slope of stored digital data samples;
   c) determining if a plurality of successive slopes are of the same polarity so as to generate a ringing signal state detection signal if such a plurality of successive slopes is determined; and
4) outputting the ringing signaling state detection signal.

57. A method to detect a ringing telephony signaling state as as defined in claim 56, wherein the sampling rate of the analog to digital converter means is substantially greater than the frequency of the ringing signaling state to be detected.

58. A method to detect a ringing telephony signaling state as defined in claim 57, wherein the plurality of successive slopes must at least be equal to three in order for a ringing signaling state detection signal to be generated.

59. A method to detect a ringing telephony signaling state as defined in claim 58, wherein the steps of determining if a plurality of successive slopes are of the same polarity includes determining if the magnitude of said slope determinations are greater than a predefined value, and only considering the slope determination to be valid if it is greater than said predefined value.

* * * * *